(12) United States Patent
Choi

(10) Patent No.: US 10,956,007 B2
(45) Date of Patent: Mar. 23, 2021

(54) ELECTRONIC DEVICE AND METHOD FOR PROVIDING SEARCH RESULT THEREOF

(71) Applicant: SAMSUNG ELECTRONICS CO., LTD., Suwon-si (KR)

(72) Inventor: Yoon-hee Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/052,100

(22) Filed: Aug. 1, 2018

(65) Prior Publication Data
US 2019/0042079 A1 Feb. 7, 2019

Related U.S. Application Data

(60) Provisional application No. 62/539,637, filed on Aug. 1, 2017.

(30) Foreign Application Priority Data

Oct. 20, 2017 (KR) ........................ 10-2017-0136888

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 3/0488* (2013.01); *G06F 3/04842* (2013.01);
(Continued)

(58) Field of Classification Search
None
See application file for complete search history.

(56) References Cited

U.S. PATENT DOCUMENTS

2009/0276805 A1* 11/2009 Andrews, II ....... H04N 21/2547
725/35
2011/0301433 A1 12/2011 Sadowsky et al.
(Continued)

FOREIGN PATENT DOCUMENTS

| EP | 2 894 574 A1 | 7/2015 |
| KR | 10-2015-0055446 A | 5/2015 |
| KR | 10-2016-0013496 A | 2/2016 |

OTHER PUBLICATIONS

Communication dated Nov. 2, 2018, issued by European Patent Office in counterpart European Application No. 18186561.9.
(Continued)

*Primary Examiner* — Jwalant Amin
(74) *Attorney, Agent, or Firm* — Sughrue Mion, PLLC

(57) ABSTRACT

A method of providing a search result in an electronic device and an electronic device therefor, are provided. The method includes displaying a screen including an object and sensing a user input of selecting the object. In this method, in response to the user input, the screen including the object is captured to generate the captured image. The method further includes transmitting at least part of the captured image to an external device, receiving a search result, which is obtained based on object information corresponding to the object and additional information related to the object from an external device, and displaying the received search result.

18 Claims, 34 Drawing Sheets

(51) Int. Cl.
*G06N 20/00* (2019.01)
*G06F 16/432* (2019.01)
*G06F 16/532* (2019.01)

(52) U.S. Cl.
CPC .......... *G06F 16/434* (2019.01); *G06F 16/532* (2019.01); *G06N 20/00* (2019.01)

(56) References Cited

U.S. PATENT DOCUMENTS

| | | |
|---|---|---|
| 2012/0162244 A1 | 6/2012 | Ma et al. |
| 2012/0275690 A1 | 11/2012 | Melvin et al. |
| 2013/0013578 A1 | 1/2013 | Yang et al. |
| 2013/0018867 A1* | 1/2013 | Regan ............... G06F 9/445 707/707 |
| 2013/0275411 A1 | 10/2013 | Kim et al. |
| 2013/0282532 A1* | 10/2013 | Shihadah ............ H04N 7/173 705/27.1 |
| 2013/0325839 A1* | 12/2013 | Goddard ........... G06F 16/9537 707/708 |
| 2014/0029921 A1* | 1/2014 | Warren ............... G06Q 50/01 386/282 |
| 2014/0045484 A1 | 2/2014 | Kim et al. |
| 2014/0156701 A1 | 6/2014 | Ueno et al. |
| 2014/0164406 A1 | 6/2014 | Petrou |
| 2014/0358882 A1 | 12/2014 | Diab |
| 2015/0193104 A1 | 7/2015 | Cho et al. |
| 2015/0334291 A1* | 11/2015 | Cho ................. H04N 5/23216 348/222.1 |
| 2015/0363943 A1 | 12/2015 | Yalniz et al. |
| 2015/0370895 A1 | 12/2015 | Denman et al. |
| 2016/0005229 A1* | 1/2016 | Lee ................. G06F 3/0488 345/419 |
| 2016/0022053 A1 | 1/2016 | Martin |
| 2016/0192008 A1* | 6/2016 | Terui ................. H04N 21/8133 725/60 |
| 2017/0155631 A1* | 6/2017 | Du ..................... H04L 63/08 |
| 2018/0143756 A1* | 5/2018 | Mildrew ............. G06F 3/0482 |
| 2019/0034759 A1* | 1/2019 | Barnett .............. G06K 9/6202 |

OTHER PUBLICATIONS

International Search Report (PCT/ISA/210) dated Nov. 14, 2018, issued by International Searching Authority in counterpart International Application No. PCT/KR2018/008712.
Written Opinion (PCT/ISA/237) dated Nov. 14, 2018, issued by International Searching Authority in counterpart International Application No. PCT/KR2018/008712.
Jinwook Oh et al., "A 57mW Embedded Mixed-Mode Neuro-Fuzzy Accelerator for Intelligent Multi-core Processor", Solid-State Circuits Conference Digest of Technical Papers (ISSCC), 2011 IEEE International, IEEE, XP032013669, Feb. 20, 2011, pp. 130-132.
Communication dated Oct. 10, 2019, issued by the European Patent Office in counterpart European Application No. 19191178.3.
Communication dated Apr. 1, 2020 issued by the European Patent Office in counterpart European Application No. 18 186 561.9.
Communication dated Jun. 29, 2020, issued by the Intellectual Property India in Indian Application No. 201814028762.
Communication dated Dec. 8, 2020 issued by the European Patent Office in European Application No. 19191178.3.
Communication dated Feb. 9, 2021 issued by the European Patent Office in European Application No. 18186561.9.

* cited by examiner

FIG. 8A
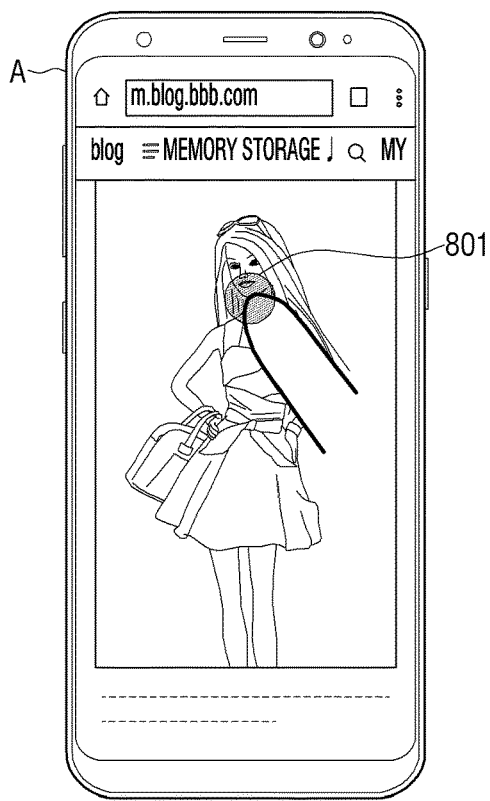
FIG. 8B
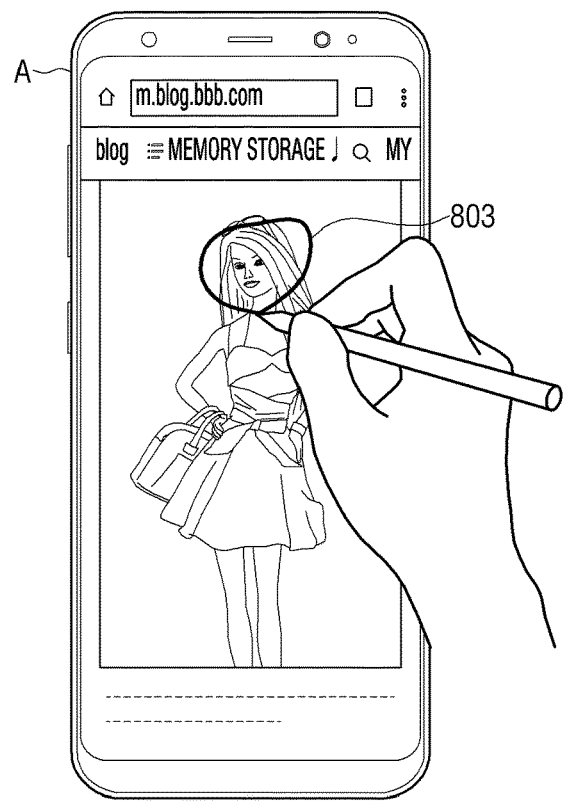
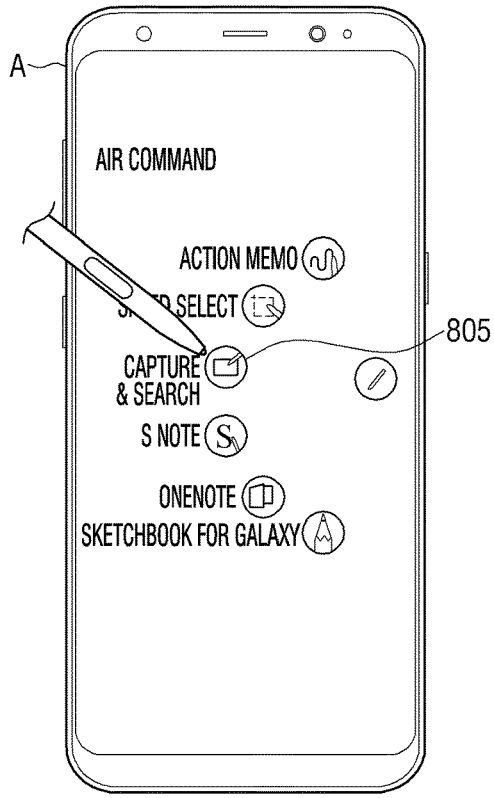
FIG. 8C
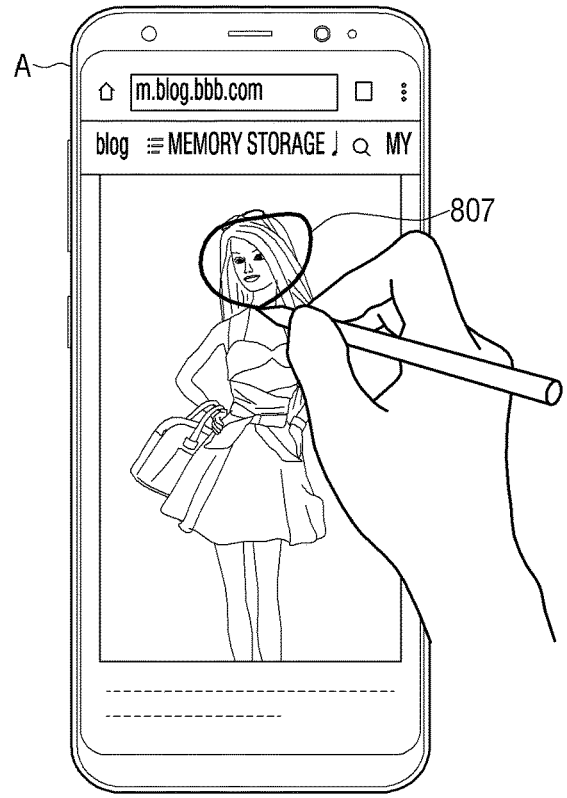

FIG. 11
(a)
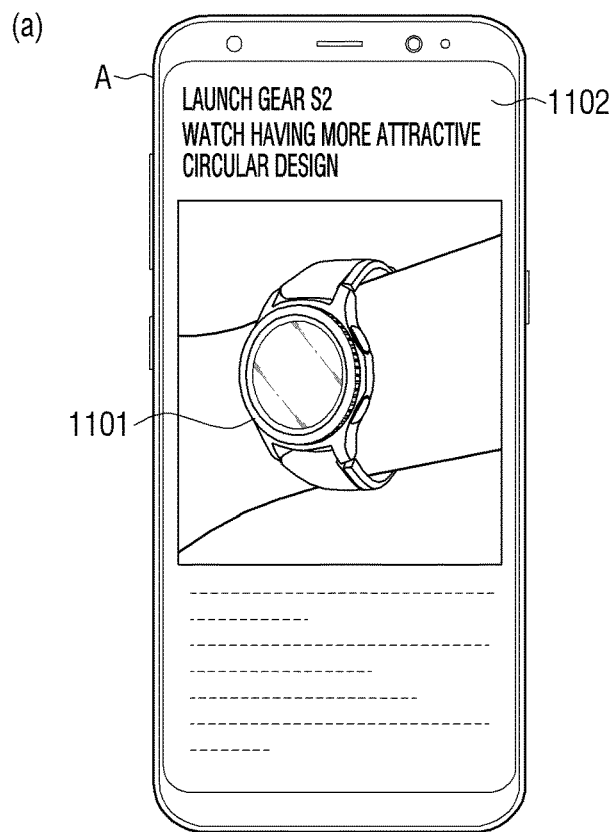
(b)
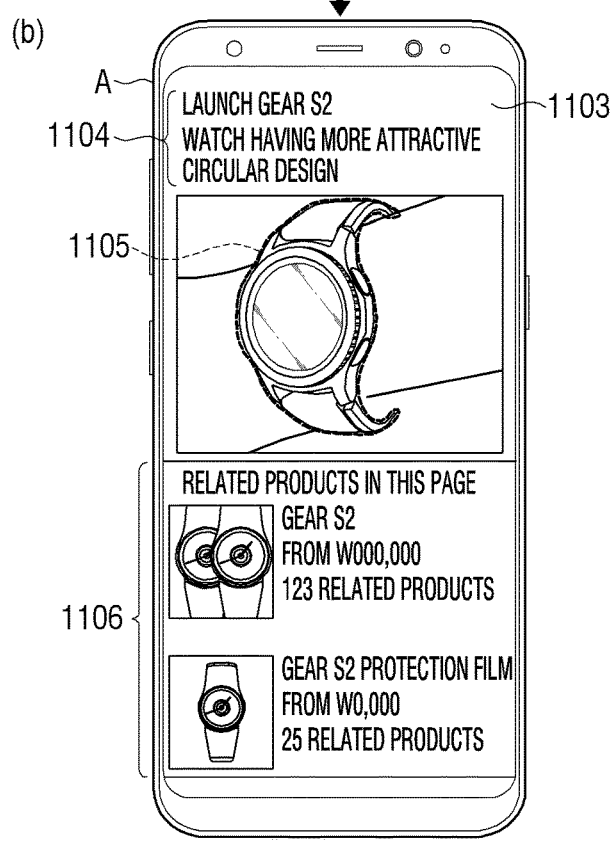

FIG. 12
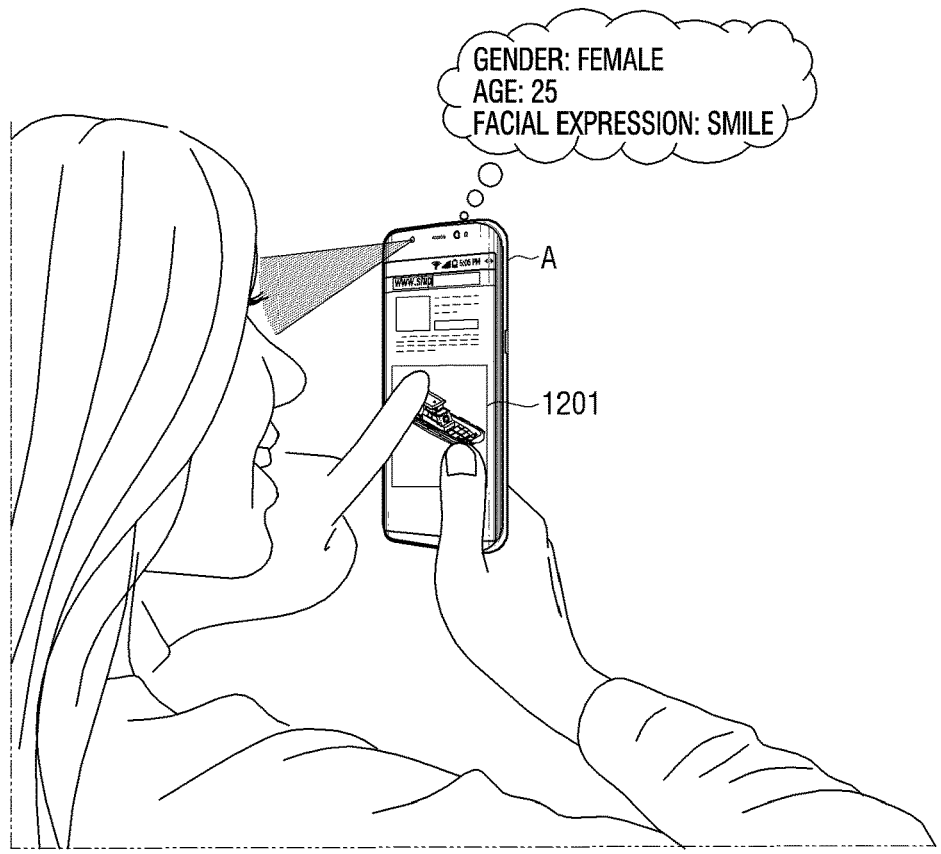
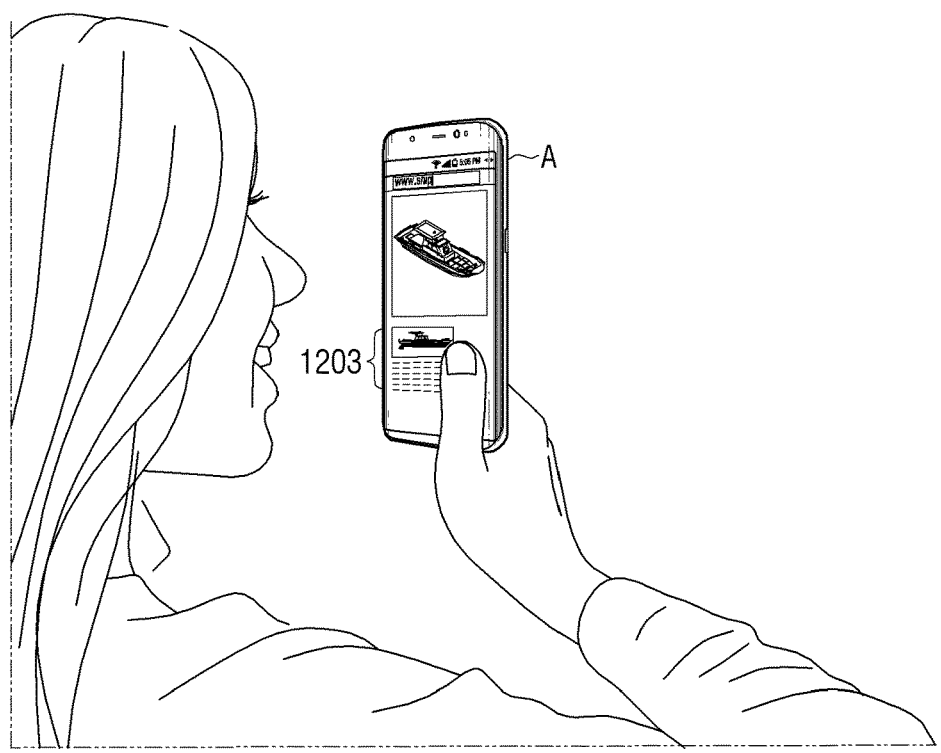

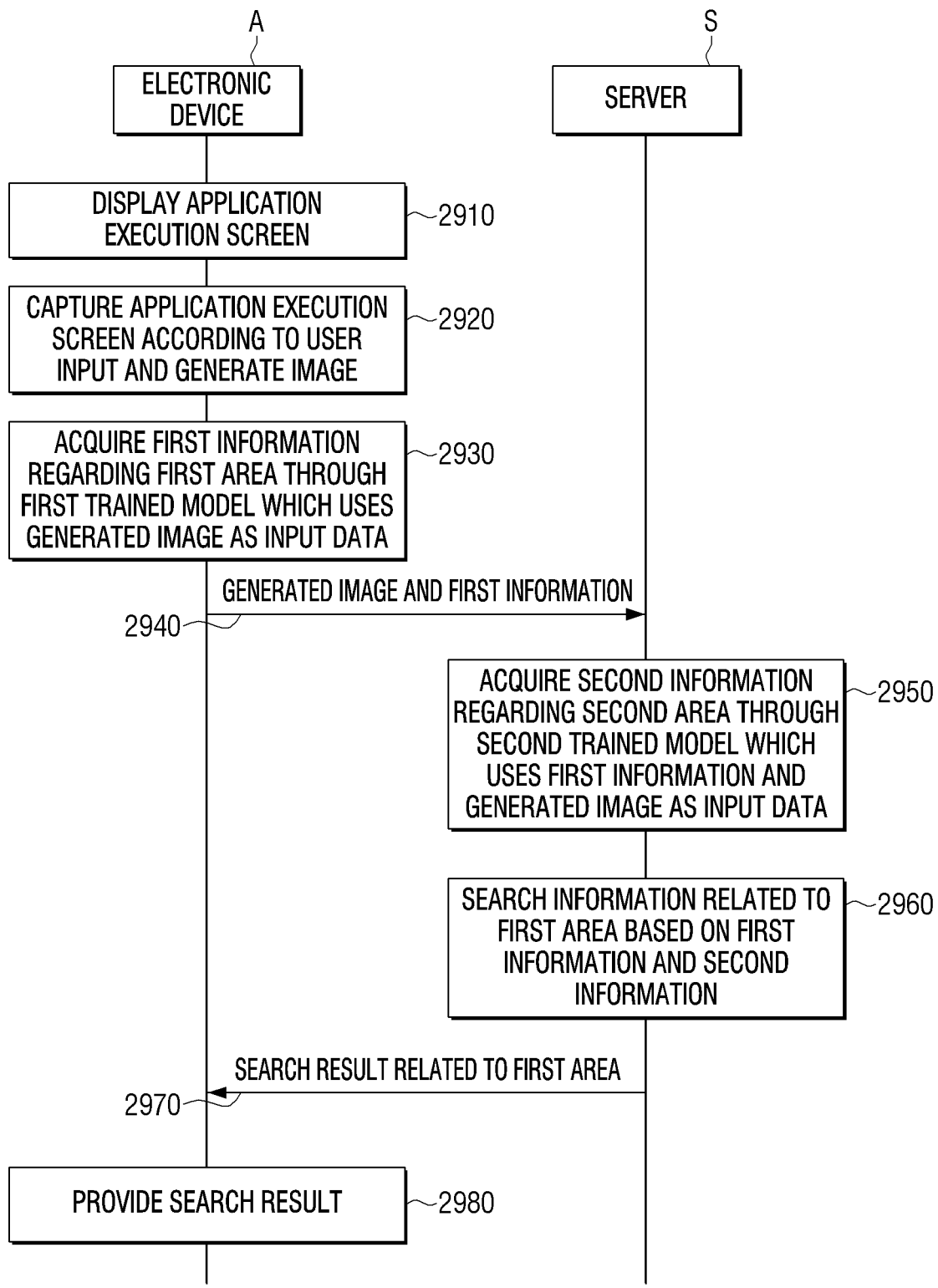

ELECTRONIC DEVICE AND METHOD FOR PROVIDING SEARCH RESULT THEREOF

CROSS-REFERENCE

This application is based on and claims priority under 35 U.S.C. § 119 to Korean Patent Application No. 10-2017-0136888, filed on Oct. 20, 2017, and U.S. Provisional Patent Application No. 62/539,637, filed on Aug. 1, 2017, in the United States Patent and Trademark Office, the disclosures of which are incorporated by reference herein in their entireties.

BACKGROUND

1. Field

The disclosure relates to an electronic device and a method for providing a search result thereof, and more particularly, to a method of providing a search result related to an object included on a screen of an electronic device.

In addition, the disclosure relates to an artificial intelligence (AI) system which simulates the functions of a human brain such as recognition and judgement using a machine learning algorithm and its application.

2. Description of Related Art

With the development of a communication technology and a user interface of an electronic device, a user can easily receive necessary information through the electronic device without restriction of place and time.

If an electronic device provides a screen including an object, a user may wish to retrieve information related to the object.

To do so, the user may separately store an object, perform an image search using the stored object as a keyword or perform a text search by directly inputting a text related to the object.

Recently, an AI system which implements human-level intelligence has been used in various fields. The AI system is a system where unlike the existing rule-based smart system, machine learns, judges, and becomes smarter and more intelligent. As the use of the AI system increases, the recognition rate and the understanding of users' taste improves and thus, the existing rule-based smart system is gradually being replaced by a deep learning-based AI system.

The AI technology consists of machine learning (e.g., deep learning) and element technologies which utilize machine learning.

Machine learning is an algorithm technology that classifies/learns the characteristics of input data without user help. An element technology is a technology that simulates functions such as recognition and judgment of a human brain using machine learning algorithms such as deep learning, and consists of technical fields such as linguistic understanding, visual understanding, reasoning/prediction, knowledge representation, and operation control.

The various fields in which AI technology is applied are as follows. Linguistic understanding is a technology for recognizing and applying/processing human language/characters, and includes natural language processing, machine translation, dialogue system, query response, speech recognition/synthesis, and the like. Visual understanding is a technology to recognize and process objects as human vision, and includes object recognition, object tracking, image search, human recognition, scene understanding, spatial understanding, and image enhancement. Reasoning and prediction is a technology for judging and logically inferring and predicting information, including knowledge/probability based reasoning, optimization prediction, preference base planning, and recommendation. Knowledge representation is a technology that automates the processing of human experience information into knowledge data, and includes knowledge establishment (data generation/classification) and knowledge management (data utilization). Operation control is a technology to control the autonomous travel of a vehicle and the motion of a robot, and includes motion control (navigation, collision, traveling), manipulation control (behavior control), and the like.

In related art, a user has to go through several steps in order to retrieve information related to an object included on a screen, which is inconvenient. In particular, if an electronic device does not support an image search, the user has to manually enter text about the object. Also, when information related to an object is searched in various fields, the user has to frequently perform a search again based on the search result, which adds inconvenience.

The above information is presented as background information only to assist with an understanding of the present disclosure. No determination has been made, and no assertion is made, as to whether any of the above might be applicable as prior art with regard to the present disclosure.

SUMMARY

Illustrative, non-limiting embodiments may overcome the above disadvantages and other disadvantages not described above. The present disclosure is not necessarily required to overcome any of the disadvantages described above, and illustrative, non-limiting embodiments may not overcome any of the problems described above. The appended claims should be consulted to ascertain the true scope of an inventive concept.

In accordance with an aspect of the disclosure, there is provided a method of providing a search result in a display device including displaying an application execution screen, receiving a user input while the application execution screen is displayed, based on the user input, generating an image related to the application execution screen, and displaying a search result which is performed using first information regarding a first area corresponding to the user input on the generated image and second information regarding a second area which is different from the first area on the generated image, and the first information and the second information is acquired by a trained model.

The first area may be acquired from the generated image based on touch coordinates corresponding to the user input.

The method may further include displaying the generated image in replacement of the application execution screen.

The method may be performed by an AI agent.

The first information may be information acquired by recognizing the first area of the generated image.

The second information may be information acquired by recognizing the second area of the generated image.

The user input may be an input regarding the application execution screen.

The method may further include transmitting a user feedback for displaying the search result to an external device.

The method may further include transmitting at least part of the generated image to an external search server and receiving the search result from the external search server.

The displaying a search result may include displaying the search result while the application execution screen is displayed.

In according with another aspect of the disclosure, there is provided an electronic device, which includes a display, a user input interface, a communicator, a processor configured to electrically connected to the display, the user input interface and the communicator, and a memory configured to store at least one computer program which is executed by the processor, and the at least one computer program includes displaying an application execution screen on the display, in response to receiving a user input while the application execution screen is displayed, generating an image related to the application execution screen according to the user input, and displaying a search result which is performed using first information regarding a first area corresponding to the user input on the generated image and second information regarding a second area which is different from the first area on the generated image.

The first area may be acquired from the generated image based on touch coordinates corresponding to the user input.

The at least one computer program may further include an operation of displaying the generated image in replacement of the application execution screen.

The at least one computer program may be performed by an AI agent.

The first information may be information which is acquired by recognizing the first area of the generated image.

The second information may be information which is acquired by recognizing the second area of the generated image.

The user input may be an input regarding the application execution screen.

The at least one computer program may further include an operation of transmitting a user feedback for displaying the search result to an external device.

The displaying a search result may include displaying the search result while the application execution screen is displayed.

According to an aspect of the disclosure, there is provided a method of acquiring information using a trained model in an electronic device. The method includes displaying an application execution screen, generating an image related to the application execution screen according to the user input, acquiring first information regarding a first area on the generated image through a first model which is trained by using the generated image as input data; and acquiring second information regarding a second area which is different from the first area on the generated image through a second model which is trained by using the acquired first information and the generated image as input data.

According to an aspect of the disclosure, a user may easily retrieve a search result related to an object included in a screen.

In addition, by providing a search result using context information which is acquired based on the selection of an object, a user-customized search result that reflects the user's search intention can be provided.

Accordingly, the number of retrieval steps and the number of re-searching by a user are reduced and thus, the satisfaction and convenience of the user of the electronic device can be improved.

BRIEF DESCRIPTION OF THE DRAWINGS

The above and/or other aspects, features, and advantages of certain embodiments of the present disclosure will become more apparent from the following description taken in conjunction with the appended drawings. Understanding that these drawings depict only certain embodiments and are therefore not to be considered to be limiting of the scope of the disclosure, the principles herein are described and explained with additional specificity and detail via the use of the accompanying drawings, in which:

FIGS. 8A-8C are views illustrating selecting an object using an electronic device, according to various embodiments;

FIG. 11 is a view illustrating a process of obtaining a search result related to an object, according to various embodiments;

FIG. 12 is a view illustrating a process of obtaining a search result related to an object using photographing information, according to various embodiments;

FIGS. 28 and 29 are flow diagrams illustrating providing search results by a system using a recognition model, according to various embodiments.

DETAILED DESCRIPTION OF EXEMPLARY EMBODIMENTS

Figure 1:
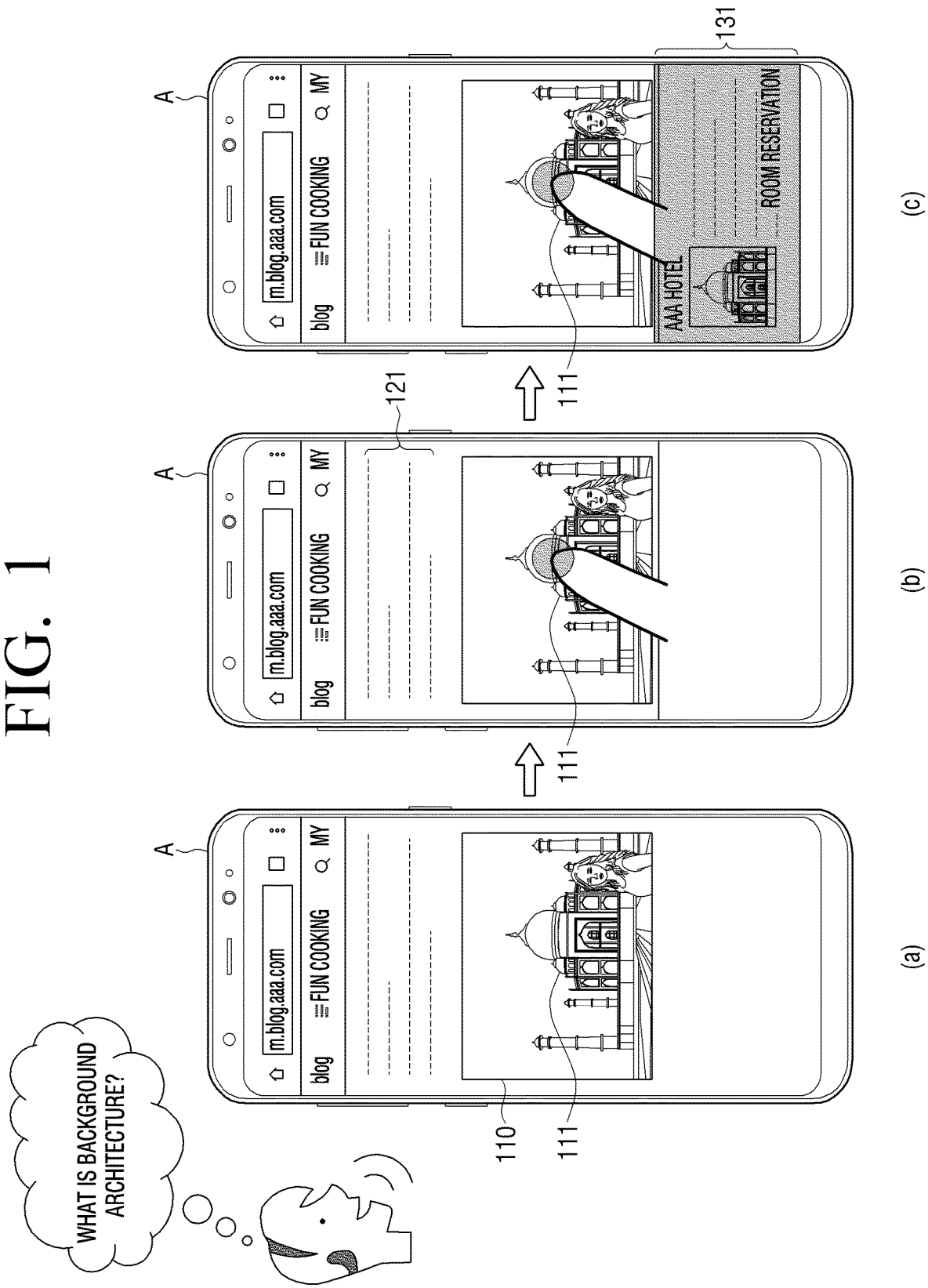
FIG. 1 is a view illustrating a process of using an electronic device to obtain a search result, according to various embodiments.

Hereinafter, various embodiments will be described with reference to accompanying drawings. However, it should be understood that the disclosure is not limited to the specific embodiments described hereinafter, but includes various modifications, equivalents, and/or alternatives of the embodiments. In relation to explanation of the drawings, same drawing reference numerals may be used for similar constituent elements.

In this specification, the expressions "comprise," "may comprise," "include," or "may include" may refer to the presence of features (e.g. a numerical value, a function, an operation, or an element such as a part and the like), but do not exclude the presence of additional features unless specifically stated otherwise.

In the description, the term "A or B", "at least one of A or/and B", or "one or more of A or/and B" may include all possible combinations of the items that are enumerated together. For example, the term "A or B", "at least one of A and B" or "at least one of A or B" may include (1) at least one A, (2) at least one B, or (3) both at least one A and at least one B.

The expression "1", "2", "first", or "second" as used herein may use a variety of elements, irrespective of order and/or importance thereof, and they are used only to distinguish one element from another without limiting the corresponding elements.

If an element (e.g., a first element) is "(operatively or communicatively) coupled with/to" or "connected to" another element (e.g., a second element), it should be understood that any such element may be directly connected to another element or may be connected via yet another element (e.g., a third element). On the other hand, if an element (e.g., a first element) is "directly coupled to" or "directly connected to" another element (e.g., a second element), it should be understood that there is no other element (e.g., a third component) between the elements.

In the specification, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For instance, "a sub-processor configured to (or set to) perform A, B and C" may refer to an exclusive processor (e.g., an embedded processor) to perform the corresponding operations or a generic-purpose processor (e.g., a CPU or an application processor) which may perform the corresponding operations by executing one or more software programs stored in a memory device.

An electronic apparatus according to various embodiments may include at least one of, for example, smartphone, tablet PC, mobile phone, video phone, e-book reader, desktop PC, laptop PC, netbook computer, workstation, server, PDA, portable multimedia player (PMP), MP3 player, medical device, and a wearable device. The wearable device may be of at least one of the accessory type (e.g., a watch, a ring, a bracelet, an ankle bracelet, a necklace, a pair of glasses, a contact lens or a head-mounted-device (HMD)), a fabric or a garment (e.g., e-clothing), a body attachment (e.g., a skin pad or a tattoo), or a bio-implantable circuit. In some embodiments, the electronic device may include at least one of, for example, a television, a digital video disk (DVD), player, audio, refrigerator, air conditioner, a cleaner, an oven, a microwave oven, a washing machine, an air purifier, a set top box, a home automation control panel, a security control panel, a media box (e.g., Samsung HomeSync™, Apple TV™ or Google TV™), a game console (e.g., Xbox™, PlayStation™), an electronic dictionary, an electronic key, a camcorder, and an electronic frame.

In other embodiments, the electronic device may include at least one of medical devices (e.g., various portable medical measurement devices such as a blood glucose meter, a heart rate meter, a blood pressure meter, or a body temperature meter), magnetic resonance angiography (MRA), magnetic resonance imaging (MRI), computed tomography (CT), camera, ultrasonic device), a navigation device, a global navigation satellite system (GNSS), an event data recorder (EDR), a flight data recorder (FDR), an automobile infotainment device, a marine electronic equipment (e.g., a marine navigation device, a gyro compass, etc.), avionics, a security device, a head unit for vehicle, an industrial or domestic robot, a drone, an ATM at financial institutions, point of sales (POS) of shops, Internet of Things (IoT) Internet devices (e.g., light bulbs, various sensors, sprinkler devices, fire alarms, thermostats, street lights, toasters, exercise equipment, hot water tanks, heaters, boilers, etc.).

In this specification, the term "a user" may indicate a person using an electronic device or an apparatus which uses an electronic device (e.g., an artificial intelligent electronic apparatus).

FIG. 1 is a view illustrating a process of using an electronic device to obtain a search result, according to various embodiments.

First, as illustrated in FIG. 1(a), an electronic device A may display a screen including an object 111 (e.g., an architecture). The object may be, for example, a part of a plurality of objects included in a content 110. In this case, a situation may arise where a user U of the electronic device A wishes to have additional information related to the object 111. For instance, the user U may wish to know the name or use of the architecture which is the object 111. In addition, the screen including the object 111 may be an application execution screen.

Accordingly, as illustrated in FIG. 1(b), the user U may select the object 111. For instance, the user U may long-press a point of a display area where the object 111 is displayed. Alternatively, in order to select the object 111, the user U may multi-touch or strongly touch the object using a finger or an electronic pen, draw the periphery of the object 111, or input a drag to pass through at least a portion of the object. Alternatively, the user U may touch the object 111 after pressing (or while pressing) a button (e.g., a button for executing an AI function) provided on the electronic device A. The user may select the object 111 using an action defined in a dictionary. The specific examples will be described later with reference to various embodiments.

The electronic device A may sense a user input of selecting a point. In response to the user input, the electronic device A may generate an image related to the application execution screen. In detail, the electronic device A may capture the screen including the object 111 and generate a captured image. The captured image may be stored, for example, in a memory of the electronic device A.

In this case, according to an embodiment, the electronic device A may display the generated captured image instead of the screen including the object 111.

Subsequently, the electronic device A may detect an object area (or a first area) related to the object 111 from the captured image based on touch coordinates corresponding to the user input. In this case, the detected capture area may be highlighted or displayed in a pop-up screen. Here, being highlighted may indicate that the selected object area is displayed distinguishably from other areas, meaning being displayed in a different shade, different contrast or complementary color, being displayed in a dotted line or a solid line, or being displayed with an indicator indicating the object area. The specific examples of the object area being highlighted will be described later with various embodiments and the above is provided by way of an example only and not by way of a limitation.

The electronic device A may acquire information (or first information) regarding an object included in the object area base on the detected object area, and may acquire context information (or second information) regarding the object based on a peripheral area (or second area) of the captured image. In this case, the electronic device A may acquire the information regarding the object and the context information using a training model, which will be described in greater detail below.

The electronic device A may acquire a search result related to the object 111 using information regarding the object 111 and context information 121, which is acquired according to the selection of the object 111.

Here, the context information is information acquired according to the selection of an object, and may include peripheral information regarding a peripheral area of the object in the screen including the object 111 at the time when a user selects the object 111. The peripheral information of the object 111 may be another object (e.g., a text or an image) which is located adjacent to the selected object or a part of a text included in a document which is currently displayed from among the whole document including the object 111.

In another example, if there is one image which includes the object 111, selected by a user, the peripheral information acquired in accordance with the selection of the object 111 may include information regarding the location and time where the acquired image is estimated to have been captured through image analysis, information regarding other objects other than the selected object, or additional information regarding the other objects.

In addition, the context information may include photographing information which is captured by a camera provided on the electronic device A at the time when a user selects the object 111. Here, "at the time when a user selects the object 111" means the time when the user selects the object 111 or within a predetermined time (e.g., 1 second to 10 seconds) after the user selects the object 111.

Meanwhile, the electronic device A may acquire a search result related to the object 111 using not only the context information but also usage history information of the user 1 with respect to the electronic device A. Alternatively, the electronic device A may acquire a search result related to the object 111 by using the user's profile of the electronic device A.

Referring to FIG. 1(c), the electronic device A may display an acquired search result 131 related to the object on the screen. The search result may be displayed on a part of the display area where the object is not displayed so that the search result may not overlap with the selected object. In this case, the display position of the object may be changed so that the object and the search result do not overlap. For instance, if the search result is displayed on the lower area of the display, the display position of the object may be changed to the upper area of the display, and if the search result is displayed on the upper area of the display, the display position of the object may be changed to the lower area of the display.

Alternatively, the search result may be displayed on a screen separate from the screen where the object is displayed. For instance, a separate pop-up window may be displayed on the screen where the object is displayed, and the search result may be displayed in the pop-up window. In this case, the display position of the pop-up window is determined according to the position of the selected object, and the size of the pop-up window is determined according to the size of the object on the screen and the size of the screen excluding the object on the entire screen (the remaining area of the screen). The pop-up window may be displayed so as not to overlap with the object even when the search result is displayed on a screen separate from the screen where the object is displayed.

Of course, a separate screen displaying the search result may be displayed instead of the screen where the object is displayed. In this case, the image of the selected object and the search result related to the object may be displayed together on the separate screen displaying the search result. Here, the background portion of the separate screen may be displayed transparently so that the screen including the object can be shown.

The search results associated with the object may include, for example, detailed information about the object, advertising information associated with the object, purchase information of the object, information of other objects associated with the object, and the like. Specifically, detailed information about an object can be collected through a web document search in a newspaper article, a document uploaded to the SNS, a document provided in a website, and the like through a search engine. In addition, the advertisement information related to the object may be collected at a website providing advertisement of the goods and services related to the object, or a website of a manufacturer manufacturing the goods or a company providing the services. The purchase information related to the object may be collected through a search of goods and services at a website selling the goods and services through a search engine. The information about other objects associated with the object may be collected through a search using another query having a high degree of similarity and relevance with a query corresponding to the object in a search engine.

In addition, the search results related to the object may include various contents (e.g., text, image, video, etc.) and UI elements (e.g., icon, hyperlink, etc.). For instance, if the selected object is "an architecture", the search results related to the object may include a text content and an image content for guiding to the selected object, an icon to perform a control operation (e.g., storage, sharing, etc.) regarding the selected object, and a hyperlink to access a web page including additional information (e.g., location information, tour information) regarding the selected object.

The search result related to the object may be changed according to a user input. For instance, if the selected object is "a hotel", a screen (e.g., a pop-up screen) including "detailed information regarding a hotel" may be provided as a search result related to the object. If a user input (e.g., a drag input) is received while "detailed information regarding a hotel" is provided, the screen including "detailed information regarding a hotel" is removed, and a new screen including "information regarding hotel reviews" may be provided.

The search result related to the object may be provided not only as visual information but also as a combination of at least one of auditory, tactile, and olfactory information. The specific examples regarding the search result related to the object will be described later in detail with various embodiments.

According to various embodiments, the electronic device A may acquire the object information reflecting context (e.g., the object name and the location of the object, the object name and other objects nearby, the object name and a subject of documents including the object, etc.) by using the object area and the peripheral information of the object as input data and additional information related to the object, and acquire a search result related to the object by using the object information where the additional information is reflected.

Alternatively, the electronic device A may acquire the general object information (e.g., the object name, the object ID, the object type, the object attribute, etc.) by using the object area as input data of a trained object recognition model, and acquire a search result related to the object by using the acquired general object information and the context information which is collected separately (e.g., the location information of the object, other peripheral objects, a subject of documents including the object, etc.). The trained object recognition model in an embodiment may be established by considering the application fields of the recognition model or the computer performance of the device. For instance, the trained object recognition model may be set to estimate the object information where the context is reflected by using the object area and the peripheral information of the object, as input data. The trained object recognition model may be, for example, a model based on a neural network. The object recognition model may be designed to simulate the human brain structure on a computer and may include a plurality of weighted network nodes to simulate a neuron of a human neural network. The plurality of network nodes may each establish a connection relationship so that the neurons simulate the synaptic activity of the neurons exchanging signals through the synapse. In addition, the object recognition may include, for example, a neural network model or a deep learning model developed from a neural network model. In a deep learning model, a plurality of network nodes are located at different depths (or layers) and may exchange data according to a convolution connection relationship. The examples of the recognition model include, but are not limited to, Deep Neural Network (DNN), Recurrent Neural Network (RNN), Bidirectional Recurrent Deep Neural Network (BRDNN), etc.

The electronic device A may use an AI agent to search information related to the object selected by a user, as mentioned above. In this case, the AI agent is an exclusive program for providing an AI (AI)-based service (e.g., speech recognition service, secretarial service, translation service, search service, etc.), and may be executed by the existing general processor (e.g., CPU) or a separate processor exclusively for AI (e.g., GPU, etc.). In particular, an AI agent may control various modules which will be described later.

Specifically, if the object 111 on the screen is selected by a predetermined user input (e.g., long press or the like) or the object 111 is selected after a button on the electronic device A (e.g., a button to execute an AI agent) is pressed, the AI agent may operate. The AI agent may generate a captured image by capturing a screen including the object 111, detect an object area related to the object 111 from the captured image based on touch coordinates corresponding to a user input, and acquire and provide a search result related to the object 111 by using the detected object area and the context information 121 acquired in accordance with the selection of the object 111 (e.g., peripheral information of the object and the like).

Of course, an AI agent may operate when a specific icon is touched on the screen or a button (e.g., a button for executing the AI agent) is pressed. In this case, the AI agent may generate a captured image by capturing a screen currently displayed, detect an object area related to the object 111 from the captured image based on touch coordinates corresponding to a user input which is input later to select an object, and acquire and provide a search result related to the object 111 by using the detected object area and the context information 121 acquired in accordance with the selection of the object 111.

The AI agent may be executed before a predetermined user input regarding the object 111 is sensed or a button on the electronic device A is selected. In this case, after a predetermined user input regarding the object 111 is sensed or a button on the electronic device A is selected, the AI agent of the electronic device A may capture the screen, and search and provide information related to the object 111. For instance, if the AI agent is executed by a processor exclusive for AI, the functions of the electronic device A are executed by a general processor before a predetermined user input regarding the object 111 is sensed or a button provided on the electronic device A is selected, and after a predetermined user input regarding the object 111 is sensed or a button provided on the electronic device A is selected, the functions of the electronic device A may be executed by the exclusive AI processor.

The AI agent may be in a standby state before a predetermined user input regarding the object 111 is sensed or a button provided on the electronic device A is selected. Here, the standby state is a state where a pre-defined user input to control the start of operation of the AI agent is sensed. If a predetermined user input regarding the object 111 is sensed or a button provided on the electronic device A is selected while the AI agent is in the standby state, the electronic device A may operate the AI agent, capture a screen using the AI agent, and search and provide information related to the object 111.

The AI agent may be terminated before a predetermined user input regarding the object 111 is sensed or a button provided on the electronic device A is selected. If a predetermined user input regarding the object 111 is sensed or a button provided on the electronic device A is selected while the AI agent is terminated, the electronic device A may execute the AI agent, capture a screen using the executed AI agent, and search and provide information related to the object 111.

Meanwhile, the AI agent may control various devices or modules which will be described in greater detail below.

In addition, the specific examples of acquiring a search result related to an object using a trained object recognition model between the electronic device A and a server will be described in greater detail below with various embodiments.

Figure 2A:
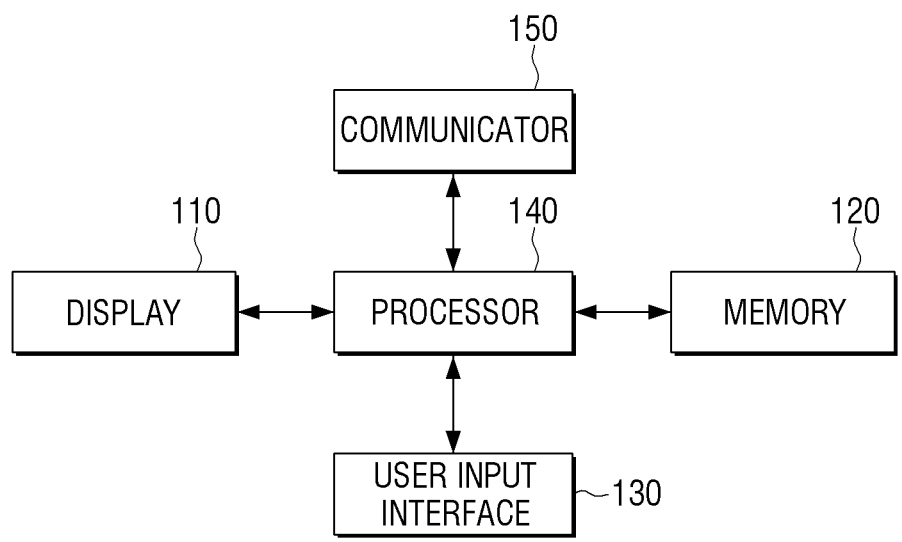
FIGS. 2A and 2B are block diagrams illustrating a network system including an electronic device, according to various embodiments.

FIG. 2A is a block diagram illustrating a configuration of the electronic device A, according to various embodiments. As illustrated in FIG. 2A, the electronic device A includes a display 110, a memory 120, a user input interface 130, a communicator 150, and a processor 140. The configurations illustrated in FIG. 2 are examples for implementing various embodiments, and appropriate hardware/software configurations which are obvious to those in the related art may be further included in the electronic device A.

The display 110 may provide various screens. In particular, the display 110 may provide a screen including an object. The display 110 may further provide a screen (e.g., a pop-up screen) including a search result related to the object on the screen including the object. Alternatively, the display 110 may provide a screen including a search result related to the object, separately.

The memory 120, for example, may store a command or data regarding at least one of the other elements of the electronic device A. The memory 120 may be implemented as a non-volatile memory, a volatile memory, a flash memory, a hard disk drive (HDD) or a solid state drive (SDD). The memory 120 may be accessed by the processor 140, and perform readout, recording, correction, deletion, update, and the like, on data by the processor 140. According to an embodiment, the term of the memory may include the memory 120, read-only memory (ROM) (not illustrated) and random access memory (RAM) (not illustrated) within the processor 140, or a memory card (not illustrated) mounted on the electronic device A (e.g., micro secure digital (SD) card or memory stick). Further, the memory 120 may store programs, data, and so on, to constitute various screens to be displayed on the display area of the display 110.

In addition, the memory 120 may store an AI agent to provide information related to a selected object, and may store a recognition model (object recognition model, peripheral information recognition model, face recognition model, etc.).

Figure 2B:
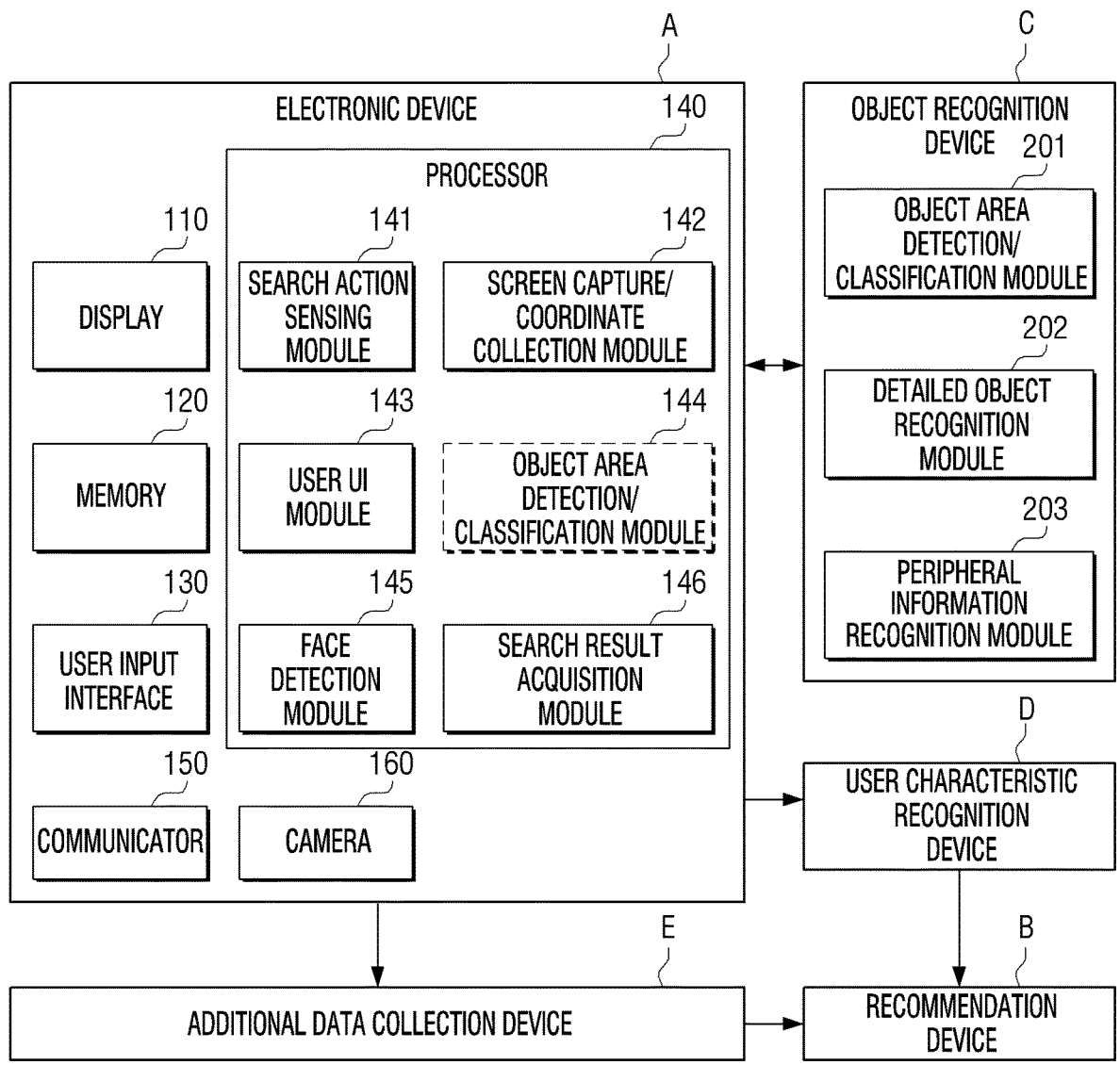

The memory 120 may store a search action sensing module 141, a screen capture/coordinate collection module 142, a user UI module 143, an object area detection/classification module 144, a face detection module 145, a search result acquisition module 146, and the like, as illustrated in FIG. 2B.

The user input interface 130 may receive various user inputs and transmit them to the processor 140. In particular, the user input interface 130 may include a touch sensor, a (digital) pen sensor, a pressure sensor, or a key. The touch sensor may, for example, use at least one of electrostatic type, pressure sensitive type, infrared type, and an ultraviolet type. The (digital) pen sensor may, for example, be part of a touch panel or include an additional sheet for recognition. The key, for example, may include a physical button, an optical key, or a keypad.

In particular, the user input interface 130 may acquire an input signal according to a predetermined user touch (e.g., a long-press touch) to select an object or a user input of pressing a specific button and touching an object. The user input interface 130 may transmit the input signal to the processor 140.

The communicator 150 may perform communication with an external electronic device or a server. In this case, the communicator 150 may transmit a captured image to an external sever, or transmit information regarding an object area and context information (e.g., peripheral information of the object, etc.). In addition, the communicator 150 may receive information regarding a captured image or an object area, and a search result regarding the object which responds to the context information.

The processor 140 may be electrically connected to the display 110, the memory 120 and the user input interface 130 and controls the overall operations and functions. In particular, the processor 140 may perform the function of searching information related to the object selected by a user using the search action sensing module 141, the screen capture/coordinate collection module 142, the user UI module 143, the object area detection/classification module 144, the face detection module 145, the search result acquisition module 146, and the like.

Specifically, the processor 140 may acquire an input signal in accordance with a user input to select an object of a screen displayed on the display 110 using the user input interface 130. In addition, in response to the input signal, the processor 140 may generate a captured image by capturing the screen including an object and store the generated captured image in the memory 130. The processor 140 may acquire a search result related to the object using an object area corresponding to the object included in the captured image and the context information acquired in accordance with the selection of the object, and control the display 110 to display the object and the search result.

The processor 140 may control the communicator 150 to transmit at least part of the captured image to an external server. In this case, the processor 140 may control the communicator 150 to transmit information regarding the selected object area (e.g., coordinate information of the object area, etc.) together. The processor 140 may receive a search result which is retrieved based on information regarding the object included in the captured image and additional information related to the object from an external server through the communicator 150, and control the display 110 to display the search result related to the object. The processor 140 will be described in further detail below with reference to FIG. 2B.

FIG. 2B is a block diagram illustrating a configuration of a network system including the electronic device A, according to various embodiments.

The network system may include the electronic device A, a recommendation device B, an object recognition device C, a user characteristic recognition device D, and a data collection device E.

Here, the recommendation device B, the object recognition device C, the user characteristic recognition device D, and the data collection device E are distinguished from each other for convenience of explanation, and at least a part of modules included in each of the recommendation device B, the object recognition device C, the user characteristic recognition device D, and the data collection device E are combined into one or more servers (e.g., a cloud consisting of a plurality of devices). Alternatively, at least a part of modules included in each of the recommendation device B, the object recognition device C, the user characteristic recognition device D, and the data collection device E, may be provided on the electronic device A.

The term "module" as used herein is made up of hardware, software, or firmware, and may be used interchangeably with terms such as logic, logic blocks, components, or circuits.

In FIG. 2B, the electronic device A may include the display 110, the memory 120, the user input interface 130, the communicator 150, the camera 160, and the processor 140. The display 110, the memory 120, the user input interface 130, and the communicator 150 have already described in detail with reference to FIG. 2A, so further descriptions will not be provided for simplicity. At least part of the processor 140 may operate as a plurality of modules which are distinguished from one another according to a specific purpose or function. The software for the processor 140 to operate as a plurality of modules may be stored in the memory 120. In this case, the memory 120 may store a plurality of instructions which allows the processor 140 to operate as each of the plurality of modules. The plurality of instructions may contain a code made by a compiler or a code executable by the processor to implement the one of more modules.

The processor 140 may include the search action sensing module 141, the screen capture/coordinate collection module 142, the user UI module 143, the object area detection/classification module 144, the face detection module 145, and the search result acquisition module 146.

The search action sensing module 141 may acquire an input signal in accordance with a user input (e.g., long-touch, multi-touch, pen action, etc.) to select an object included in a screen which is displayed on the display 110 through the user input interface 130.

Once the search action sensing module 141 acquires an input signal, the screen capture/coordinate collection module 142 may capture a screen and generate a captured image, and collect a coordinate (or a coordinate value) corresponding to one point on the display 110. For instance, the screen capture/coordinate collection module 142 may generate a captured image by capturing a screen currently displayed on the display 110 and collect a coordinate corresponding to one point of the display 110 selected by a user.

In another example, if an input signal is acquired through a physical button or a touch sensor on a bezel as the user input interface 130, the search action sensing module 141 may generate a captured image by capturing the screen currently displayed on the display 110, and collect a coordinate corresponding to one point of the display 110 selected by a user in accordance with the input signal which is additionally acquired through the user input interface 130.

The object area detection/classification module 144 may detect an object area related to the object from the captured image, based on the captured image and the collected coordinate, and store the object area in the memory 120. In this case, the detected object area may include, for example, an image corresponding to the object area from among the captured image. The object area detection/classification module 144 may determine the category of the object (or the classification of the object) corresponding to the detected object area. For instance, the object area detection/classification module 144 may determine the category of the detected object as one of face, goods, clothing, or food.

According to various embodiments, the object area detection/classification module 144 may be selectively provided in one of object recognition devices C. In this case, an object area detection/classification module 201 of the object recognition device C may correspond to the object area detection/classification module 144 of the electronic device A.

The object area detection/classification module 144 may be divided into a plurality of modules. In this case, the object area detection module may be configured to operate in the electronic device A, and the object area classification module may be configured to operate in an external device such as the object recognition device C.

The face detection module 145 may acquire an image including the face of the user who is using the electronic device A, by controlling the camera 160 provided in the electronic device A, detect the user's face from the image, and store information regarding the detected face (e.g., facial image, facial video, etc.) in the memory 120. For instance, the face detection module 145 may acquire facial information as context information which is acquired in accordance with the selection of the object and store the facial information in the memory 120.

The search result acquisition module 146 may transmit the detected object area and/or the context information (e.g., peripheral information or facial information) to at least one external device through the communicator 150. For example, the search result acquisition module 147 may transmit the object area of the captured image detected through the detection/classification module 144 to the object recognition device C, and transmit the facial information regarding the face detected through the face detection module 146 to the user characteristic recognition device D.

The search result acquisition module 146 may acquire a search result related to the object as a result of transmitting the object area and the context information to an external device. For instance, the search result acquisition module 146 may acquire a search result related to the object from the recommendation device B.

The user UI module 143 may control the display 110 such that a search result related to the object, which is acquired by the search result acquisition module 146, is provided to the user.

The object recognition device C may include the object area detection/classification module 201, a detailed object recognition module 202, and a context recognition module 203.

The object area detection/classification module 201, when receiving a captured image and a coordinate selected by a user from the electronic device A, may detect an object area selected by the user from the captured image, based on the captured image and the collected coordinate, and determine the category of the object (or the classification of the object) corresponding to the detected object area. For instance, the object area detection/classification module 201 may determine the category of the detected object as one of face, goods, clothing, or food.

The object area detection/classification module 201 may be configured separately, and the object area detection module may be configured to operate in the electronic device A and the object area classification module may be configured to operate in the object recognition device C. In this case, the object area detection module of the electronic device may detect the object area selected by the user from the captured image and transmit information regarding the object area to the object recognition device C, while the object area classification module of the object recognition device may determine the category of the object area using the received information regarding the object area.

The object recognition device C may have a plurality of detailed object recognition modules corresponding to each of a plurality of object categories.

In this case, when the object category is determined, the detailed object recognition module 202 corresponding to the object category may recognize the detected object area in greater detail. For instance, the detailed object recognition module 202 may recognize the object area and the acquired object information regarding the object area. Specifically, if the object category related to the object area detected from the object area detection/classification module 201 is a face, the detailed object recognition module 202 may recognize the face of a person as object information.

In particular, the object recognition device C may estimate the object information related to the object area using the detected object area as input data of the trained object recognition model. The trained object recognition model, for example, may be a neural network or deep learning-based recognition model. In addition, the object recognition device C may estimate the object information related to the object area by analyzing the detected object area through a rule-based object recognition model.

According to various embodiments, the object area detection/classification module 201 may be selectively provided in one of the electronic device A and the object recognition device C. In this case, the object area detection/classification module 201 of the object recognition device C may correspond to the object area detection/classification module 144 of the electronic device A. For instance, the object area detection/classification module 201 may be provided in the electronic device A, and the detailed object recognition module 202 may be provided in the object recognition device C. Alternatively, both the object area detection/classification module 201 and the detailed object recognition module 202 may be provided in the electronic device A or the object recognition device C.

The object recognition device C may include a peripheral information recognition module 203, which recognizes peripheral information related to the object.

The peripheral information recognition module 203 may acquire peripheral information related to the object. Specifically, the peripheral information recognition module 203 may acquire information related to the object from among peripheral information around the object as peripheral information. For instance, if the selected object 111 (FIG. 1) is a word or an image included in the document displayed on the screen, the peripheral information acquired based on the selection of the object 111 is information obtained from the screen where the object is displayed, and the information which is most relevant to the object 111 or information which is most useful to distinguish the object from other objects may be determined as peripheral information.

The peripheral information recognition module 203 may determine (or estimate, decide) peripheral information using a peripheral information recognition module which is a trained model. For instance, the object recognition device C may determine peripheral information related to the object by using an image regarding a peripheral area of the object on the screen where the object is displayed as input data of the trained peripheral information recognition model. The trained object recognition model, for example, may be a neural network or deep learning-based recognition model.

In addition, the peripheral information recognition model 203 may determine (or estimate, decide) peripheral information using a rule-based peripheral information recognition module. For instance, the object recognition device C may determine peripheral information related to the object by analyzing an image regarding a peripheral area of the object on the screen where the object is displayed through a predefined rule.

According to various embodiments, a word having the highest degree of relevance to the object may be acquired as the peripheral information through a peripheral information recognition model. In this case, the peripheral information recognition model may be a model trained using the object and the peripheral information of the object as learning data. For instance, a word having the highest degree of relevance to the object may be determined as the peripheral information having the highest probability based on the probability that the object and the peripheral information are displayed on one screen or the probability that the peripheral information is retrieved together when searching the object.

For instance, if the object selected by the user is an image of the 'Eiffel Tower' or the text of the 'Eiffel Tower', the peripheral information recognition module 203 may determine 'travel', 'history' and 'architectural information' as the peripheral information having the highest relevance to the object as a result of applying the peripheral information of the object to the peripheral information recognition model.

Alternatively, if the object selected by the user is the image or text of a 'famous singer', the peripheral information recognition module 203 may determine 'concert', 'album', and 'song title' as the peripheral information having the highest relevance to the object as a result of applying the peripheral information of the object to the peripheral information recognition model.

In another embodiment, information which may be used to more accurately distinguish the object 111 from other similar objects may be acquired through the peripheral information recognition model. The examples of the information which may be used most accurately to distinguish the object 111 from other similar objects include a word having a positive/negative attribute for the object. The peripheral information recognition model may be a model which is trained by using a word having a positive/negative attribute out of the object and information related to the object as learning data. The word having a positive/negative attribute is information regarding an attribute which allows the object to be distinguished from other objects. In this case, the peripheral information recognition model may be the same recognition model as the peripheral recognition model which estimates the relevance between the object and the peripheral information or a different recognition model.

For instance, if the object selected by the user is the image or text of a 'car', the peripheral information recognition module 203 may determine a word which is highly relevant to the object of a 'car' and has a positive/negative attribute, such as 'fuel efficiency', 'sales volume', and 'price' as the peripheral information regarding the object as a result of applying the peripheral information of the object to the peripheral information recognition model.

Alternatively, if the object selected by the user is the image or text of 'home appliance', the peripheral information recognition module 203 may determine a word which is highly relevant to the object of 'home appliance' and has a positive/negative attribute, such as 'power consumption', 'mounted function' or 'price' as the peripheral information regarding the object as a result of applying the peripheral information of the object to the peripheral information recognition model.

Another example of the information which may be used to more accurately distinguish the object 111 from other similar objects is additional identification information of the object. The additional identification information of the object may be acquired as peripheral information for distinguishing the object from other objects when entering information regarding the object using the trained peripheral information recognition model. In this case, a plurality of additional identification information may be obtained, the information which may be most useful among the plurality of additional identification information based on a probability is selected. In this case, a plurality of peripheral information is acquired from an image regarding a peripheral area in the screen where the object is displayed, and the peripheral information having the highest probability based on the probability among the acquired plurality of peripheral information is selected as additional identification information.

If the object selected by the user is an image corresponding to 'a person's face' or a text corresponding to 'a person's name', the peripheral information recognition module 203 may determine 'occupation', 'gender' and 'age' as additional identification information as a result of applying the peripheral information of the object to the peripheral information recognition model.

Alternatively, if the object selected by the user is the image of 'a car' or 'a product', the peripheral information recognition module 203 may determine 'manufacturer', 'model name' and 'specification', as additional identification information, as a result of applying the peripheral information of the object to the peripheral information recognition model.

If the object selected by the user is an image of 'an architecture' or 'a place', the peripheral information recognition module 203 may determine 'architecture name or place name', 'area name or country name', or 'other landmarks', as additional identification information, as a result of applying the peripheral information of the object to the peripheral information recognition model.

In various embodiments, the peripheral information recognition model may be trained such that the peripheral information of the object is determined based on the type of object. In this case, the peripheral information recognition model may be trained through supervised learning to determine the most useful information for distinguishing other objects which are similar to the object.

In addition, the peripheral information recognition model may be trained through supervised learning to determine the type of the peripheral information of the object based on the type of object such that the detailed information suitable for the type of object can be retrieved. Further, relevance between the object and the peripheral information may be trained through non-supervised learning based on the frequency of peripheral information included in the document or the image where the object is included. In addition, the peripheral information recognition model may be trained through reinforcement learning using user feedback with respect to the search result.

The user characteristic recognition device D may receive facial information from the electronic device A. For instance, the user characteristic recognition device D may receive facial information regarding a user's face, which is detected by the face detection module 146 of the electronic device A, from the electronic device A through the communicator 150 of the electronic device A.

The user characteristic recognition device D may determine the characteristic of the user from the received facial information and store the user's characteristic information. Examples of the user's characteristic information include, for example, age, gender, facial expression of the user, etc.

In particular, the user characteristic recognition device D may estimate the user characteristic information related to the facial information by using the facial information as input data of the trained face recognition model. The trained face recognition model may be, for example, a neural network or a deep learning-based recognition model.

An additional data collection device E may collect, for example, the user profile of the electronic device A, the usage history information of the electronic device, or feedback from the user, obtained from the electronic device A.

The user profile is user information previously registered by the user in the electronic device A and may include, for example, at least one of name, gender, ID, preferred category and biometric information (e.g., height, weight, medical history, etc.) of the user. The usage history information may include, for example, object search history of the user, feedback history regarding search results or product purchase history. The user feedback may include, for example, at least one of a user feedback regarding a search result related to the object and a user feedback regarding object information. Specifically, the user feedback regarding a search result related to the object may include, for example, whether to additionally select a search result regarding the object, whether the user has accessed a website related to the object, whether the user stores or shares a search result related to the object, whether the user has purchased a product related to the object, etc. The user feedback regarding the object information may include, for example, information regarding whether the user has confirmed the object information, information regarding the user's modification of the object information, information regarding the user's reselection of the object.

The recommendation device B may provide a search result related to the object using at least one of object information, context information (peripheral information), and context recognition information. For instance, the recommendation information device B may use at least one of the object information, context information, and context recognition information received from the object recognition device C, and may also use the user's characteristic information and/or additional data received from the user characteristic recognition device D, and/or the additional data collection device E.

More specifically, the recommendation device B may request a separate search engine to perform a search using the received object information, context information, and context recognition information. The recommendation device B may provide a search result received from a search engine to the electronic device A by applying a priority. For instance, the recommendation device A may apply a priority to a search result using the user's characteristic information and/or additional data and provide the same to the electronic device A. In other words, the context information may be used to acquire a search result related to the object, or may be used to prioritize search results by applying a priority to the search results related to the object.

The search engine is software which operates in a server used/maintained/managed by a search service provider, and receives object information and/or context information from an external device (e.g., the recommendation device B) as a search word. Once receiving a search request, the search engine may search data related to the search word from among data which is collected and stored in advance and provide the retrieved data to the external device.

The recommendation device B may provide a search result by using not only the object information but also at least one of the context information of the object, the user's characteristic information and additional data and thus, a search result matching the user's intention can be provided.

The camera 160 may photograph or capture an image. In particular, the camera 160 may photograph or capture the face of the user who is using the electronic device A and acquire an image including the user's face in order to acquire a facial image of the user, as context information.

Figure 3:
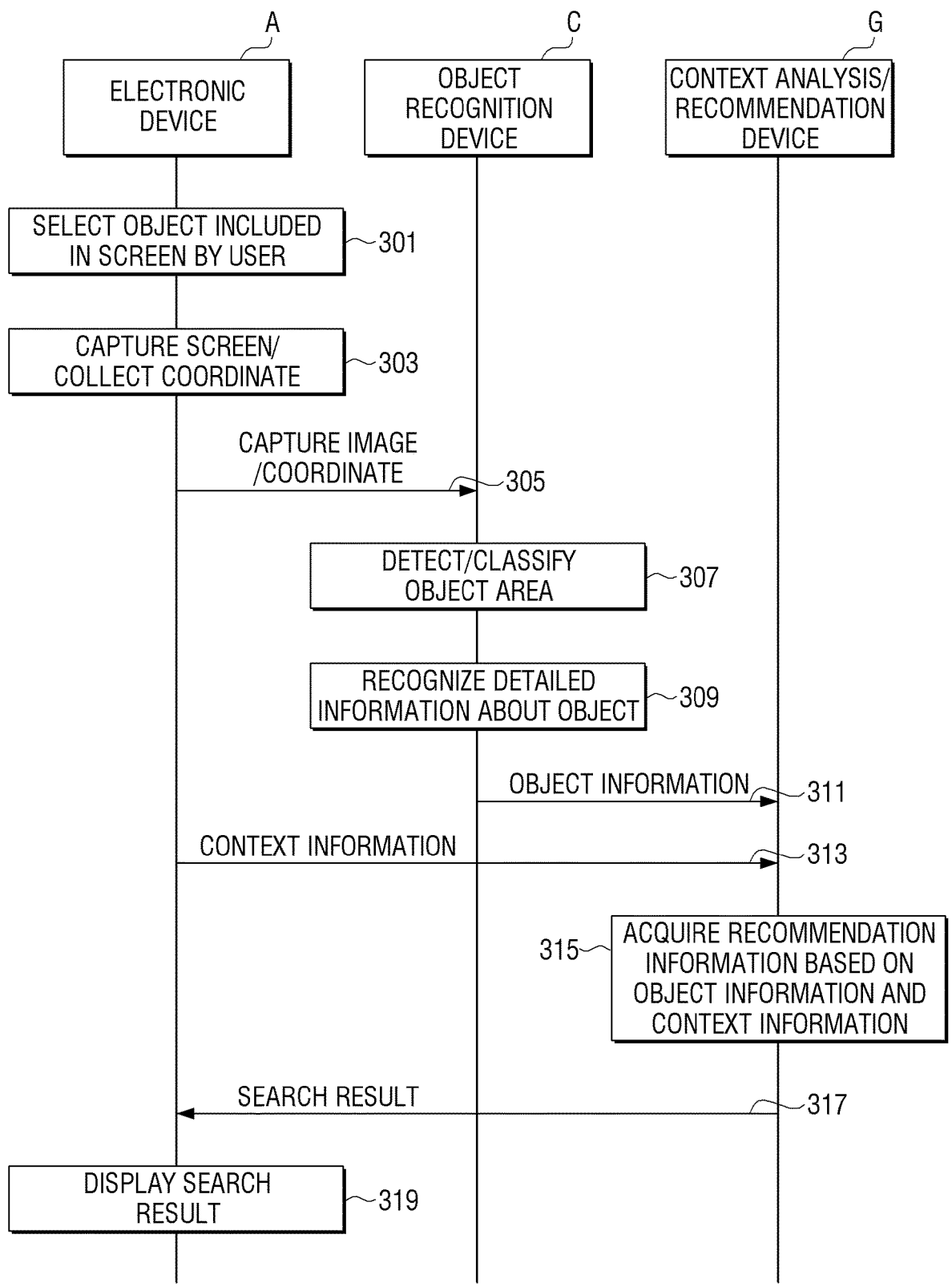
FIGS. 3 to 5 are flow diagrams illustrating a network system providing search results, according to various embodiments.

FIG. 3 is a flow diagram illustrating a process of providing a search result by a network system including the electronic device A, according to various embodiments.

Referring to FIG. 3, the user of the electronic device A may select an object included in the screen (in operation 301). For instance, the user may select an object by performing a predefined action or an action defined by the user (e.g., long-touch, multi-touch, pen action, etc.).

In response to a user input, the screen capture/coordinate collection module 142 may capture the screen including the object and collect a coordinate (e.g., a touch coordinate) corresponding to the point selected by the user (in operation 303).

The electronic device A may transmit the image capturing the screen and the collected coordinate to the object recognition device C (in operation 305). In this case, the object recognition device C may be provided in the electronic device A, or may be provided in a separate server which is communicatively connected to the electronic device A.

The object area detection/classification module 201 of the object recognition device C may detect an object area corresponding to the selected coordinate in the captured image based on the received captured image and the selected coordinate and classify the object area (in operation 307). In this case, the object category may be one of figure, character, goods, place, plant and food, and the object category may be defined differently according to the application services provided by the electronic device A.

According to various embodiments, the object area detection/classification module 144 of the electronic device A may detect an object area corresponding to the selected coordinate in the captured image based on the received captured image and the selected coordinate and classify the object area. In this case, the electronic device A may transmit the object area and the object category to the object recognition device C.

According to various embodiments, the object area detection module 144 of the electronic device A may detect an object area, and the electronic device A may transmit the detected object area to the object recognition device C. In this case, the object area classification module 201 of the object recognition device C may determine the object category of the object area.

The object area detection/classification module 201 may transmit the object area to a detailed object recognition module from among a plurality of different detailed object recognition modules based on the classified object category. The type of the detailed object recognition modules include a face object recognition module, a product object recognition module, a character object recognition module, a place object recognition module, and a food object recognition module.

The detailed object recognition module 202 of the object recognition device C may recognize the object area and acquire object information in greater detail than the category of the object classified in the object area detection/classification module 201 (in operation 309). For instance, the face object recognition module may acquire the name of a person as object information, and the product object recognition module may recognize the ID of a product as object information.

Meanwhile, the detailed object recognition module 202 may perform more detailed classification, and acquire object information based on the classified detailed category. For instance, the product object recognition module may perform detailed classification by classifying the category of goods as fashion, bag, shoes, hat, packaged goods, or fresh food. The detailed object recognition module 202 may acquire object information by recognizing an object in the detailed category.

Once the object information is acquired, the object recognition device C may transmit the acquired object information to a context analysis/recommendation device G (in operation 311). The context analysis/recommendation device G may correspond to at least one of the recommendation device B and the peripheral information recognition module 203 of the object recognition device C, mentioned above.

The context analysis/recommendation device G may acquire context information which is acquired in accordance with the selection of the object (in operation 313). For instance, the context analysis/recommendation device G may acquire at least one of peripheral information located around the object in the screen where the object is included and photographing information photographed by a camera provided in the electronic device A as context information which is obtained based on the selection of the object transmitted from the electronic device A.

The context analysis/recommendation device G may obtain recommendation information as a search result related to the object, based on the object information and the context information, which is acquired at the time of the user's selection of the object (in operation 315). In this case, the context analysis/recommendation device G may acquire optimum recommendation information by analyzing the object information and the context information.

For instance, the object information regarding the user selected object may include the name of a famous person, and the context information may include text information located around the user selected object. In this case, the context analysis/recommendation device G may analyze the text information and acquire a concert ticket as a search result related to the object.

In another example, if the object information is information related to a product, and the usage history information of the electronic device A is the history information of a user's selecting a product and making price comparison continuously, the context analysis/recommendation device G may acquire price comparison information as a search result related to the object.

In another example, if the object information is information regarding a product, and the usage history information of the electronic device A includes the user's preference information or the user's interest information as purchase history information, the context analysis/recommendation device G may acquire information matching the taste (e.g., style of clothes) of the products previously purchased by the user as a search result related to the object.

In another example, the context information may be information photographed or captured by a camera provided in the electronic device A. In this case, if the analyzed information is information representing age, appearance, gender, facial expression, or mood, as the user characteristics information, the context analysis/recommendation device G may acquire a search result related to the object based on the age, appearance, gender, facial expression, or mood of the user.

In another example, the object information may be information related to a product, and the context information may be text information located around the object. In this case, if the text information already includes price information, the context analysis/recommendation device G may determine that the user is more interested in the detailed information such as the specification of the product than the price information of the product, and acquire the specification information of the product.

Subsequently, the context analysis/recommendation device G may transmit a search result related to the object to the electronic device A as recommendation information (in operation 317). In this case, the recommendation information may include a customized search result related to the object which matches the user's intention of selection. The electronic device A may display the received search result related to the object on a display area as recommendation information (in operation 319).

Figure 4:
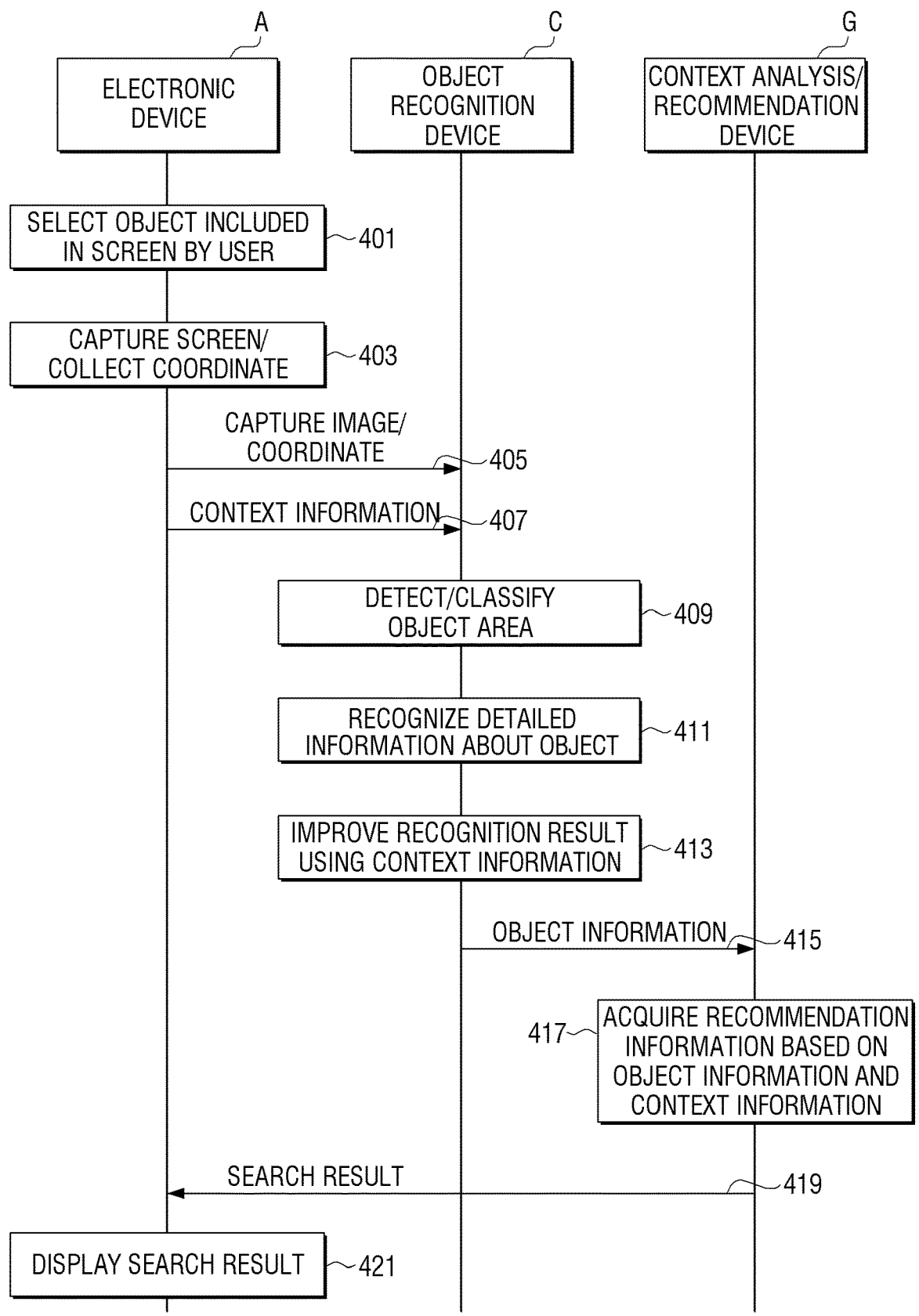

FIG. 4 is a flow diagram illustrating a process of providing a search results by a network system including the electronic device A, according to various embodiments.

In FIG. 4, the operations 401 to 405 of transmitting the captured image and the collected coordinate to the object recognition device C according to the user's selection of the object correspond or are similar to the operations 301 to 305 of FIG. 3 and thus, further description thereof will not be provided for simplicity.

Meanwhile, the electronic device A may transmit not only the captured image and the collected coordinate but also the context information, to the object recognition device C. In this case, the context information may be peripheral information (e.g., text information or image information) around the object selected by the user.

The object recognition device C may detect and classify an object area (in operation 409). In addition, the object recognition device C may recognize the object area in detail in consideration of the classified category (in operation 411). In this case, the object recognition device C may improve a recognition result by recognizing the object area utilizing the context information received in the operation 407 (in operation 413).

The object recognition device C may acquire object information as an improved recognition result, and transmit the acquired object information to the context analysis/recommendation device G (in operation 415).

Once the context analysis/recommendation device G transmits the search result related to the object to the electronic device A based on the received object information, the electronic device A may display the search result in the display area. The operations 417 to 421 correspond to or are similar to the operations of 315 to 319 in FIG. 3 and thus, further description thereof will not be provided for simplicity.

Figure 5:
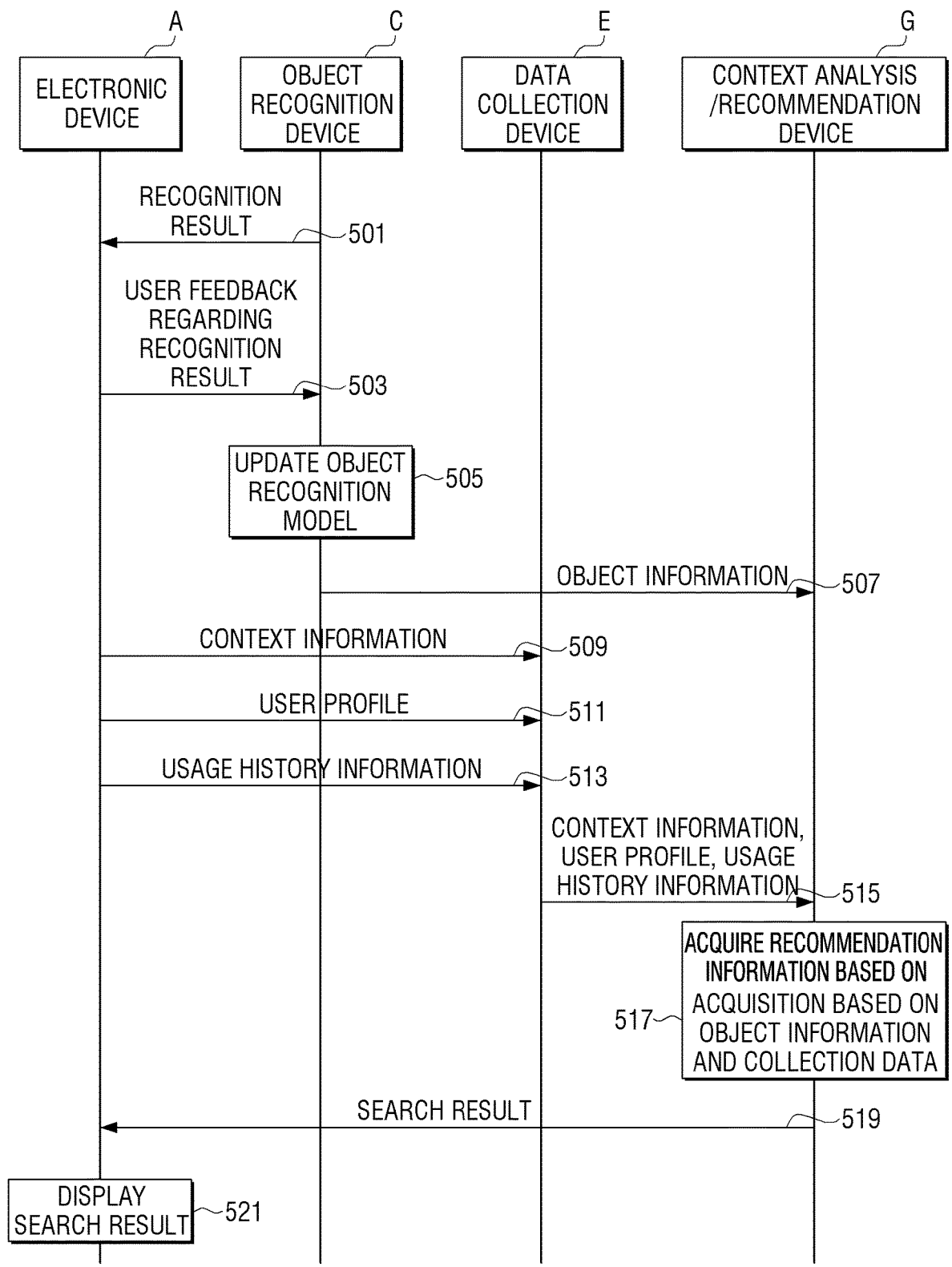

FIG. 5 is a flow diagram illustrating a process of providing a search result by a network system including the electronic device A, according to various embodiments.

In FIG. 5, the object recognition device C may transmit a recognition result (e.g., object information) of the object area corresponding to the object selected by the user to the electronic device A (in operation 501).

In response to the above, the electronic device A may transmit user feedback regarding the recognition result to the object recognition device (in operation 503).

For instance, the electronic device A may acquire the recognition result of the object area received from the object recognition device C and display the same in the display area. The user may provide user feedback regarding the displayed recognition result. For instance, the user may input a response feedback regarding a pop-up asking to confirm the recognition result or whether the recognition result is what the user intended.

If the object recognition device C recognizes an object using the trained object recognition model, the object recognition model which recognizes the object may be updated using the received response feedback (in operation 505). In this case, the more feedback is received from the user with respect to the recognition result, the more the recognition function of the object recognition model can be improved.

According to various embodiments, even if there is no user feedback, the object recognition device C may train the object recognition model in supervised/non-supervised learning method by using the captured image or the object area transmitted by the electronic device A for object recognition.

The object recognition device C may transmit a recognition result (e.g., object information) which is an output value of the object recognition model to the context analysis/recommendation device G (in operation 507).

In addition, the electronic device A may transmit at least one of the context information, the user profile, and the usage history information, to the data collection device E (in operations 509-513).

The usage history information is the usage history information of the electronic device A and may include, for example, the usage history information regarding search results. The usage history information may include, for example, at least one of a purchase history of purchasing products based on the search result, a search result evaluation history with respect to the user and a history of searching for a search result or selecting a connection link. In addition, the data collection device E may collect the user characteristic information regarding a search result. In this case, the user characteristic information is information which is analyzed based on the information photographed by a camera after providing a search result, and may include information regarding the facial expression or mood of the user with respect to the search result. For example, if the search results are inaccurate, the user may frown or the user may smile if he found what he needed (search results are accurate).

The data collected by the data collection device E (e.g., context information, user profile, usage history information or user's characteristic information, etc.) may be transmitted to the context analysis/recommendation device G (in operation 515). The data collection device E may transmit the data to the context analysis/recommendation device G periodically (e.g., hourly or daily), or may transmit the data to the context analysis/recommendation device G when a specific event signal is generated (e.g., upon request of data).

The context analysis/recommendation device G may acquire a search result (recommendation information) related to the object which matches the user's intention based on the object information received from the object recognition device C (in operation 517) and the collection data (e.g., context information, user profile, user characteristic information, usage history of the user, etc.) received from the data collection device E.

In this case, the context analysis/recommendation device G may request a search engine to perform a search using the object information received from the object recognition device C and the collection data received from the data collection device E. The context analysis/recommendation device G may apply a priority to (or prioritize) search results received from the search engine and provide the same to the electronic device A. For instance, the context analysis/recommendation device G may acquire search results using the object information through the search engine, apply a priority to (or prioritize) the search results based on the usage history information (e.g., purchase history information, search history information, recognition result satisfaction information, etc.) and provide or recommend the same to the electronic device A. In other words, the context analysis/recommendation device G may assign a high priority to a search result having the usage history and provide or recommend the same to the electronic device A. In another example, if the usage history for the user using the electronic device A includes the usage history (e.g., purchase history, search history, recognition result satisfaction, etc.) regarding the recognition result which is similar to the recognition result of the object area, the context analysis/recommendation device G may determine the user's main field of interest (purpose/goal) with respect to the recognition result using the usage history, and may provide or recommend customized information conforming to the user's intention, to the electronic device A based on the determination result.

Subsequently, when the context analysis/recommendation device G transmits the acquired search result related to the object to the electronic device A (in operation 519), the electronic device A may display the received search result in the display area (in operation 521).

Figure 6:
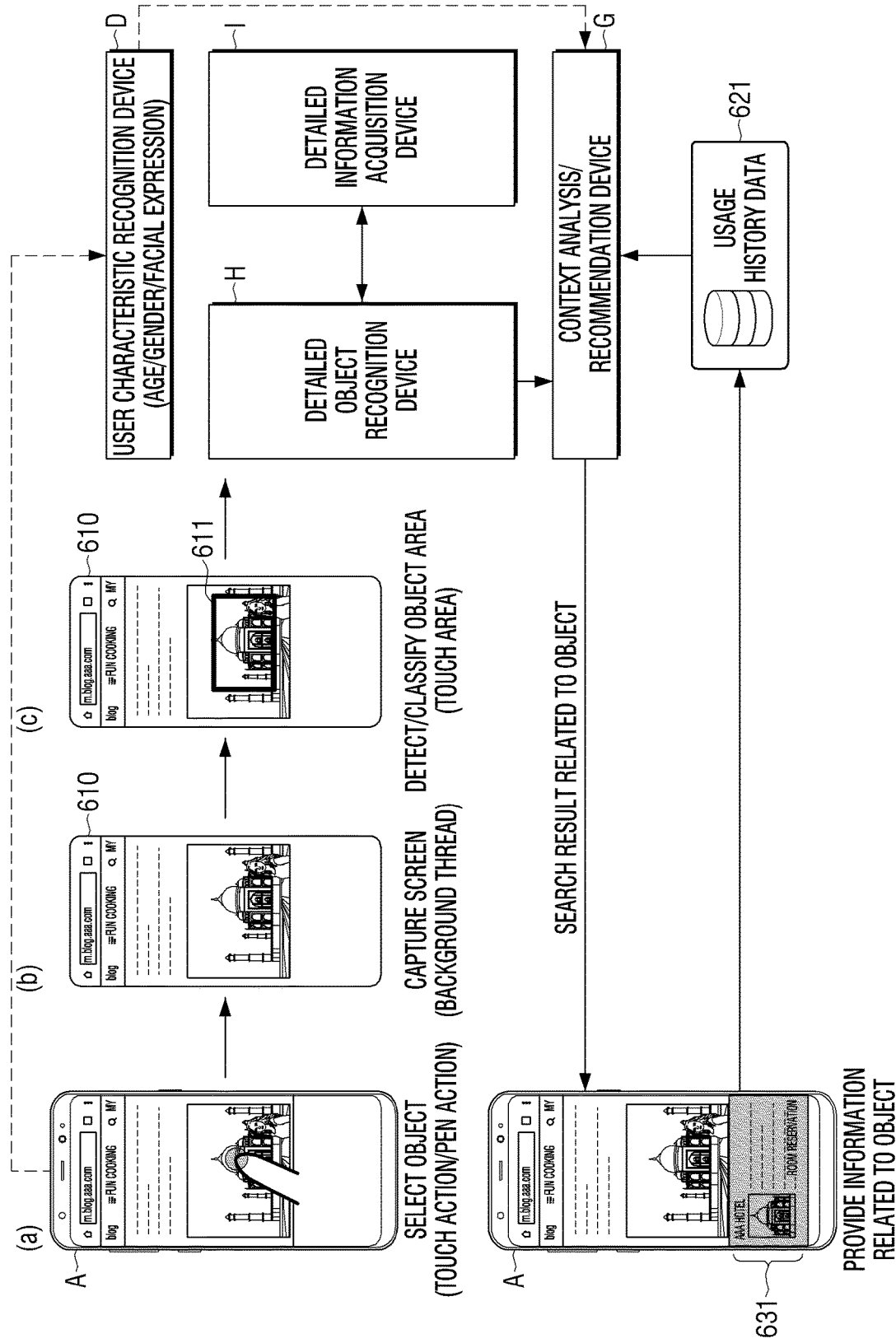
FIG. 6 is a view illustrating a process of providing a search result related to an object, according to various embodiments.

FIG. 6 is a view illustrating a process of providing a search result related to an object according to various embodiments.

First, referring to FIG. 6(a), the electronic device A may sense a user input of selecting an object included in the screen using a touch action by the user's finger, a touch pen, or a pen action. In response to the user input, as illustrated in FIG. 6(b), the electronic device A may generate a captured image 610 by capturing the screen including the object. In this case, the electronic device A may capture the screen through a background thread.

Referring to FIG. 5(c), the electronic device A may detect an object area 611 based on a touch coordinate corresponding to the selection of the user in the captured image 610. The electronic device A may recognize and categorize the object area 611. The electronic device A may transmit the object area to a detailed object recognition device H related to the classified category for the detailed object recognition. The detailed object recognition device H may, for example, correspond to the detailed object recognition module 202 of FIG. 2.

In addition, the electronic device A may transmit the photographing information captured by the electronic device A to the user characteristic recognition device D. The user characteristic recognition device D may recognize the user characteristic based on the received photographing information. For instance, the user characteristic recognition device D may recognize the age, gender, facial expression, and the like, of the user.

The detailed object recognition device H may recognize an object corresponding to the object area and acquire object information (e.g., object name, object identifier, detailed level of the object). The detailed object recognition device H may transmit the detailed information to a detailed information acquisition device I.

The detailed information acquisition device I may acquire detailed information regarding the object as the first search result related to the object information based on the received object information. The detailed information regarding the object may include general information or purchase information of the object. The general information may include, for example, the name, age, gender, career, etc. if the object is a person. The purchase information may include information regarding a product related to the person (e.g., concert ticket, book, recording, VOD, etc.) or information for purchasing the goods.

The detailed object recognition device may acquire detailed information regarding the object information from the detailed information acquisition device I, and transmit the detailed information to the context analysis/recommendation device G. Alternatively, the detailed information acquisition device I may directly transmit the detailed information regarding the object information to the context analysis/recommendation device G.

The context analysis/recommendation device G may acquire recommendation information as the second search result by using at least one of the object information or the detailed information received from the detailed object recognition device H, the user characteristic information received from the user characteristic recognition device D, the user profile received from the electronic device A, and the context information. For instance, the context analysis/recommendation device G may acquire optimum recommendation information based on peripheral information (e.g., text information, image information) around the object selected by the user and information regarding the user preference and interest which is analyzed using the usage history data 621 of the electronic device A.

In this case, the context analysis/recommendation device G may request a search engine to perform a search based on at least one of the object information and the detailed information received from the detailed object recognition device H, the user characteristic information received from the user characteristic recognition device D, the user profile received from the electronic device A, and the context information. The context analysis/recommendation device G may provide a search result preferred by the user with respect to the search results received from the search engine to the electronic device A. For instance, the context analysis/recommendation device G may acquire search results using the object information and the detailed information through the search engine, determine a search result preferred by the user from among the search results based on the user characteristic information (e.g., gender, age, mood, facial expression, etc. of the user), the user profile (e.g., preferred field, search history, purchase history, etc. of the user) and the context information, and provide or recommend the same to the electronic device A. Alternatively, the context analysis/recommendation device G may determine a priority of the search results based on at least one of the user characteristic information, the user profile, and the context information, and provide or recommend the same to the electronic device A.

Subsequently, the context analysis/recommendation device G may transmit a search result related to the object, which is the acquired recommendation information, to the electronic device A.

The electronic device A may provide a user with the received search result 631 related to the object through a screen.

Figure 7:
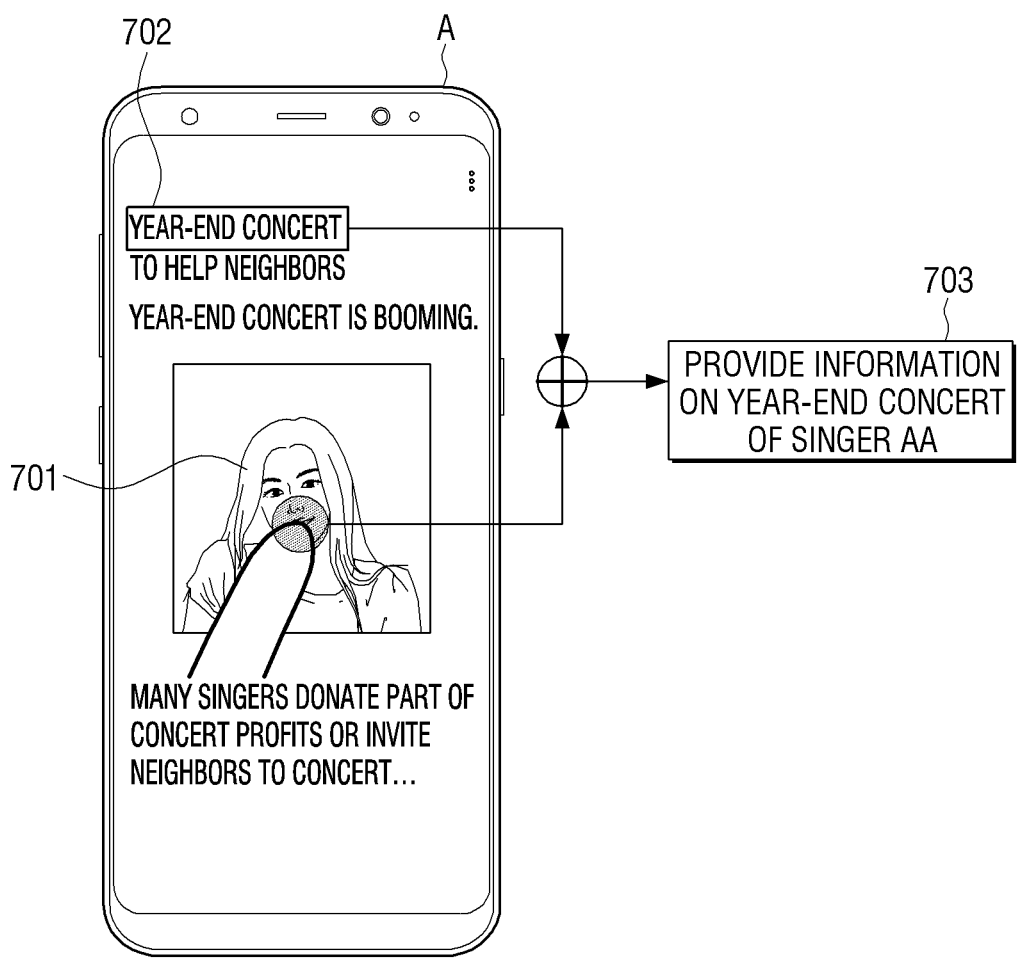
FIG. 7 is a view illustrating a search result related to an object using peripheral information, according to various embodiments.

FIG. 7 is a view illustrating providing a search result related to the object using peripheral information, according to various embodiments.

In FIG. 7, the electronic device A may provide a search result 703 related to the object based on selected object 701 and peripheral information (e.g., text, image, etc.) 702 around the object. For instance, a newspaper article including an image and a text may be displayed on the electronic device A. In this case, if the user selects the face 701 of a specific singer, the object recognition device C may analyze the selected face in the image and acquire the name of the specific singer corresponding to the face as the object information.

The object recognition device C may analyze a text of the newspaper article including the image and acquire a keyword of 'year-end concert' 702 from the entire contents of the newspaper article as the context recognition information related to the specific singer. In this case, the context analysis/recommendation device G may use each of 'the name of the specific singer' and 'the year-end concert' received from the object recognition device C, as a search query. For instance, the context analysis/recommendation device G may request a search engine to perform a search regarding the related information using the queries such as the search query noted above. Subsequently, the context analysis/recommendation device G may receive search results based on the query from the search engine. The object recognition device C may selectively provide the received search results using the user characteristic information, the additional data, etc.

According to various embodiments, the object recognition device C may infer a word having the highest degree of relevance to the object from the entire contents of the document including the object or the sentence around the object in order to derive the context recognition information related to the object. In addition, the object recognition device C may infer a place or a time at which the image including the object is estimated to have been photographed. In this case, the object recognition device C may infer context recognition information related to the object using the peripheral information of the object as input data of the trained peripheral information recognition model. The trained peripheral information recognition model may be, for example, a neural network or a deep learning-based recognition model.

FIGS. 8A-8C are views illustrating selecting of an object using an electronic device according to various embodiments.

For instance, as illustrated in FIG. 8A, a user may touch (e.g., long-touch or multi-touch) one point 801 of the display area where an object is displayed in order to select the object. Alternatively, as illustrated in FIG. 8B, the user may draw (drawing part 803) on the display area where the object is displayed using an electronic pen (draw around the object).

Alternatively, as illustrated in FIG. 8C, the electronic device A may display a UI (e.g., icon) 805 providing a search result related to the object on the screen. For instance, if the user withdraws an electronic pen from the electronic device A, the electronic device A may display the UI 805 which provides a search result related to the object based on an event generated as a result of the withdrawal of the electronic pen. In another example, according to the user input of a drag from the edge (e.g., edge area) of the display area towards the center, the electronic device A may display the UI 805 providing a search result related to the object.

In this case, if the user selects the UI 805, the electronic device A may capture the screen including the object, which has been displayed on the display area before the UI is displayed, and as illustrated on the left in FIG. 8C, the electronic device A may display the captured image as a result of capturing the screen. Once the captured image is displayed, for example, the user may select the object by drawing an area 807 in the captured image using an electronic pen, as illustrated on the right in FIG. 8C.

FIGS. 9A-9E are views illustrating a search result related to an object, according to various embodiments.

Figure 9A:
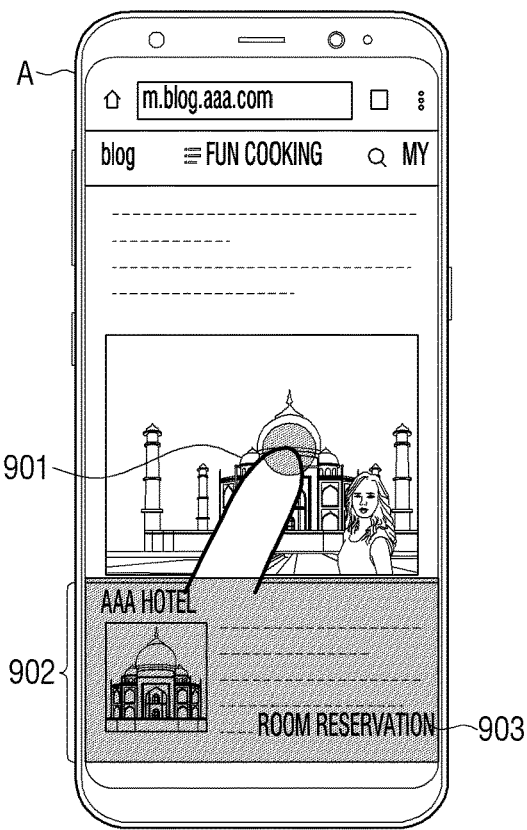
FIGS. 9A-9E are views illustrating a search result related to an object, according to various embodiments.

For instance, referring to FIG. 9A, if the user selects an architecture 901 which is an object, the electronic device A may display detailed information 902 regarding the architecture on a part of the display area, as a search result related to the object. In this case, if the architecture is a building where accommodation is possible, the electronic device A may also display a UI element 903 for receiving a room reservation, etc., as a search result.

Figure 9B:
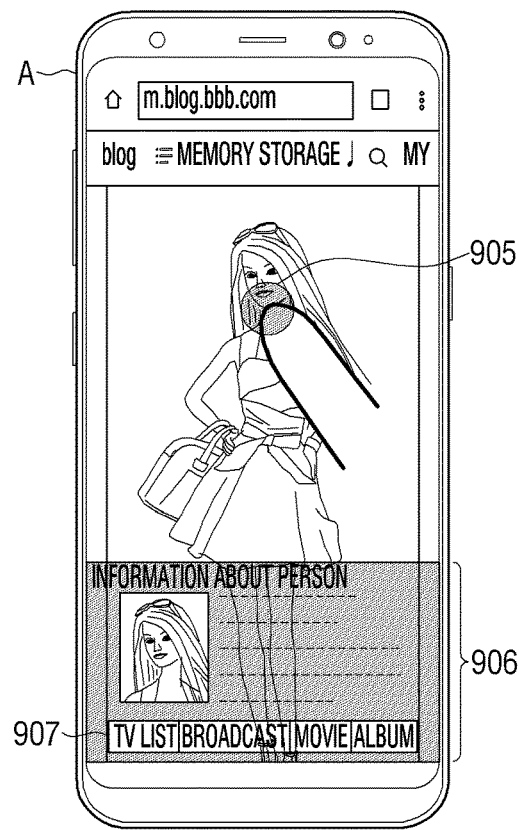

In another example, referring to FIG. 9B, if the user selects a celebrity 905, the electronic device A may display profile information 906 of the celebrity on a part of the display area, as a search result. In this case, the electronic device A may also display a UI element 907 for providing another search result related to the object.

For instance, if the object is a celebrity, the electronic device A may also display a UI element for selecting a search category such as user profile, broadcasting information, movie appearance information, album information, performance information, etc. In this case, if the user input of selecting the broadcasting information is received, the electronic device A may display a search result related to the broadcasting information on a part of the display area.

Meanwhile, the UI element for selecting the respective category information may be displayed in a sequential order according to the priority of the search results. For instance, if there are a plurality of search categories matching the user's intention, the UI elements for selecting the respective category information according to the priority which is most suitable for the user's intention can be sequentially listed.

Figure 9C:
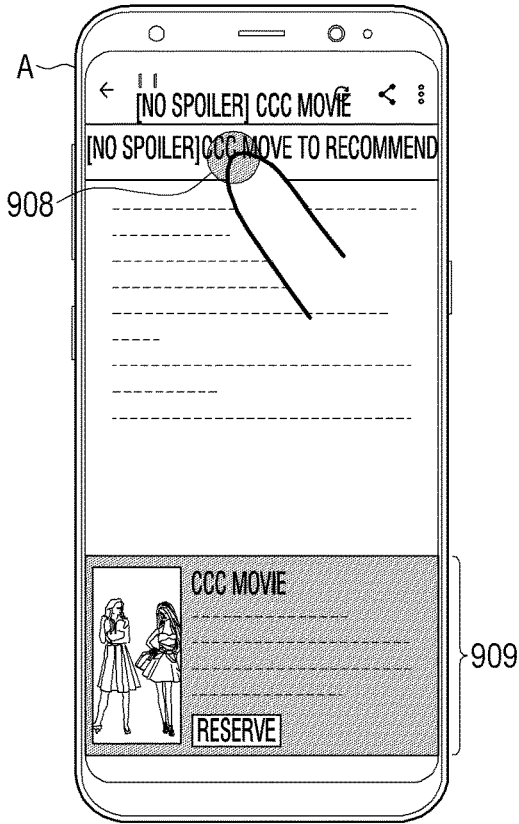

In another example, referring to FIG. 9C, the user may select a text 908 as an object. For instance, if the text 908 is a movie title, the electronic device A may display at least one of movie-related content, rating, thumbnail image, teaser image, movie reservation UI element, etc., as a search result 909 related to the text 908 on part of the display area.

Figure 9D:
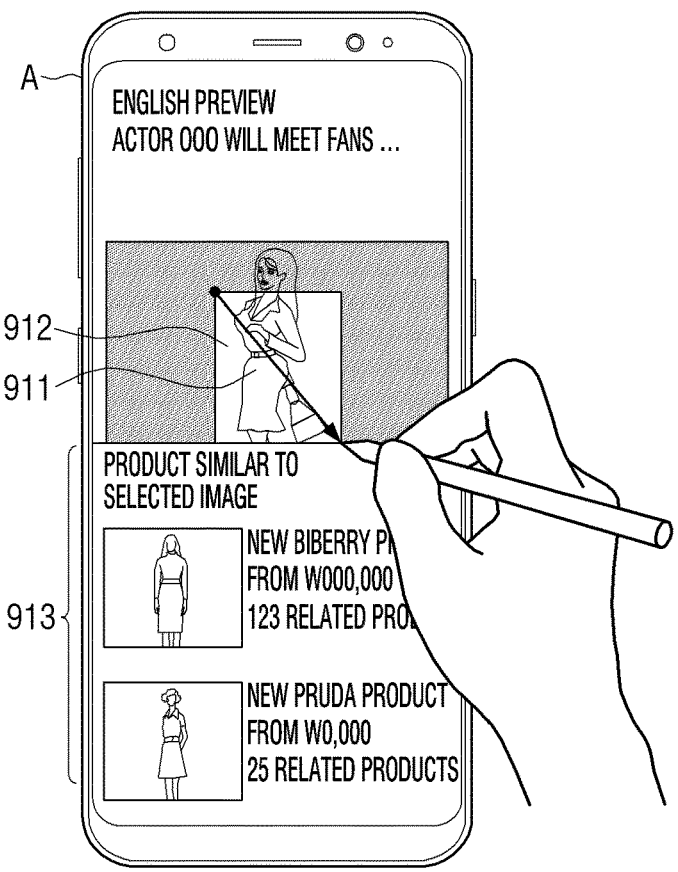

In another example, referring to FIG. 9D, the user may select an object 911 by dragging the object diagonally using an electronic pen. In this case, the electronic device A may highlight and display an object area 912 corresponding to the diagonal drag. In addition, the electronic device A may display detailed information 913 regarding the object on a part of the display area, as a search result related to the object 911. For instance, the electronic device A may regard the object 911 as a product, and display product price related to the object, seller, similar products, etc.

Figure 9E:
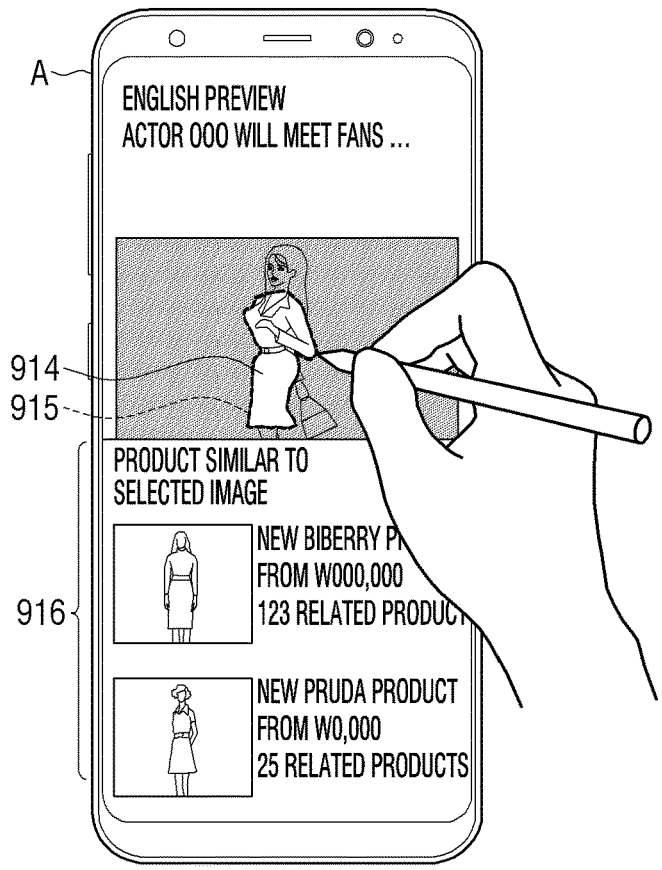

In another example, referring to FIG. 9E, the user may draw along the boundary of an object 914 using an electronic pen. In this case, the electronic device A may highlight and display an object area 915 which is segmented in accordance with the drawing input. In addition, the electronic device A may display detailed information 916 regarding the object on a part of the display area, as a search result related to the object.

Figure 10A:
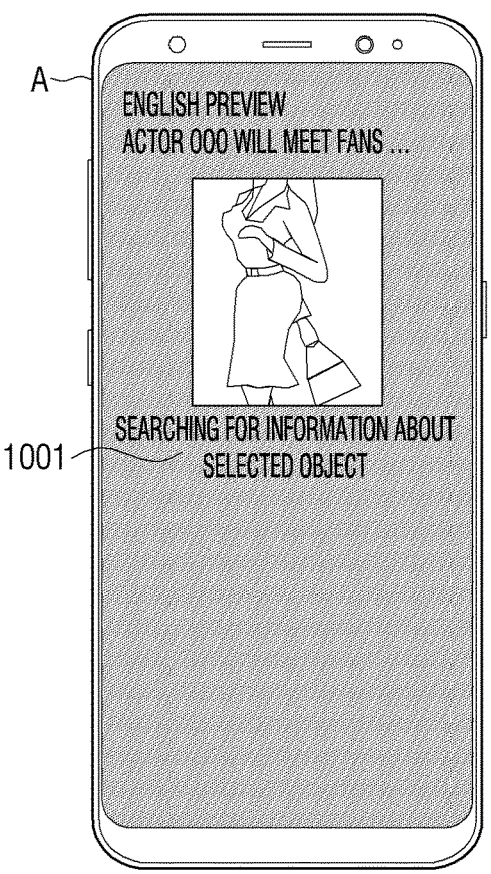
FIGS. 10A and 10B are views illustrating that a search result related to an object is being retrieved, according to various embodiments.
Figure 10B:
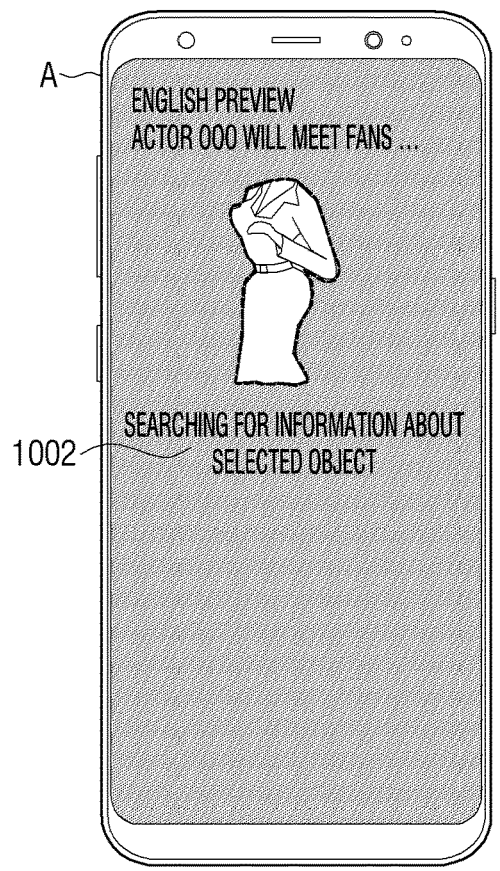

FIGS. 10A and 10B are views illustrating that a search result related to an object is being retrieved, according to various embodiments.

As illustrated in FIG. 9D, if the user selects an object, the electronic device A may display a message 1001 (e.g., search is being conducted) indicating that a search result related to the object is being retrieved along with the selected object, as a transition effect. Alternatively, as mentioned above with respect to FIG. 9E, if the user selects an object, the electronic device A may display a message 1002 indicating that a search result related to the object is being retrieved on the screen as illustrated in FIG. 10B.

As such, when the object area corresponding to the object selected by the user and the search status message are displayed, it is possible to provide the user with a feeling that the time to retrieve the search result related to the object is shortened.

FIG. 11 is a view illustrating a process of obtaining a search result related to an object, according to various embodiments.

For instance, referring to FIG. 11(*a*), the user may perform the user input of capturing a screen 1102 including an object 1101. According to the user input, as illustrated in FIG. 11(*b*), the electronic device A may generate a captured image 1103, and detect a text 1104, and an object area 1105, by performing text recognition (e.g., Optical Character Reader (OCR)) or image recognition with respect to the generated captured image 1103.

The electronic device A may provide a search result related to the object using the detected object area and text.

For instance, referring to FIG. 11(*a*), if the screen 1102 is a web page including the object 1101, the electronic device A may detect the object area 1105 and the text 1104 by analyzing the captured webpage based on text recognition and image recognition, and display product information 1106, which is a search result related to the object as context information. The product information 1106 may include, for example, a UI element (not shown) for purchasing a product related to the object. In this case, in response to the selection of the UI element, the electronic device A may display a product purchase screen on the display area.

FIG. 12 is a view illustrating a process of obtaining a search result related to an object using photographing information, according to various embodiments.

Referring to FIG. 12 (top portion) if the user selects an object 1201, the electronic device A may photograph the user who is selecting the object using a camera (e.g., a front camera).

The electronic device A may acquire the user characteristic information by using the photographing information, which is generated by photographing the user. For instance, the electronic device A may recognize the gender, age, facial expression, mood, etc. of the user based on the photographing information. Subsequently, the electronic device A may acquire a search result related to the object by using the object area corresponding to the selected object and the user characteristic information. As illustrated in FIG. 12 (bottom portion), a search result 1203 related to the object may be displayed on the display area.

Accordingly, a search result considering the user's characteristic and user' state can be provided and thus, the satisfaction of the user using the electronic device A can be increased.

Figure 13:
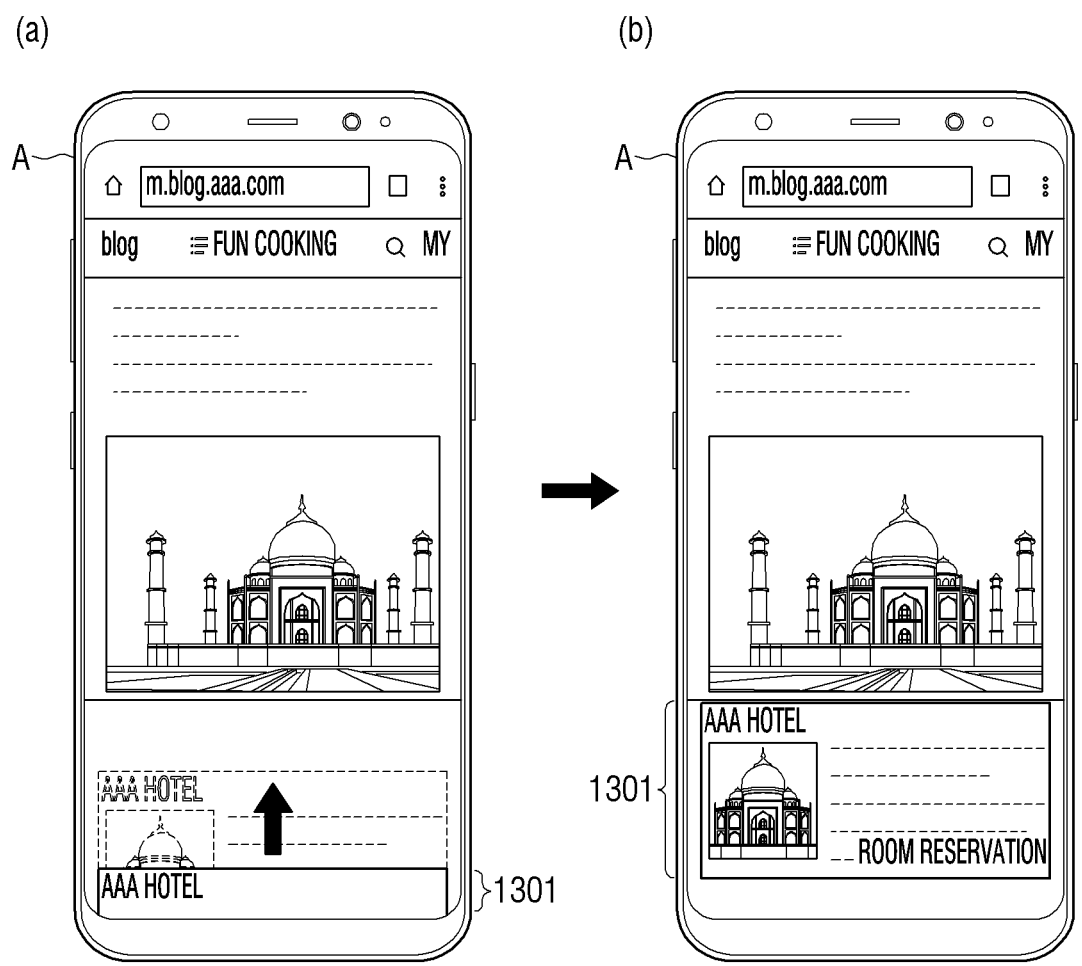
FIGS. 13 to 16C are views illustrating a process of providing a search result related to an object, according to various embodiments.

FIG. 13 is a view illustrating a process of providing a search result related to an object, according to various embodiments.

In FIG. 13, if the electronic device A provides a search result related to the object according to various exemplary embodiments, the electronic device A may include the search result in a pop-up screen and provide the same.

In this case, as illustrated in FIG. 13(a), a pop-up screen 1301 may gradually appear from one side of the display area and be displayed on a pre-defined part of the display area, as illustrated in FIG. 13(b). In this case, the pop-up screen 1301 may be displayed on the display area so as not to overlap the object.

Here, the display position of the pop-up screen 1301 may be determined according to the position of the selected object, and the size of the pop-up screen may be determined according to the size of the object on the screen and the size of the screen excluding the object on the entire screen. The background portion of the pop-up screen may be displayed transparently so that the screen containing the object is visible.

The method (not shown) of displaying a search result on the screen may include the method of displaying a search result on a part of the screen including the object so as not to overlap the selected object. In this case, the display position of the object may be changed so that the object and the search result do not overlap. For instance, if the search result is displayed in the lower area of the screen, the display position of the object may be changed so that the object is displayed in the upper area of the screen, and if the search result is displayed on the upper area of the screen, the display position of the object may be changed so that the object is displayed on the lower area of the screen.

Figure 14:
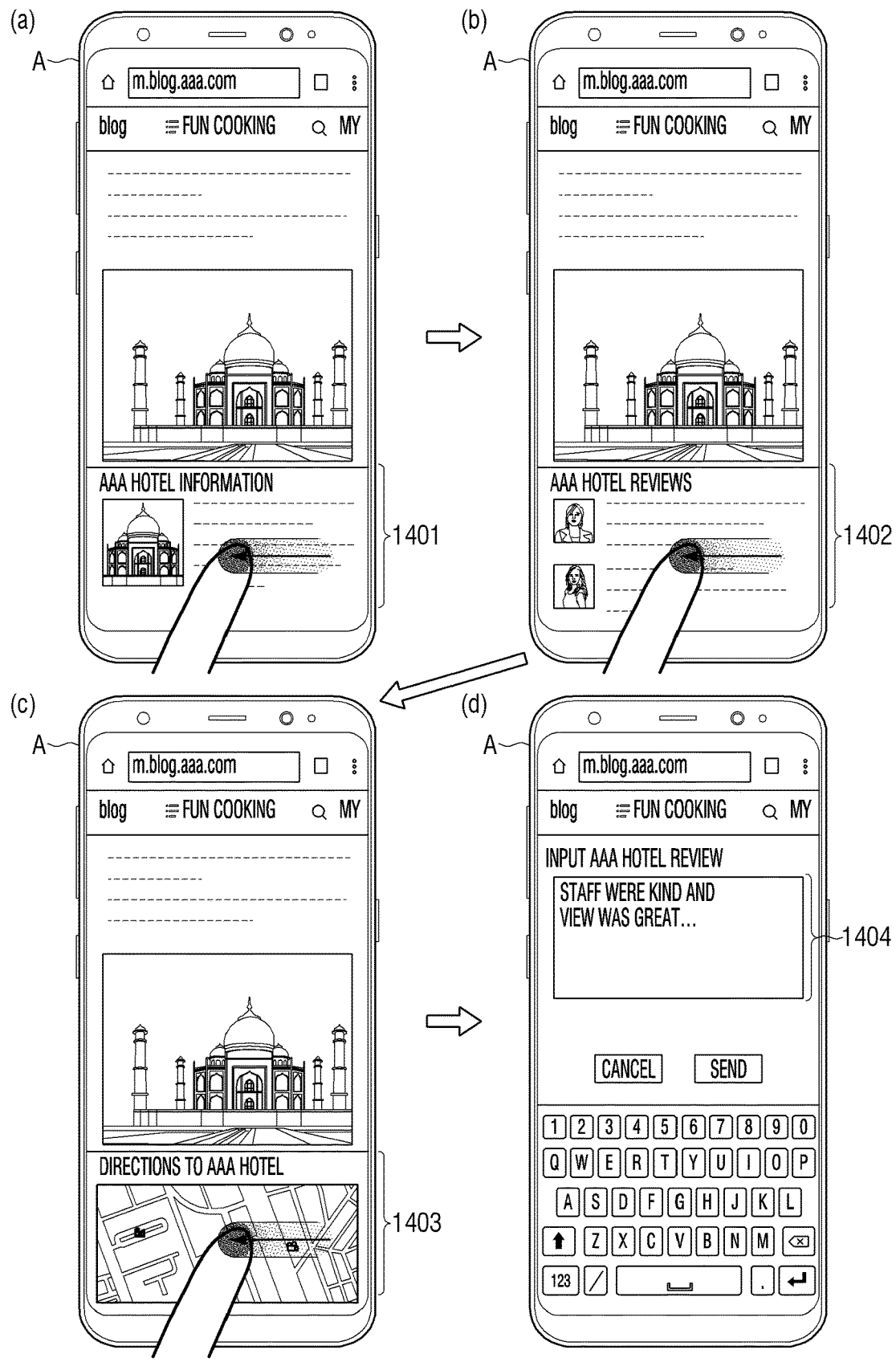

FIG. 14 is a view illustrating a plurality of search results related to an object, according to various embodiments.

In FIG. 14, the electronic device A may acquire a search result related to the object by searching a category, according to various exemplary embodiments. For instance, if the object selected by the user is a hotel building, the search category may include 'hotel information', 'hotel review', 'hotel location', etc. In this case, the electronic device A may provide search results corresponding to the search category sequentially based on the priority matching the user's intention according to the user input.

For instance, referring to FIG. 14(a), the electronic device A may display top ranking search results (e.g., hotel information) (1401) as a search result related to the object. In this case, if the user input (e.g., a swipe input) is received, as illustrated in FIG. 14(b), the electronic device A may display a search result of the second priority (e.g., hotel review) 1402.

Subsequently, if further user input is received (e.g., another swipe), the electronic device may display a search result of the next priority (e.g., hotel location) 1403 as illustrated in FIG. 14(c). If an additional user input is received, the electronic device A may display an input window 1404 for transmitting information (e.g., inquiry regarding hotel use or allowing the user to input/write a hotel review) as illustrated in FIG. 14(d). In this case, if the user creates a review in the input window and selects a send button, the electronic device A may transmit the input review to an external device (e.g., a manager mail server) related to the object.

Figure 15:
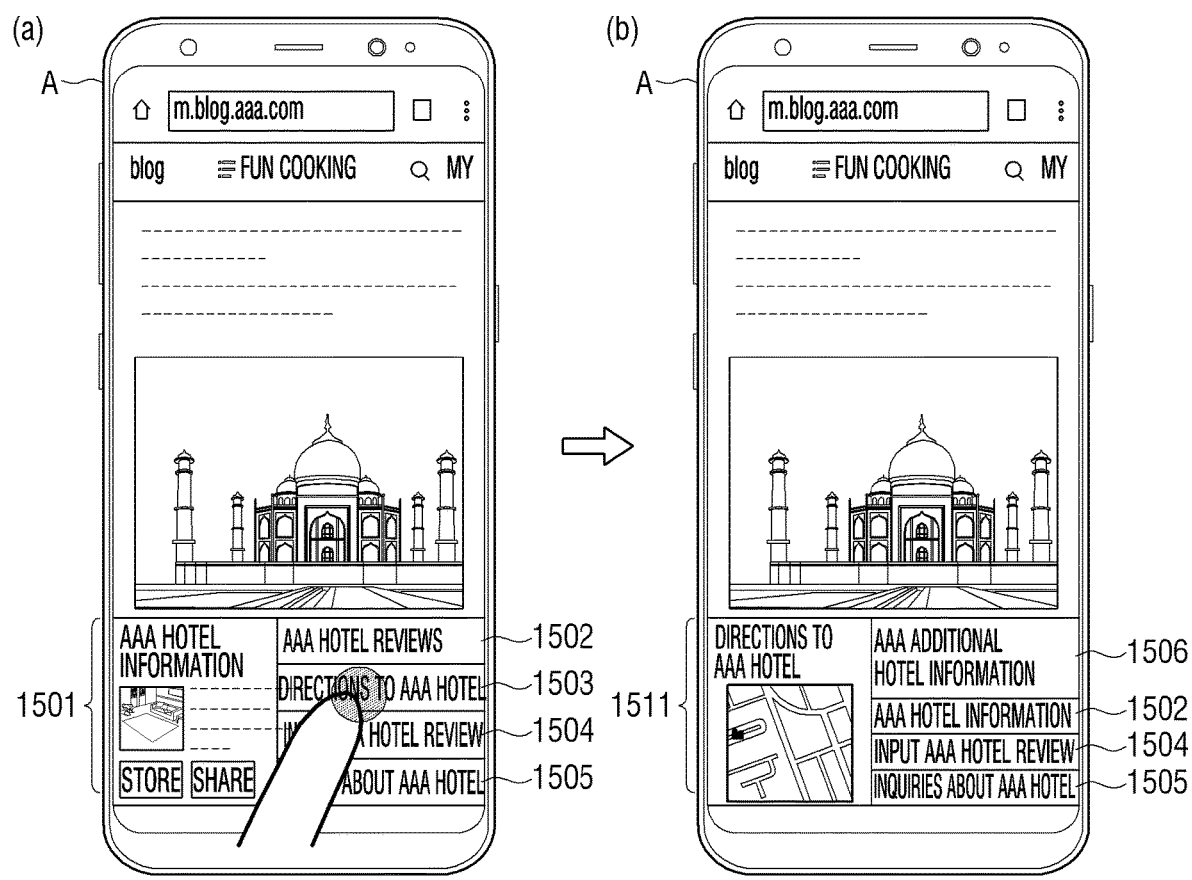

FIG. 15 is a view illustrating providing a search result related to the object, according to various embodiments.

Referring to FIG. 15(a), the electronic device A may display, on a display area, a search result 1501 related to the object, which is acquired according to various embodiments. In this case, if the search result 1501 related to the object is a result related to one category from among a plurality of search categories, the respective identification information 1502-1505 of each of the plurality of search categories may be displayed on a part of the display area.

In this case, in response to a user input 1503 of selecting identification information from among the plurality of identification information 1502-1505, as illustrated in FIG. 15(b), the electronic device A may display a search result 1511 related to the selected category on the display area. Here, the identification information 1502, 1504, 1505, 1506 of other categories than the selected category may be displayed on a part of the display area.

Figure 16A:
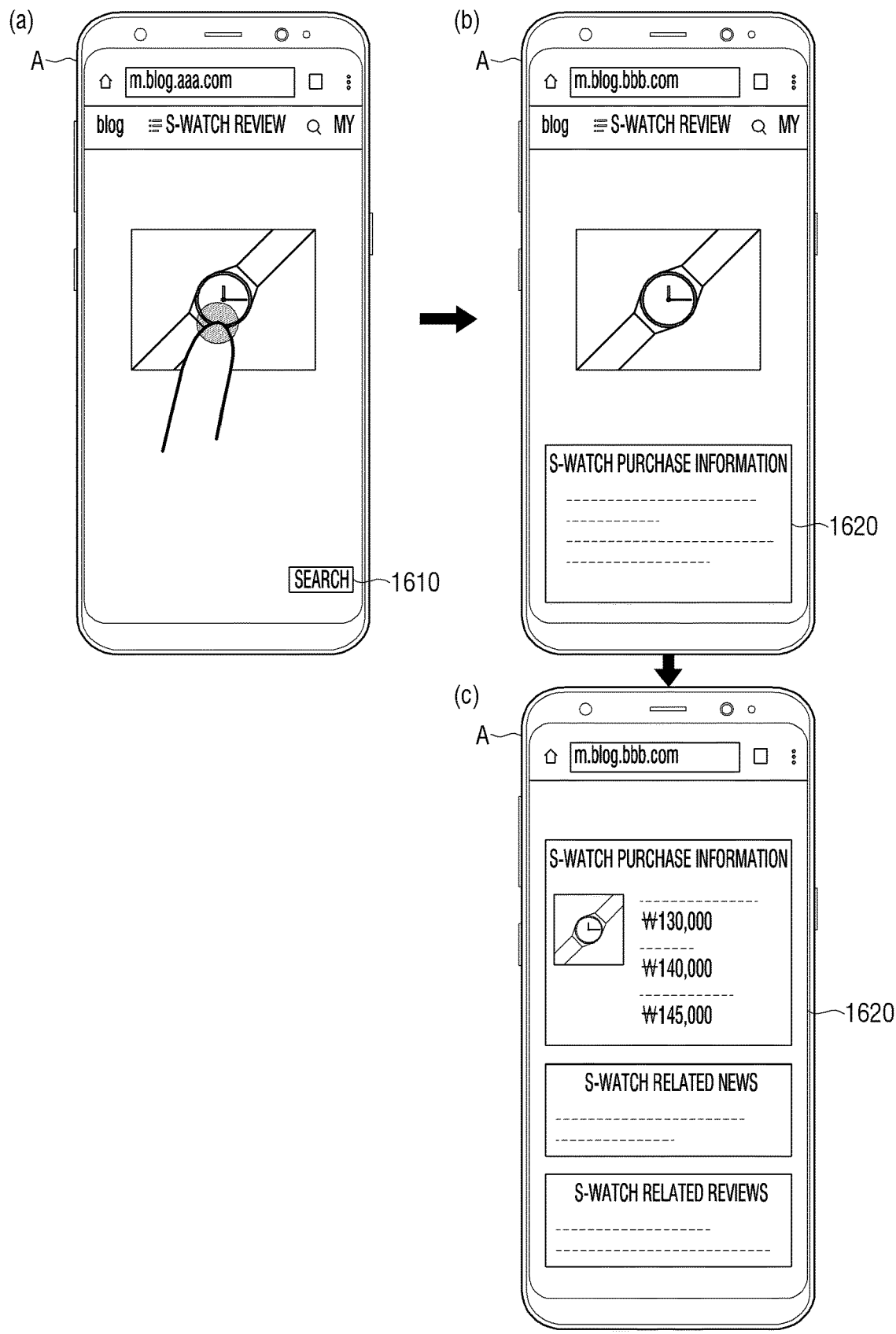
Figure 16B:
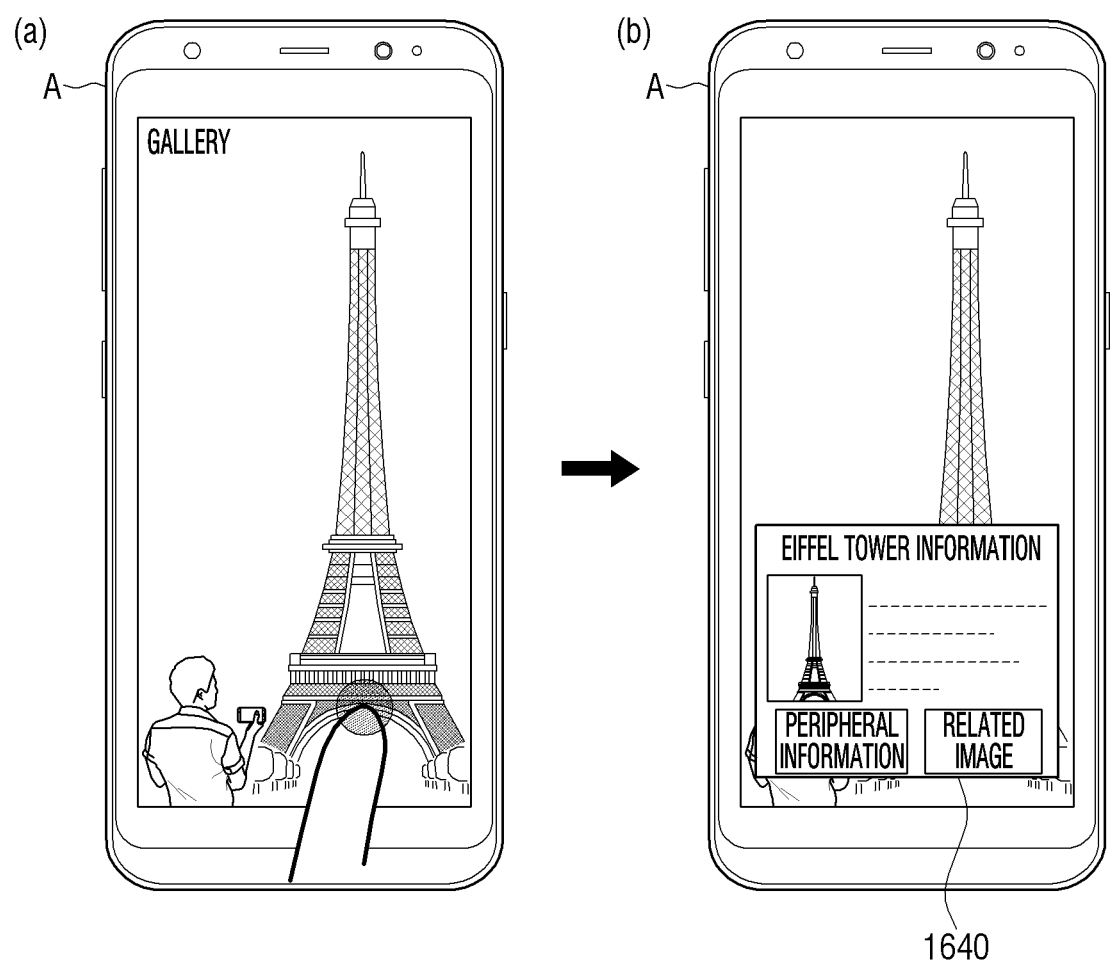
Figure 16C:
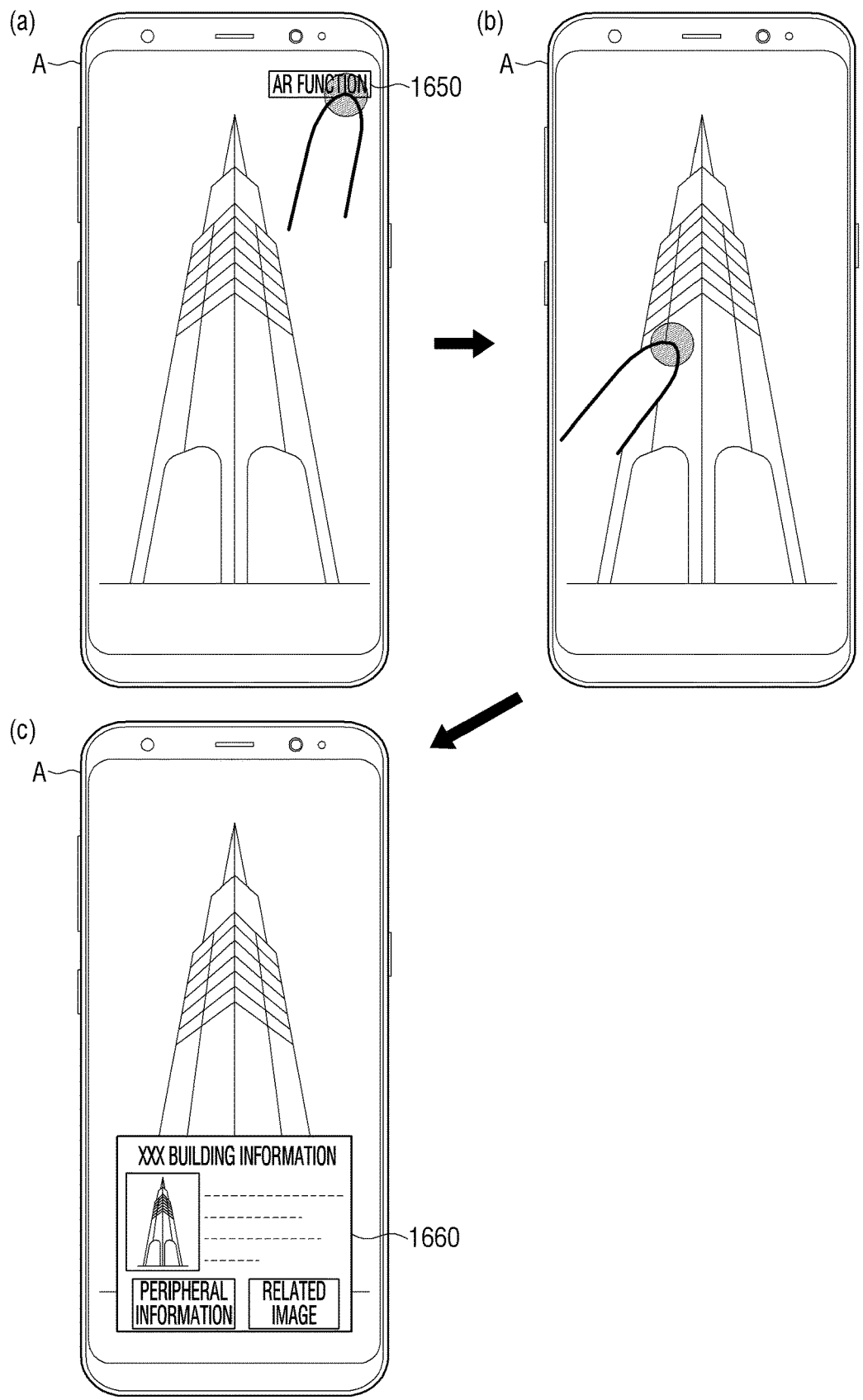

FIGS. 16A to 16C are views illustrating providing a search result related to the object selected by a user while various applications are being executed, according to various embodiments.

If a predetermined user input (e.g., a long-press touch, a double-tap touch, a horizontal drag touch, a strong pressure touch, a drawing input on the area where an object is displayed with a closed curve, etc.) of selecting an object included in an application execution screen is sensed while the application is executed, the electronic device A may capture the application execution screen which is currently displayed and search related information by identifying the selected object. If a user input of selecting a specific icon included in the application execution screen specific button or a specific button provided on the electronic device A is sensed while the application is executed, the electronic device A may capture the application execution screen which is currently displayed and search related information by identifying the selected object.

In this case, the electronic device A may provide a screen (e.g., a pop-up screen) including a search result related to the selected object in up down direction on the application execution screen.

The provided search result may be acquired for each of a plurality of search categories, and a priority regarding the plurality of search categories may be determined based on the user characteristic information (e.g., user age, gender, mood, etc.) and user profile information (e.g., user search history, user purchase history, feedback information, etc.).

The search result provides detailed information regarding the search category having a high priority and provides a menu for other search categories. For instance, if the selected object is "hotel", detailed information may be provided for "hotel review" which is the search category having a high priority, and a menu (or an icon) may be provided for search categories such as "hotel reservation", "directions to hotel", "nearby tourist attractions."

The electronic device A may generate feedback information based on the user selection regarding a plurality of categories and the user's emotional state and update the user profile.

According to an embodiment, while a web browser application is generated, the electronic device A may receive the user input of selecting the object displayed on the execution screen of a web browser application, according to the user input. In this case, the user input may include the long-press touch input of touching a displayed object for more than a predetermined time, the touch-tab touch input of touching a displayed object multiple times, the drag input of dragging an area including a display object in a horizontal direction, and the touch input of drawing an area including a display object in a closed curve. In addition, as illustrated in FIG. 16A(a), the electronic device A may display a search button 1610 on the execution screen of a web browser application, and after the search button 1610 is selected by the user, may receive the user input of selecting the object. The electronic device A may receive the user input of selecting an object after a specific button (e.g., a button for executing an artificial agent, etc.) is selected.

Once the user input is received as mentioned above, the electronic device A may capture the execution screen of the web browser application which is currently being displayed and generate a captured image.

The electronic device A may acquire a search result regarding the selected object based on object information regarding the object selected by the user from the captured image. In this case, as illustrated in FIGS. 16A(b) and (c), a pop-up screen 1620 including the search result regarding the selected object may be provided by moving in the upward direction from the downward direction. As illustrated in FIG. 16A(c), the electronic device A may include the pop-up screen 1620 on the execution screen of the web browser application. In other words, the electronic device A may remove the execution screen of the web browser application on the display 110.

In particular, a plurality of categories (e.g., purchase history information, related news category, review category, etc.) may be included in the pop-up screen 1620. In this case, with respect to the purchase information category of which priority is determined to be high based on the user profile information, detailed information may be provided, and with respect to the news category of which priority is determined to be low, only an icon related to the review category may be provided.

The electronic device A may update the user feedback information by including the result of the user selection regarding the plurality of categories.

In addition, the electronic device A may acquire a search result regarding a selected object by using the user voice. For instance, if the user voice "where can I buy?" is input while an object is selected, the electronic device A may determine "purchase information category" as a search category regarding the selected object and provide a search result based on the determined object information and the search category.

According to another embodiment, while a gallery application is executed, as illustrated in FIG. 16B(a), the user input of selecting an object displayed on the execution screen of the gallery application may be received according to the user input. Here, the user input has already been explained above with respect to FIG. 16A and thus, further description will not be provided for simplicity.

Once the user input is received, the electronic device A may capture the execution screen of the gallery application which is being displayed and generate a captured image.

The electronic device A may acquire a search result regarding the selected object based on the object information regarding the object selected by the user from the captured image. In this case, if the selected object includes a text, the electronic device A may recognize the text included in the object using OCR and use the recognized text as object information. Alternatively, the electronic device A may use the metadata (e.g., photographing location information, photographing time information, etc.) of an image included in the execution screen of the gallery application as context information. For instance, if the selected object is "Eiffel Tower", the electronic device A may recognize that the object selected by the user is the Eiffel Tower based on that the location information included in the metadata of the image "France, Paris."

The electronic device A may provide a pop-up screen 1640 in the lower area of the execution screen as illustrated in FIG. 16B(b) by moving the pop-up screen 1640 including the search result regarding the selected object from the downward direction to the upward direction.

In particular, the pop-up screen 1640 may include a plurality of categories (e.g., detailed information category, peripheral information category, related image category, etc.). In this case, detailed information may be provided for the detailed information category of which priority is determined to be high based on the user profile information, and only an icon may be provided for the peripheral information category and the related image category of which priorities are determined to be low.

The electronic device A may update the user feedback information by including the result of the user selection regarding the plurality of categories.

According to another embodiment, while a camera application is executed, the user input of selecting an object displayed on the execution screen of the camera application may be received according to the user input. Here, the user input has already been explained above, with respect to FIG. 16A, and thus, further description will not be provided for simplicity.

In addition, as illustrated in FIG. 16C(a), the electronic device A may display an AR function button 1650 on the execution screen of the camera application, and after the AR function button 1650 is selected by the user, as illustrated in FIG. 16C(b), the device A may receive the user input of selecting an object.

Once the user input is received, the electronic device A may capture the execution screen of the camera application which is being displayed and generate a captured image. However, the electronic device A may not capture a screen separately, and may use an image including the object from among photographed images.

The electronic device A may acquire a search result regarding the selected object based on the object information regarding the object selected by the user from the captured image. In this case, if the selected object includes a text, the electronic device A may recognize the text included in the object, using OCR, and use the recognized text as object information. Alternatively, the electronic device A may use metadata (e.g., photographing location information, photographing time information, etc.) of a photographing image as context information.

The electronic device A may provide a pop-up screen 1660 in the lower area of the execution screen as illustrated in FIG. 16C(c) by moving the pop-up screen 1660 including the search result regarding the selected object from the downward direction to the upward direction.

In particular, the pop-up screen 1660 may include a plurality of categories (e.g., detailed information category, peripheral information category, related image category, etc.). In this case, detailed information may be provided for the detailed information category of which priority is determined to be high based on the user profile information, and only an icon may be provided for the peripheral information category and the related image category of which priorities are determined to be low.

The electronic device A may update the user feedback information by reflecting the result of the user selection regarding the plurality of categories.

Figure 17:
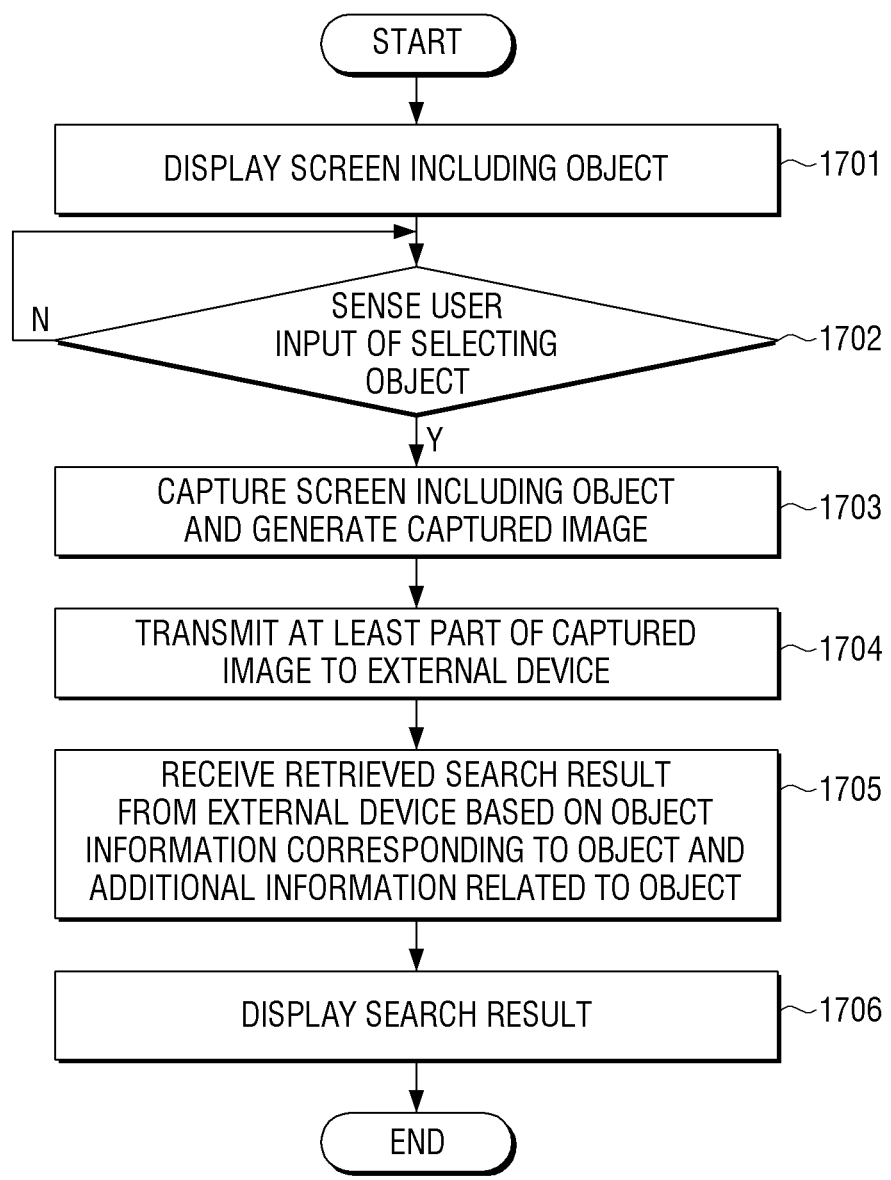
FIG. 17 is a flowchart illustrating a process of providing a search result related to an object, in association with an external device, according to various embodiments.

FIG. 17 is a flowchart illustrating a process of providing a search result related to the object, in association with an external device, according to various embodiments.

First, the electronic device A may display a screen including an object (in operation 1701).

In this case, if the user input of selecting an object is sensed (in operation 1702-Y), the electronic device A may capture the screen including the object and generate a captured image (in operation 1703). In this case, the captured image may be displayed on the display area instead of the screen including the object. In addition, the object may be detected from the captured image based on a touch coordinate corresponding to the user input.

In addition, the electronic device A may transmit part of the captured image to an external device (in operation 1704). In this case, the electronic device A may also transmit information (e.g., a coordinate of the object area) regarding the object area corresponding to the selected object.

The electronic device A may receive the search result, which is retrieved based on the object information corresponding to the object included in the captured image and additional information related to the object, from the external device (in operation 1705).

In this case, the object information is information which is acquired by recognizing the object area corresponding to the object from at least part of the captured image, and the additional information may be information which is acquired by recognizing a peripheral area of the object area from at least part of the captured image. In particular, the object information may be the information which is acquired by applying the trained recognition model set to estimate the object area as the object information, and the additional information may be the information which is acquired by applying the trained recognition model set to estimate the additional information through the peripheral area.

The retrieved search result may be the search result which is retrieved based on the search category acquired by applying the trained recognition model which is set to estimate the object information and the additional information, as the search category. In this case, the retrieved search result may be retrieved by additionally using at least one of the object information, the usage history information of the electronic device A other than the additional information, the user profile of the user of the electronic device A, and photographing information photographed by a camera provided on the electronic device A.

Subsequently, the electronic device A may display the acquired search result on the display area (in operation 1706). Here, the electronic device A may display the search result on one side of the display area so as not to overlap with the object. In addition, the electronic device A may display the object information along with the search result. The electronic device A may transmit a user feedback according to the display of the search result and the object information to an external device.

Figure 18:
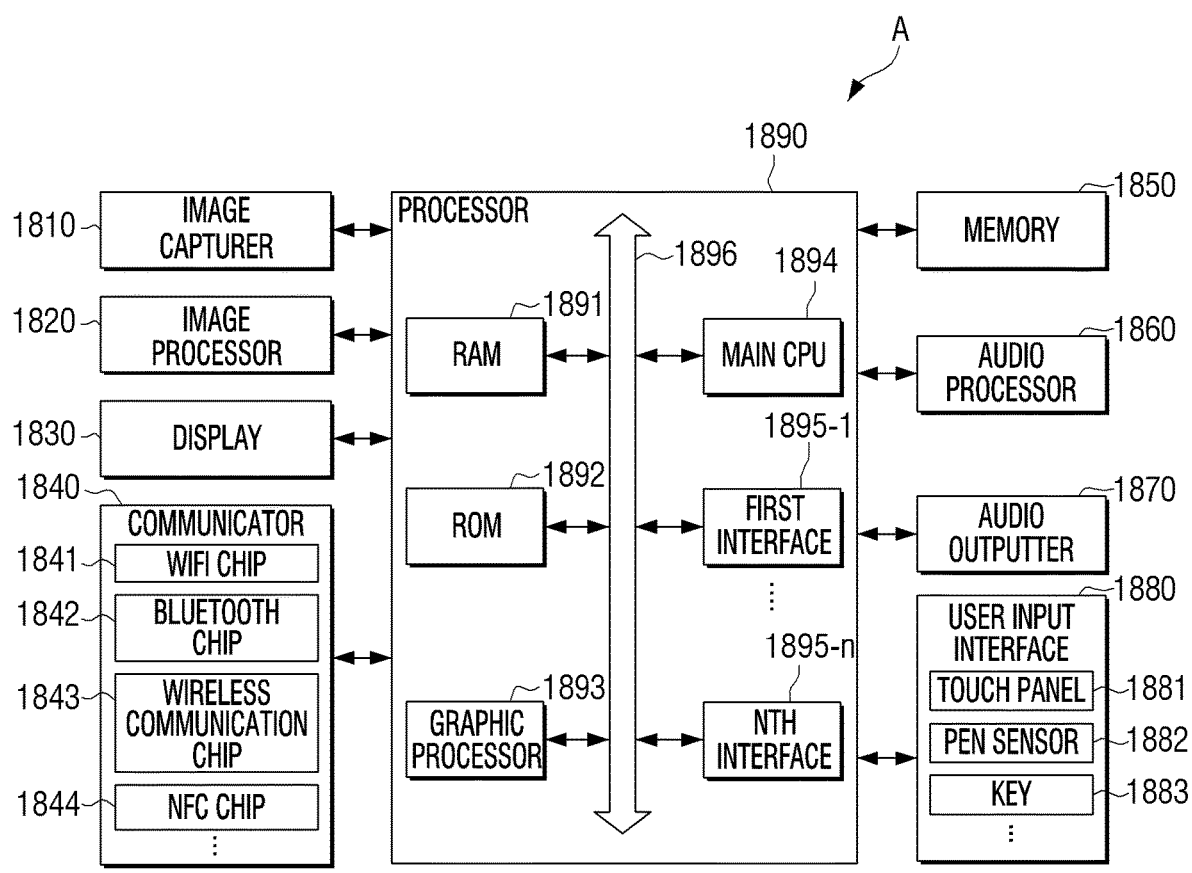
FIG. 18 is a block diagram illustrating a configuration of an electronic device, according to various embodiments.

FIG. 18 is a block diagram illustrating a configuration of an electronic device, according to various embodiments.

As illustrated in FIG. 18, the electronic device 100 may include at least one of an image capturer 1810, an image processor 1820, a display 1830, a communicator 1840, a memory 1850, an audio processor 1860, an audio outputter 1870, a user input interface 1880, and a processor 1890. Meanwhile, the elements illustrated in FIG. 18 are merely one of exemplary embodiments, and may not be necessarily limited to the block diagram described above. Thus, one or more of the elements of the electronic device 100 illustrated in FIG. 18 may be omitted or modified, or one or more elements may be added to the electronic device 100 according to the type or purpose of the electronic device A.

The image capturer 1810 may acquire image data through various sources. For instance, the image capturer 1810 may be implemented as a camera and acquire photographing information by photographing external environment. The image data acquired through the image capturer 1810 may be processed by the image processor 1820.

The image processor 1820 may process the image data received by the image capturer 1810. The image processor 1820 may perform various image processing with respect to image data such as decoding, scaling, noise filtering, frame rate conversion, resolution conversion, and the like.

The display 1830 may display the image data processed by the image processor 1820 on the display area (or, display). The display area may refer to at least a portion of the display 1830 exposed on one side of the housing of the electronic device A.

At least part of the display 1830 may be implemented in the form of a flexible display and may be connected to at least one of a front area, a side area, and a rear area of the electronic device A. Due to a substrate as thin and flexible as a paper sheet, the flexible display may have such characteristic that it can be bent, curved, or rolled without being damaged.

The display 1830 may be implemented as a touch screen in a layered by connecting to a touch panel 1881. The touch screen may have not only a display function, but also a function to detect a touch input position, a touched area, and also a touch input pressure. Further, the touch screen may have a function to detect a proximity touch as well as a real touch.

The communicator 1840 may communicate with various types of external devices according to various manners of communication. The communicator 1840 may include at least one of a Wi-Fi chip 1841, a Bluetooth chip 1842, a wireless communication chip 1843, and a near field communication (NFC) chip 1844. The processor 1890 may perform communication with an external server or various types of external devices by using the communicator 1840.

The memory 1850 may store various programs and data necessary for the operation of the electronic device A. The memory 1850 may be implemented as a non-volatile memory, a volatile memory, a flash memory, a hard disk drive (HDD) or a solid state drive (SDD). The memory 1850 may be accessed by the processor 1890, and perform readout, recording, correction, deletion, update, and the like, on data by the processor 1890. According to an embodiment, the memory may include the memory 1850, read-only memory (ROM) (not illustrated) and random access memory (RAM) (not illustrated) within the controller 1890, and a memory card (not illustrated) mounted on the electronic device A (e.g., micro secure digital (SD) card or memory stick).

Further, the memory 1850 may store programs, data, and so on to constitute various screens to be displayed on the display area of the display 1830. In addition, the memory 1850 may store various recognition models of various embodiments.

The audio processor 1860 may be configured to perform processing on audio data. The audio processor 1860 may perform various processing with respect to audio data, such as decoding, amplification, noise filtering, etc. The audio data processed by the audio processor 1860 may be output to the audio outputter 1870.

The audio outputter 1870 has a configuration to output not only various audio data for which various processes such as decoding, amplification, noise filtering are performed by the audio processor 1860, but also various alarm sounds or voice messages. In particular, the audio outputter 1870 may be implemented to be a speaker, but this is only an example. The audio outputter 1870 may be implemented to be an output terminal, which may output audio data.

The user input interface 1880 may receive various user inputs and transmit the same to the processor 1890. The user input interface 1880 may, for example, include a touch panel 1881, a (digital) pen sensor 1882, a key 1883. The touch panel 1881 may, for example, use at least one of electrostatic type, pressure sensitive type, infrared type, and an ultrasonic type. The touch panel 1881 may further include a control circuit. The touch panel 1881 may further include a tactile layer to provide a tactile response to a user. The (digital) pen sensor 1882, for example, may be part of a touch panel or include a separate detection sheet. The key 1883, for example, may include a physical button, an optical key, or a keypad.

The processor 1890 (or a controller) may control the overall operations of the electronic device A using various programs stored in the memory 1850.

The processor 1890 may include the RAM 1891, the ROM 1892, a graphic processor 1893, a main central processing unit (CPU) 1894, first through nth interfaces 1895-1 through 1895-*n*, and a bus 1896. Here, the RAM 1891, the ROM 1892, the graphic processor 1893, the main CPU 1894, and the first to the nth interface 1895-1~1895-*n* may be interconnected through the bus 1896.

Figure 19A:
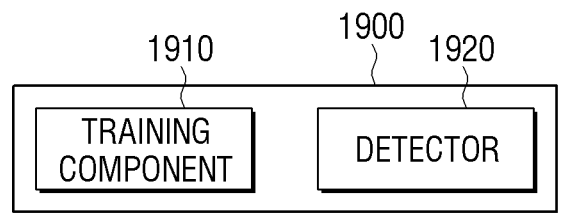
FIGS. 19A to 19C are block diagrams illustrating a configuration of a training component and a detector, according to various embodiments.

Referring to FIG. 19A, a processor 1900 may include at least one of a training component 1910 and a detector 1920. The processor 1900 of FIG. 19A may correspond to the processor 1890 of the electronic device A or the processor of data learning server (not illustrated).

The training component 1910 may generate or train a recognition model having a criterion for a determination of a predetermined situation. The training component 1910 may generate a recognition model having a determination criterion using collected learning data.

For instance, the training component 1910 may generate, train, or renew an object recognition model having a criterion for determining which object is included in an image using the image including the object, as learning data.

In another example, the training component 1910 may generate, train, or renew a peripheral information recognition model having a criterion for determining various additional information around the object included in the image using peripheral information included in the screen which includes the object as learning data.

In another example, the training component 1910 may generate, train, or renew a face recognition model having a criterion for determining the face of the user included in the image using the image photographed by a camera, as learning data.

The detector 1920 may estimate a recognition target included in predetermined data using predetermined data as input data of the trained recognition model.

For instance, the detector 1920 may acquire (or estimate, infer) object information regarding the object included in the object area using the object area (or image) including the object as input data of the trained recognition model.

In another example, the detector 1920 may estimate (or determine, infer) a search category for providing a search result by applying at least one of the object information and the context information to the trained recognition model. In this case, a plurality of search results may be acquired according to priority.

In another example, the detector 1920 may estimate context recognition information (e.g., additional information related to the object, etc.) related to the object by applying the context information (e.g., peripheral information of the object) to the trained recognition model.

At least part of the training component 1910 and at least part of the detector 1920 may be implemented as a software module or in the form of at least one hardware chip and mounted in an electronic device. For instance, at least one of the training component 1910 and the detector 1920 may be manufactured in the form of a hardware chip used exclusively for artificial intelligence (AI), or as part of the existing general processor (e.g., CPU or application processor) or a graphic-only processor (e.g., GPU) to be mounted on the various electronic devices or the object recognition devices mentioned above. In this case, the hardware chip used exclusively for AI may be an exclusive processor which is specialized for probability calculation, and it has higher performance for parallel processing than the existing general processor and thus, may process operations in the AI field such as machine learning quickly. If the training component 1910 and the detector 1920 are implemented as a software module (or a program module including instructions), the software module may be stored in a non-transitory computer readable medium which can be readable by a computer. In this case, the software module may be provided by an operating system (OS) or a predetermined application. Alternatively, part of the software module may be provided by an OS and the remaining part may be provided by a predetermined application.

Here, the training component 1910 and the detector 1920 may be mounted on a single device, or each unit may be mounted on separate electronic devices. For instance, one of the training component 1910 and the detector 1920 may be included in the electronic device A, and the remaining unit or the other component may be included in an external server. In addition, the training component 1910 and the detector 1920 may provide the model information established by the training component 1910 to the detector 1920 through wire or wirelessly, or the data input to the detector 1920 may be provided to the training component 1910, as additional learning data.

Figure 19B:
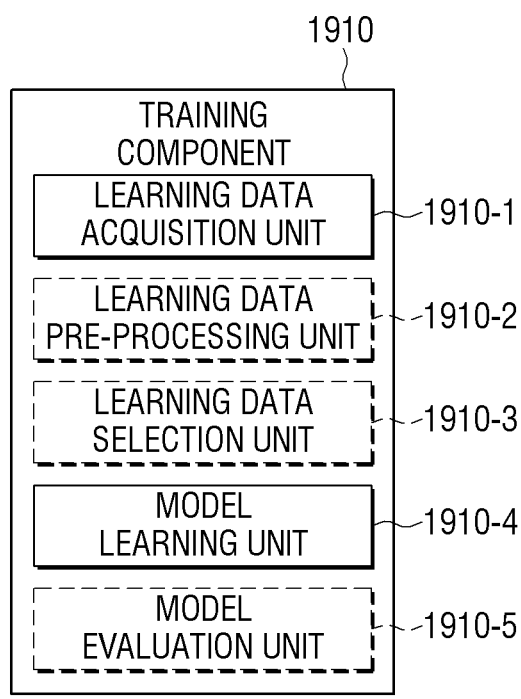
Figure 19C:
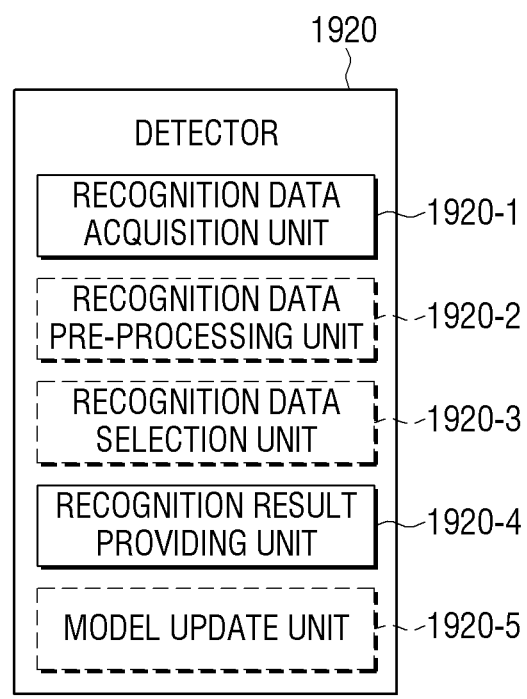

FIGS. 19B and 19C are block diagrams illustrating the training component 1910 and the detector 1920, respectively, according to various embodiments.

Referring to FIG. 19B, the training component 1910 according to an embodiment may include a learning data acquisition unit 1910-1 and a model learning unit 1910-4. The learning unit 1910 may further include at least one of a learn data pre-processing unit 1910-2, a learning data selection unit 1910-3, and a model evaluation unit 1910-5.

The learning data acquisition unit 1910-1 may acquire learning data necessary for a recognition model for inferring an object to be recognized. According to an embodiment, the data learning acquisition unit 1910-1 may acquire at least one of the entire image including the object, the image corresponding to the object area, the object information, and the context information, as learning data. The learning data may be data collected or tested by the training component 1910 or the manufacturer of the training 1910.

The model learning unit 1910-4 may train recognition or detection to have a determination criterion as to how to determine a predetermined recognition target using the learning data. For example, the model learning unit 1910-4 may train a recognition model through supervised learning using at least part of the learning data as a determination criterion. As another example, the model learning unit 1910-4 may train a recognition model through unsupervised learning which finds criteria for determining circumstances by learning the type of data for determining circumstances using the learning data without further guidance. As another example, the model learning unit 1910-4 may learn a recognition model through reinforcement learning which uses feedback on whether the result of the circumstances determination according to learning is correct. In addition, the model learning unit 1910-4, for example, may train a data recognition model using a learning algorithm including an error back-propagation method or a gradient descent method, etc.

In addition, the model learning unit 1910-4 may learn criteria for which learning data to use in order to infer an object to be recognized using input data.

If there are a plurality of pre-established data recognition models, the model learning unit 1910-4 may determine a recognition model with high relevancy between input learning data and basic learning data as a data recognition model to learn. In this case, the basic learning data may be pre-classified according to the type of data, and the recognition model may be pre-established according to the type of data. For example, the basic learning data may be pre-classified by various criteria such as an area where the learning data is generated, a time at which the learning data is generated, a size of the learning data, a genre of the learning data, a creator of the learning data, a type of object in the learning data, etc.

Once the recognition model is trained, the model learning unit 1910-4 may store the trained recognition model. In this case, the model learning unit 1910-4 may store the trained recognition model in the memory 1850 of the electronic device A. Alternatively, the model learning unit 1910-4 may store the trained recognition model in a server memory which is connected to the electronic device A through wire or wirelessly.

The training component 1910 may further include the learning data pre-processing unit 1910-2 and the learning data selection unit 1910-3 in order to improve the analysis result of the recognition model or to save resources or time required for generation of the recognition model.

The pre-processing unit 1910-2 may pre-process acquired data so that the acquired data can be used for learning for determining circumstances. The pre-processing unit 1910-2 may pre-process the acquired data in a predetermined format so that the acquired data can be used for learning for determining circumstances.

The learning data selection unit 1910-3 may select data necessary for learning from the data acquired by the learning data acquisition unit 1910-1 or the data pre-processed by the learning data pre-processing unit 1910-2. The selected learning data may be provided to the model learning unit 1910-4. The learning data selection unit 1910-3 may select learning data required for learning from among the acquired data or the preprocessed data according to a predetermined selection criteria. In addition, the learning data selection unit 1910-3 may select learning data according to predetermined selection criteria by learning of the model learning unit 1910-4.

The training component 1910 may further include the model evaluation unit 1910-5 to improve the analysis result of the data recognition model.

The model evaluation unit 1910-5 may input evaluation data to a data recognition model, and if the analysis result output from the evaluation data does not satisfy predetermined criteria, allow the model learning unit 1910-4 to learn again. In this case, the evaluation data may be predetermined data for evaluating the recognition model.

For example, if the number or the ratio of the evaluation data whose analysis result is not accurate among the analysis results of the trained data recognition model for the evaluation data exceeds a predetermined threshold value, the model evaluation unit 1910-5 may evaluate that the predetermined criteria are not satisfied.

On the other hand, when there are a plurality of trained data recognition models, the model evaluation unit 1910-5 may evaluate whether each of the trained recognition models satisfies the predetermined criteria and determine the model which satisfies the predetermined criteria as the final recognition model. In this case, when there are a plurality of models satisfying the predetermined criteria, the model evaluating unit 1910-5 may determine any one or a predetermined number of models previously set in descending order of the evaluation score as the final recognition model.

Referring to FIG. 19C, the detector 1920, according to an embodiment, may include a recognition data acquisition unit 1920-1 and a recognition result providing unit 1920-4.

The detector 1920 may further include at least one of a recognition data pre-processing unit 1920-2, a recognition data selection unit 1920-3, and a model update unit 1920-5.

The recognition data acquisition unit 1920-1 may acquire data to determine circumstances. The recognition result providing unit 1920-4 may apply the data acquired by the recognition data acquisition unit 1920-1 to the trained recognition model, as an input data, to determine circumstances. The recognition result providing unit 1920-4 may provide the analysis result according to the data analysis purpose. The recognition result providing unit 1920-4 may acquire the analysis result by applying the data selected by the recognition data pre-processing unit 1920-2 or the recognition data selection unit 1920-3, which will be described later, to the recognition model, as an input value. The analysis result may be determined by the recognition model.

According to an embodiment, the recognition result providing unit 1920-4 may acquire (or infer) object information corresponding to the object area by applying the trained recognition model to the object area including the object acquired by the recognition data acquisition unit 1920-1.

According to another embodiment, the recognition result providing unit 1920-4 may acquire (or infer) a search category to provide a search result by applying at least one of the object area acquired by the recognition data acquisition unit 1920-1, the object information and the context information to the trained recognition model.

The detector 1920 may further include the recognition data pre-processing unit 1920-2 and the recognition data selection unit 1920-3 in order to improve the analysis result of the recognition model or to save resources or time required for providing the analysis result.

The recognition data preprocessing unit 1920-2 may pre-process acquired data so that the acquired data can be used to determine circumstances. The recognition data pre-processing unit 1920-2 may process the acquired data into a predetermined format so that the recognition result providing unit 1920-4 can utilize the acquired data to determine circumstances.

The recognition data selection unit 1920-3 may select data required for determining circumstances from the data acquired by the recognition data acquisition unit 1920-1 or the data pre-processed by the recognition data pre-processing unit 1920-2. The selected data may be provided to the recognition result providing unit 1920-4. The recognition data selection unit 1920-3 may select the entire or part of the acquired data or the pre-processed data according to predetermined criteria for determining circumstances. In addition, the recognition data selection unit 1920-3 may select learning data according to predetermined selection criteria by learning of the model learning unit 1910-4.

The model update unit 1920-5 may control to update the recognition model based on the evaluation regarding the analysis result provided by the recognition result providing unit 1920-4. For instance, the model update unit 1920-5 may provide the analysis result provided by the recognition result providing unit 1920-4 to the model learning unit 1910-4 and request the model learning unit 1910-4 to further learn or update the recognition model.

Figure 20:
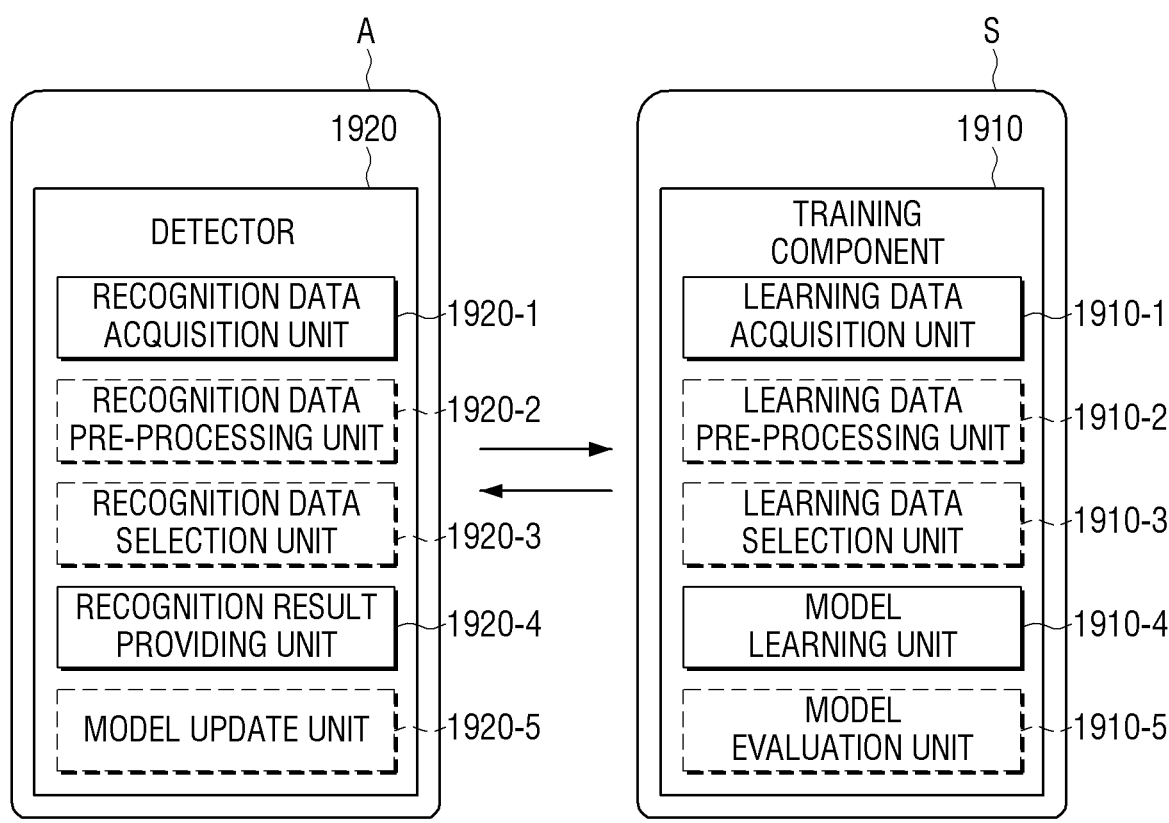
FIG. 20 is a view illustrating a method of controlling an electronic device, according to various embodiments.

FIG. 20 is a view illustrating a configuration of an electronic device A and a server S learning and recognizing data by interlocking with each other, according to various exemplary embodiments.

Referring to FIG. 20, the server S may learn criteria for determining circumstances, and the electronic device A may determine circumstances based on the learning result by the server S.

In this case, the model learning unit 1910-4 of the server S may perform the function of the training component 1910 illustrated in FIG. 19A. The model learning unit 1910-4 of the server S may learn criteria as to which object image, object information or context information to use to determine predetermined circumstances, and how to determine circumstances using the data.

In addition, the recognition result providing unit 1920-4 of the electronic device A may determine object information or a search category by applying the data selected by the recognition data selection unit 1920-3 to the recognition model generated by the server S. The recognition result providing unit 1920-4 of the electronic device A may receive the recognition model generated by the server S from the server S and determine circumstances using the received recognition model. In this case, the recognition result providing unit 1920-4 of the electronic device A may determine object information corresponding to the object image by applying the object image selected by the recognition data selection unit 1920-3 to the recognition model received from the server S. The recognition result providing unit 1920-4 may determine a search category to acquire a search result by using at least one of the context information and the context recognition information.

Figure 21:
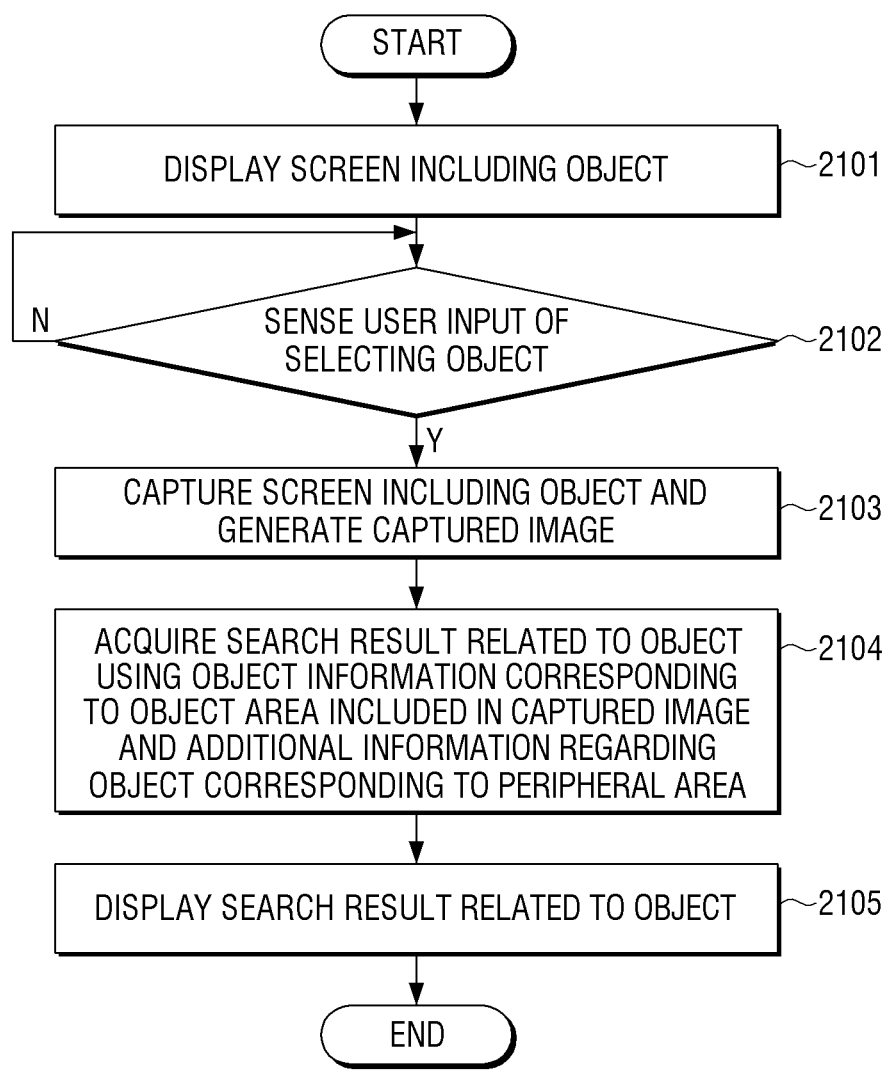
FIG. 21 is a flowchart illustrating a method of controlling an electronic device using a recognition model, according to various embodiments.

FIG. 21 is a flowchart illustrating an electronic device using a recognition model, according to various embodiments.

Referring to FIG. 21, the electronic device A may display a screen including an object (in operation 2101).

If the user input of selecting an object is sensed (in operation 2102-Y), the electronic device A may capture a screen including the object and generate a captured image (in operation 2103).

Subsequently, the electronic device A may acquire a search result related to the object using at least one of the object information corresponding to the object area included in the captured image and the additional information regarding the object corresponding to the peripheral area (in operation 2104).

In this case, the result of applying at least one of the information regarding the object area and the information regarding the peripheral area may be, for example, at least one of the object information, the additional information regarding the object and the search category. The electronic device A may acquire a search result related to the object using at least one of the object information, the additional information regarding the object, and the search category. For example, the electronic device A may transmit the object information, the additional information, and the search category to the recommendation device B and acquire a search result related to the object in response thereto.

Once a search result is acquired, the electronic device A may display the acquired search result related to the object on the display area (in operation 2105).

FIGS. 22 to 25 are flow diagrams illustrating using a recognition model by a network system, according to various embodiments.

Referring to FIGS. 22 to 25, a network system using a recognition model may include first elements 2201, 2301, 2401, 2501, second elements 2202, 2302, 2402, 2502, and third elements 2203, 2303, 2403.

Here, the first elements 2201, 2301, 2401, 2501 may be the electronic device A, and the second elements 2202, 2302, 2402, 2502 may be the server S where a recognition model is stored. Alternatively, the first elements 2201, 2301, 2401, 2501 may be a general processor, and the second elements 2202, 2302, 2402, 2502 may be an AI-only processor. Alternatively, the first elements 2201, 2301, 2401, 2501 may be at least one application, and the second elements 2202, 2302, 2402, 2502 may be an operating system (OS). In other words, the second elements 2202, 2302, 2402, 2502 may be more integrated, dedicated, less delayed, superior in performance, or have greater resources than the first elements 2201, 2301, 2401, 2501 and thus, may be capable of processing many operations required for generating, updating, or applying the data recognition model more quickly and effectively than the first elements 2201, 2301, 2401, 2501.

In this case, an interface for transmitting/receiving data between the first elements 2201, 2301, 2401, 2501 and the second elements 2202, 2302, 2402, 2502 may be defined.

For instance, an application program interface (API) having an argument value (or an intermediate value or a transfer value) as learning data to be applied to the recognition model may be defined. The API may be defined as a set of sub-routines or functions which can be called for processing from a protocol (e.g., a protocol defined in the electronic device A) to another protocol (e.g., a protocol defined in the server S). In other words, an environment can be provided in which an operation of another protocol can be performed in any one protocol through the API.

Meanwhile, the third elements 2203, 2303, 2403 may acquire a search result related to the object based on data received from at least one of the first elements 2201, 2301, 2401, 2501 and the second elements 2202, 2302, 2402, 2502. The third elements 2203, 2303, 2403, for example, may correspond to the recommendation device B of FIG. 2B. In this case, the data that the third elements 2203, 2303, 2403 receives may be at least one of the object area, the context information, the object information, and the search category. According to an embodiment, the third elements 2203, 2303, 2403 may be implemented as a single device with the he second elements 2202, 2302, 2402, 2502.

Figure 22:
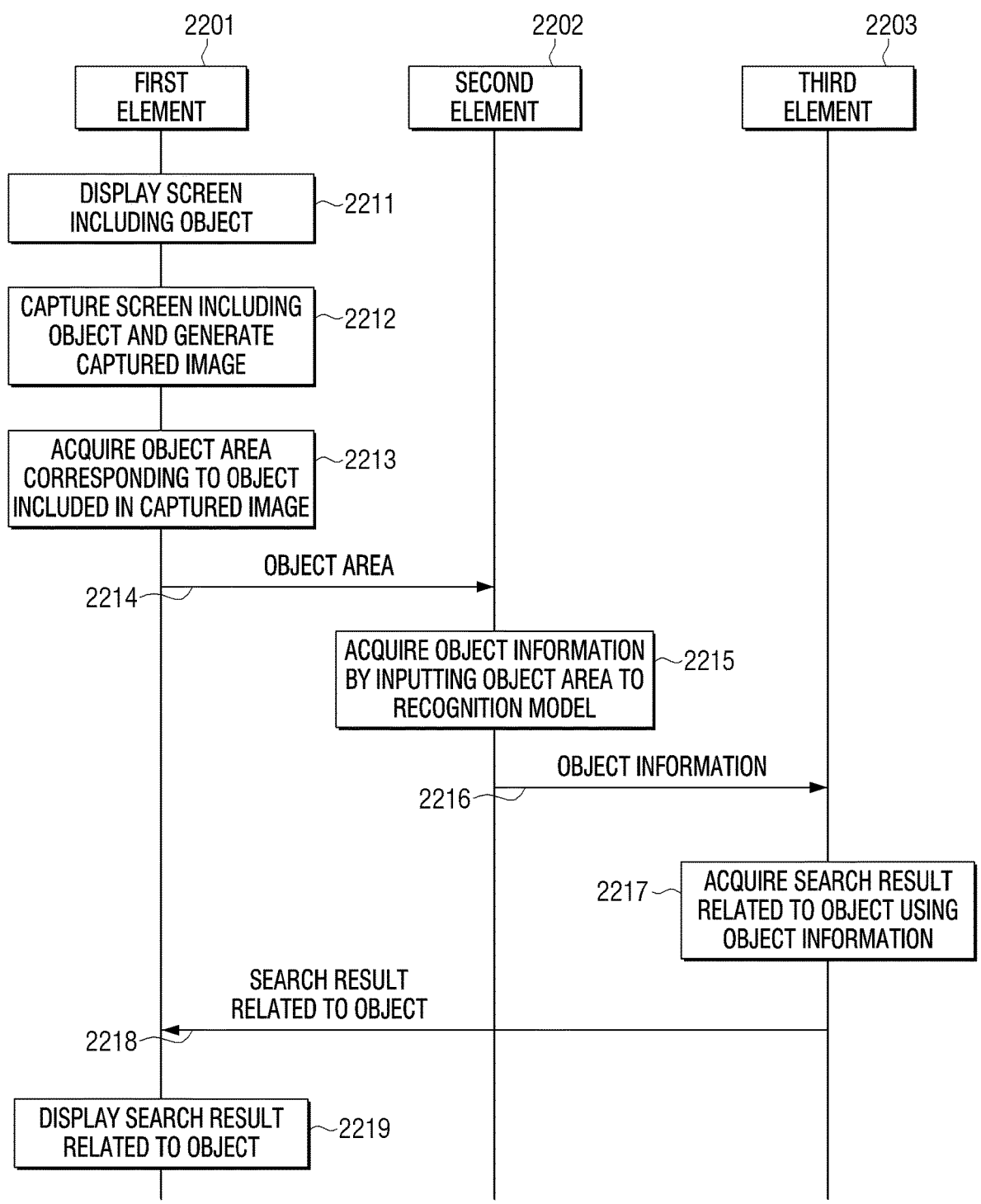
FIGS. 22 to 25 are flow diagrams illustrating providing search results in a network system using a recognition model, according to various embodiments.

According to an embodiment, in FIG. 22, the first element 2201 may display a screen including an object (in operation 2211).

In this case, if the user input of selecting an object is received, the first element 2201 may capture a screen including the object and generate a captured image (in operation 2212).

Subsequently, the first element 2201 may acquire an object area corresponding to the object included in the captured image (in operation 2213), and transmit the acquired object area to the second element 2202 (in operation 2214).

The second element 2202 may acquire object information by inputting the received object area to the recognition model (in operation 2215).

The second element 2202 may transmit the object information to the third element 2203 (in operation 2216). The third element 2203 may acquire a search result related to the object using the object information (in operation 2217). In this case, the third element 2203 may acquire a search result by using not only the object information but also additional data (e.g., the user characteristic information, the user profile, the user feedback, etc.).

When the third element 2203 transmits the search result related to the object to the first element 2201 (in operation 2218), the first element 2201 may display the received search result related to the object on the display area (in operation 2219). The third element 2203 may directly transmit the search result related to the object to the first element 2201, or transmit the search result related to the object through the second element 2202.

Figure 23:
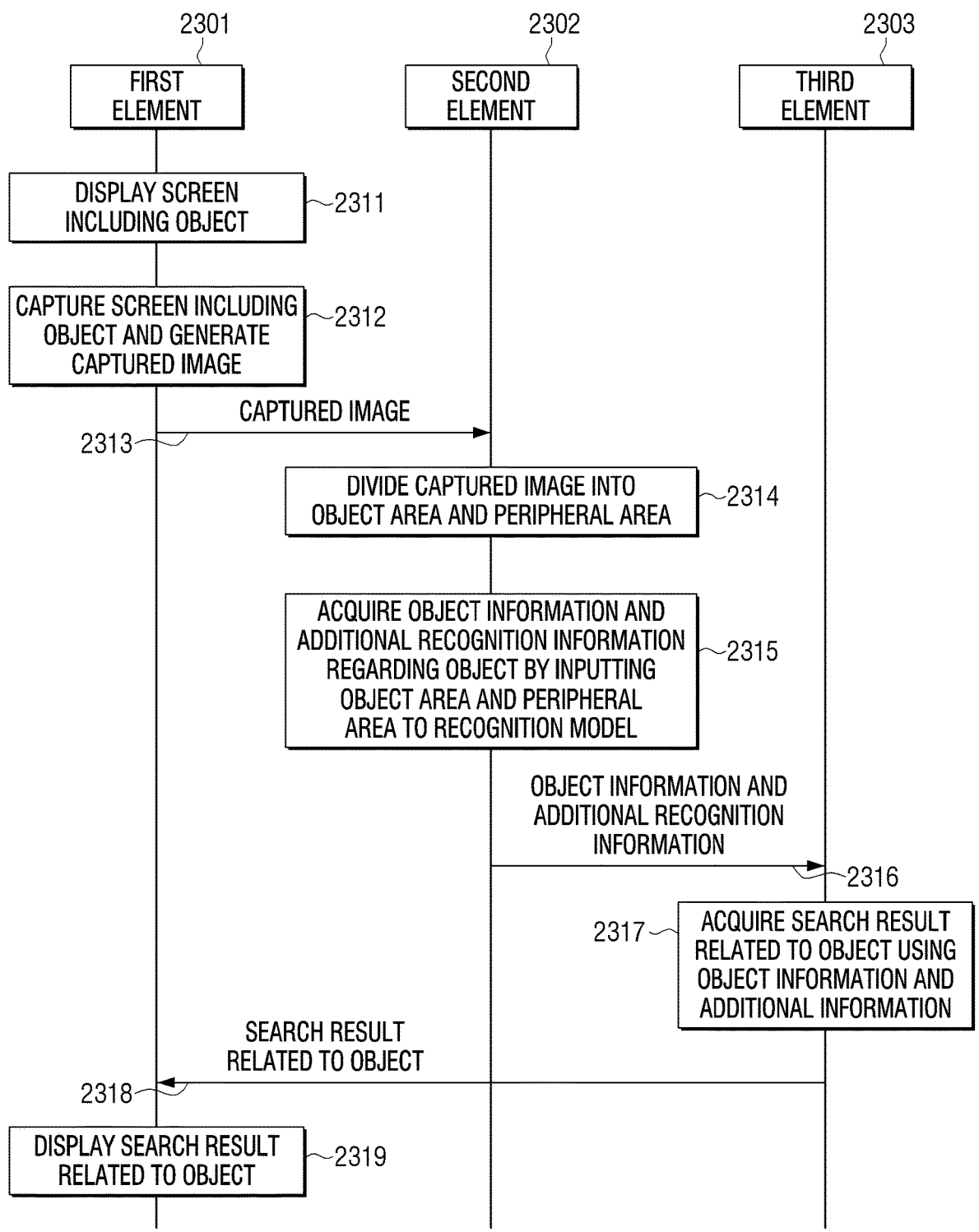

According to another embodiment, in FIG. 23, the first element 2301 may display a screen including an object (in operation 2311).

In this case, if the user input of selecting an object is received, the first element 2301 may capture a screen including the object and generate a captured image (in operation 2312).

The first element 2301 may transmit the captured image to the second element 2302 (in operation 2313). In this case, the first element 2301 may transmit information regarding the object area corresponding to the selected object along with the captured image.

The second element 2302 may divide the received captured image into the object area and the peripheral area (in operation 2314). In this case, the second element 2302 may divide the captured image into the object area and the peripheral area, based on the received information regarding the object area. According to another embodiment, the first element 2301 may divide the captured image into the object area and the peripheral area and transmit the same to the second element 2302.

The second element 2302 may acquire object information and additional information regarding the object by inputting the object information and the peripheral information to the recognition model (in operation 2315). In this case, the second element 2302 may acquire the object information by inputting the object area to the object recognition model, and acquire the additional information regarding the object by inputting the peripheral area to the peripheral information recognition model. In addition, the second element 2302 may determine a search category and a priority regarding the search category based on the object information and the additional information regarding the object.

The second element 2302 may acquire object information by inputting the object area to the recognition model and acquire additional information through an application resource analysis regarding the part corresponding to the peripheral area in the screen including the object. In this case, the second element 2302 may determine a search category and a priority regarding the search category based on the object information and the additional information regarding the object.

The application resource analysis means parsing the type, content (e.g., content of images and texts, etc.) and location on the screen of a UI element displayed on the execution screen when the application is executed. The application resource analysis regarding the part corresponding to the peripheral area means analyzing the type or content of a UI element displayed at a location corresponding to the peripheral area by using the location of the UI element on the screen in the application execution screen at a time when the captured image is generated.

The second element 2302 may acquire additional information regarding the object by analyzing the type or content of the UI element. In this case, the first element 2301 may acquire additional information regarding the object by analyzing the type and content of the UI element and transmit the same to the second element 2302.

The second element 2302 may transmit the object information and the additional information which is the result of the recognition model application in the operation of 2315 to the third element 2303 (in operation 2316). In this case, the second element 2302 may also transmit the information regarding the search category to the third element 2303.

The third element 2303 may acquire a search result related to the object using the received object information and additional information (in operation 2317). In this case, the third element 2303 may acquire a search result by using the search category together. In addition, the third element 2303 may acquire a search result by using not only the object information and the additional information but also other data (e.g., the user characteristic information, the user profile, the user feedback, etc.). In this case, the other data may be transmitted from the first element 2301 or another element, or may be pre-stored in the third element 2303.

When the third element 2303 transmits the search result related to the object to the first element 2301 (in operation 2318), the first element 2301 may display the received search result regarding the object on the display area (in operation 2319).

Figure 24:
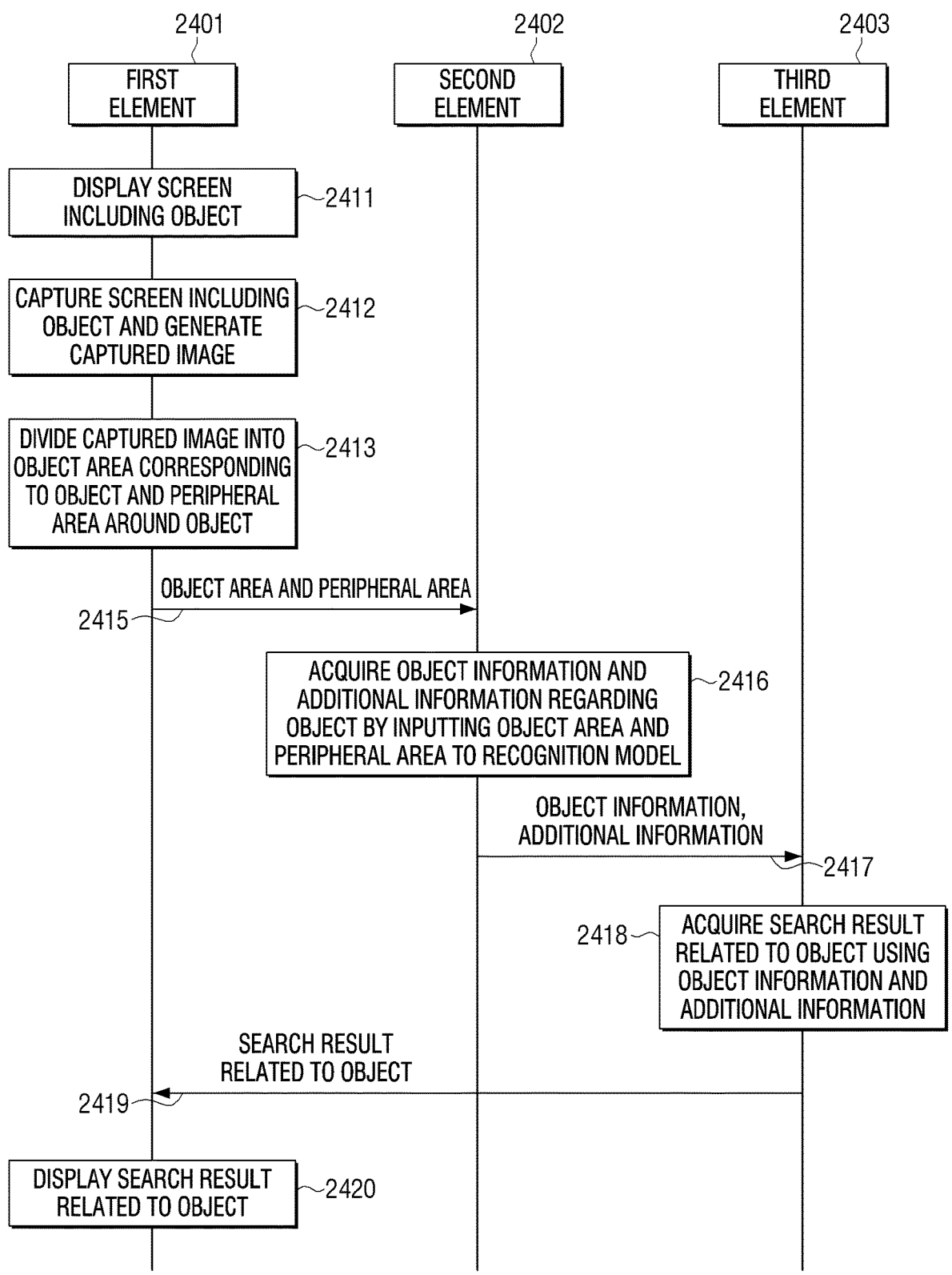

According to another embodiment, in FIG. 24, the first element 2401 may display a screen including an object (in operation 2411).

In this case, if the user input of selecting an object is received, the first element 2401 may capture a screen including the object and generate a captured image (in operation 2412).

The first element 2401 may divide the generated captured image into an object area and a peripheral area (in operation 2413). In this case, the first element 2401 may determine the object area based on a user touch point, and divide the captured image into the object area and the peripheral area based on the information regarding the determined object area. The first element 2401 may transmit the object area and the peripheral area to the second element 2402 (in operation 2415).

The second element 2402 may acquire object information and additional information regarding the object by inputting the object area and the peripheral area to the recognition model (in operation 2416). In this case, the second element 2402 may acquire the object information by inputting the object area to the object recognition model, and acquire the additional information regarding the object by inputting the peripheral area to the peripheral information recognition model. In addition, the second element 2402 may determine a search category and a priority regarding the search category based on the object information and the additional information.

The second element 2402 may transmit the acquired object information and additional information to the third element 2403 (in operation 2417). In this case, the second element 2402 may also transmit information regarding the search category to the third element 2403.

The third element 2403 may acquire a search result related to the object using the received object information and additional information (in operation 2418). In this case, the third element 2403 may acquire a search result by using the search category together. In addition, the third element 2403 may acquire a search result by using not only the object information and the additional information but also other data (e.g., the user characteristic information, the user profile, the user feedback, etc.). In this case, the other data may be transmitted from the first element 2401 or another element, or may be pre-stored in the third element 2403.

When the third element 2403 transmits the search result related to the object to the first element 2401 (in operation 2419), the first element 2401 may display the received search result regarding the object on the display area (in operation 2420).

Figure 25:
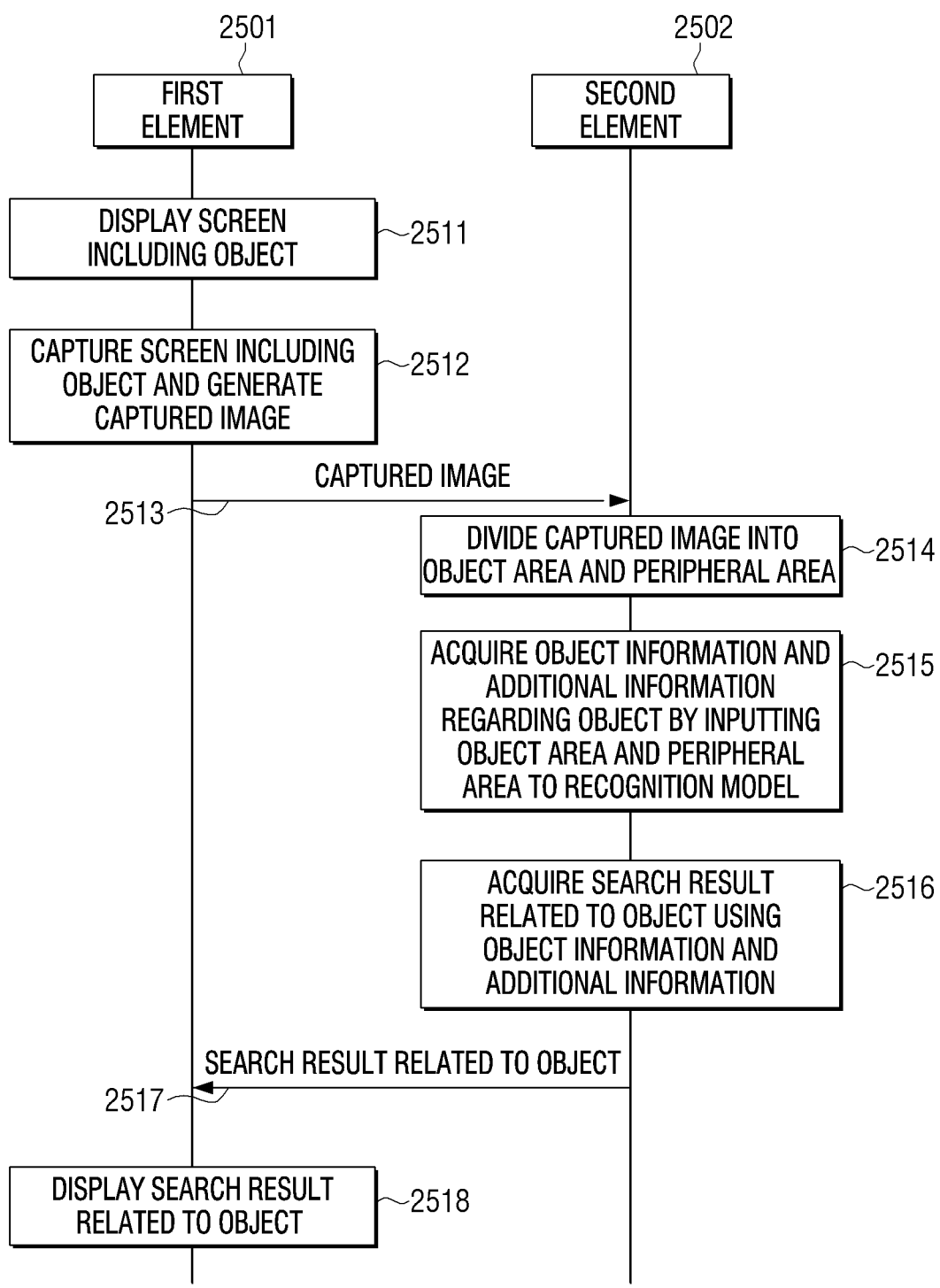

According to another embodiment, in FIG. 25, the first element 2501 may display a screen including an object (in operation 2511).

In this case, if the user input of selecting an object is received, the first element 2501 may capture a screen including the object and generate a captured image (in operation 2512).

The first element 2501 may transmit the captured image to the second element 2502 (in operation 2513). In this case, the first element 2501 may transmit information regarding the object area corresponding to the selected object along with the captured image.

The second element 2502 may divide the received captured image into the object area and the peripheral area (in operation 2514). In this case, the second element 2502 may divide the received captured image into the object area and the peripheral area based on the information of the received object area The second element 2502 acquire object information and additional information regarding the object by inputting the object area and the peripheral area to the recognition model (in operation 2515). In this case, the second element 2502 may acquire the object information by inputting the object area to the object recognition model, and acquire the additional information regarding the object by inputting the peripheral area to the peripheral information recognition model. In addition, the second element 2502 may determine a search category and a priority regarding the search category based on the object information and the additional information.

The second element 2502 may acquire a search result related to the object using the acquired object information and additional information (in operation 2516). In this case, the second element 2502 may acquire a search result by applying the object information and the additional information to the recognition model as input data. Here, the second element 2502 may acquire a search result using the search category together. In addition, the second element 2503 may acquire a search result by using not only the object information and the additional information but also other data (e.g., the user characteristic information, the user profile, the user feedback, etc.). In this case, the other data may be transmitted from the first element 2501 or another element, or may be pre-stored in the second element 2502.

When the second element 2502 transmits the search result related to the object to the first element 2501 (in operation 2517), the first element 2501 may display the received search result related to the object on the display area (in operation 2518).

Figure 26:
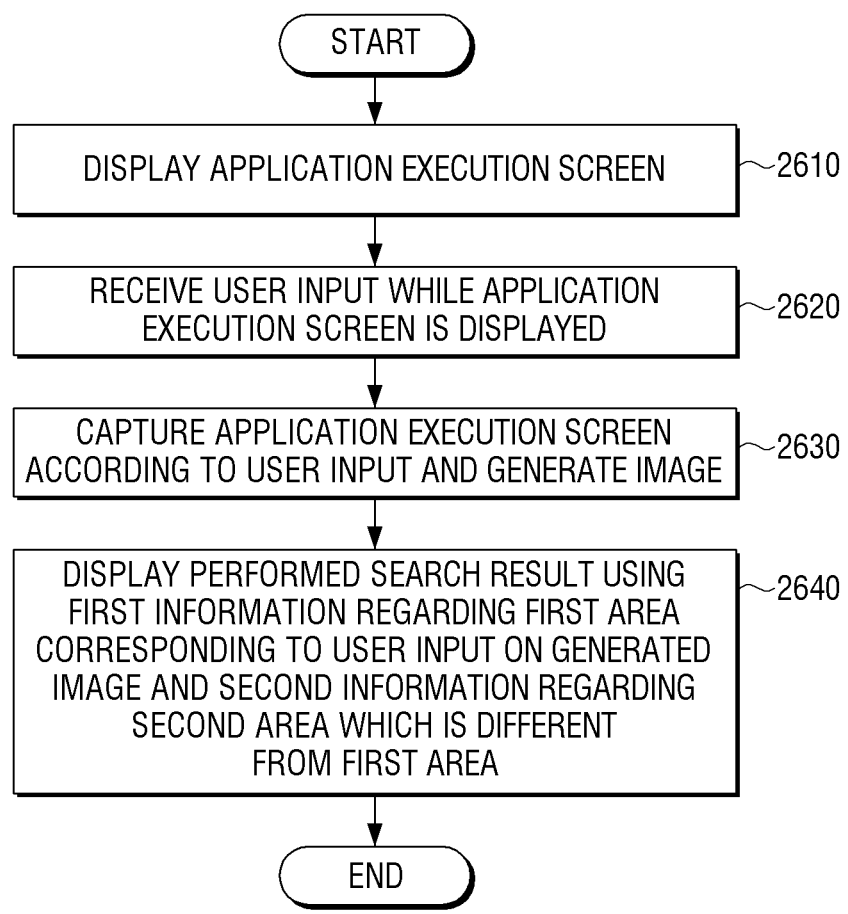
FIGS. 26 and 27 are flowcharts illustrating a process of providing searching results by an electronic device using a recognition model, according to various embodiments.
Figure 27:
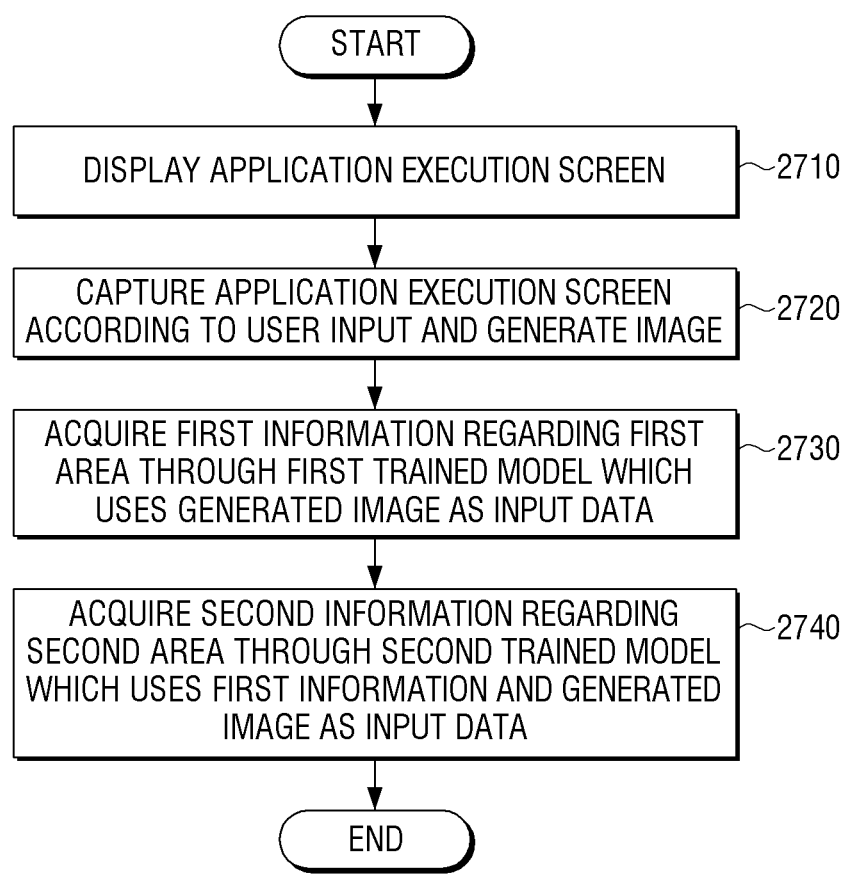

FIGS. 26 and 27 are flowcharts illustrating a process of providing a search result regarding a first area which is selected by a user using a recognition model, according to another embodiment.

In FIG. 26, the electronic device A may display an application execution screen (in operation 2610). In this case, at least one object may be included in the application execution screen.

The electronic device A may receive a user input while the application execution screen is displayed (in operation 2620). In this case, the user input may be an input regarding the application execution screen in order to select an object in the application execution screen. In particular, when a user input is received, the electronic device A may execute an AI agent in order to perform a search regarding a first area which includes the selected object.

The electronic device A may capture the application execution screen according to the user input and generate an image (in operation 2630). In this case, the electronic device A may display the generated image instead of the application execution screen.

The electronic device A may display the performed search result using first information regarding the first area corresponding to the user input on the generated image and second information regarding a second area which is different from the first area (in operation S2640). Here, the first area may be an area acquired from the image which is generated based on a touch coordinate corresponding to the user input. The second area may be an area excluding the first area in the generated image.

The first information regarding the first area and the second information regarding the second area may be acquired by a trained model. In other words, the first information may be acquired by inputting the generated image to the first trained model, and the second information may be acquired by inputting the first information and the generated image to the second trained model. In this case, the trained model may be stored in the electronic device A or an external server.

According to an embodiment, the operation of acquiring the first information and the second information and searching information regarding the first area may be performed by an external search server. In other words, the electronic device A may transmit at least part of the generated image to an external search server and receive a search result from the external search server.

In addition, the electronic device A may display a search result on the application execution screen, and transmit a user feedback on the display of the search result to an external device which stores a trained model.

In FIG. 27, the electronic device A may display the application execution screen (in operation 2710). In this case, at least one object may be included in the application execution screen.

The electronic device A may capture the application execution screen and generate an image (in operation 2720). Here, if the user input regarding the first area including the object in the application execution screen is received, the electronic device A may capture the application execution screen and generate an image. In this case, the electronic device A may display the generated image on the application execution screen.

The electronic device A may acquire the first information regarding the first area through the first trained model using the generated image as input data (in operation 2730). Here, the first model may be stored in the electronic device A, but this is only an example. The first model may be stored in an external server.

The electronic device A may acquire the second information regarding the second area through the second trained model using the first information and the generated image as input data (in operation 2740). In this case, the first model may be stored in the electronic device A, but this is only an example. The first model may be stored in an external server.

If the first model and the second model are stored in an external server, the electronic device A may transmit the generated image to the external server, and may receive the first information which is acquired by inputting the image to the first model and the second information which is acquired by inputting the image and the first information to the second model.

As described above, by acquiring not only the first information regarding the first area where the user input is sensed but also the second information regarding the second area, it is possible to search information regarding the first area more accurately.

Figure 28:
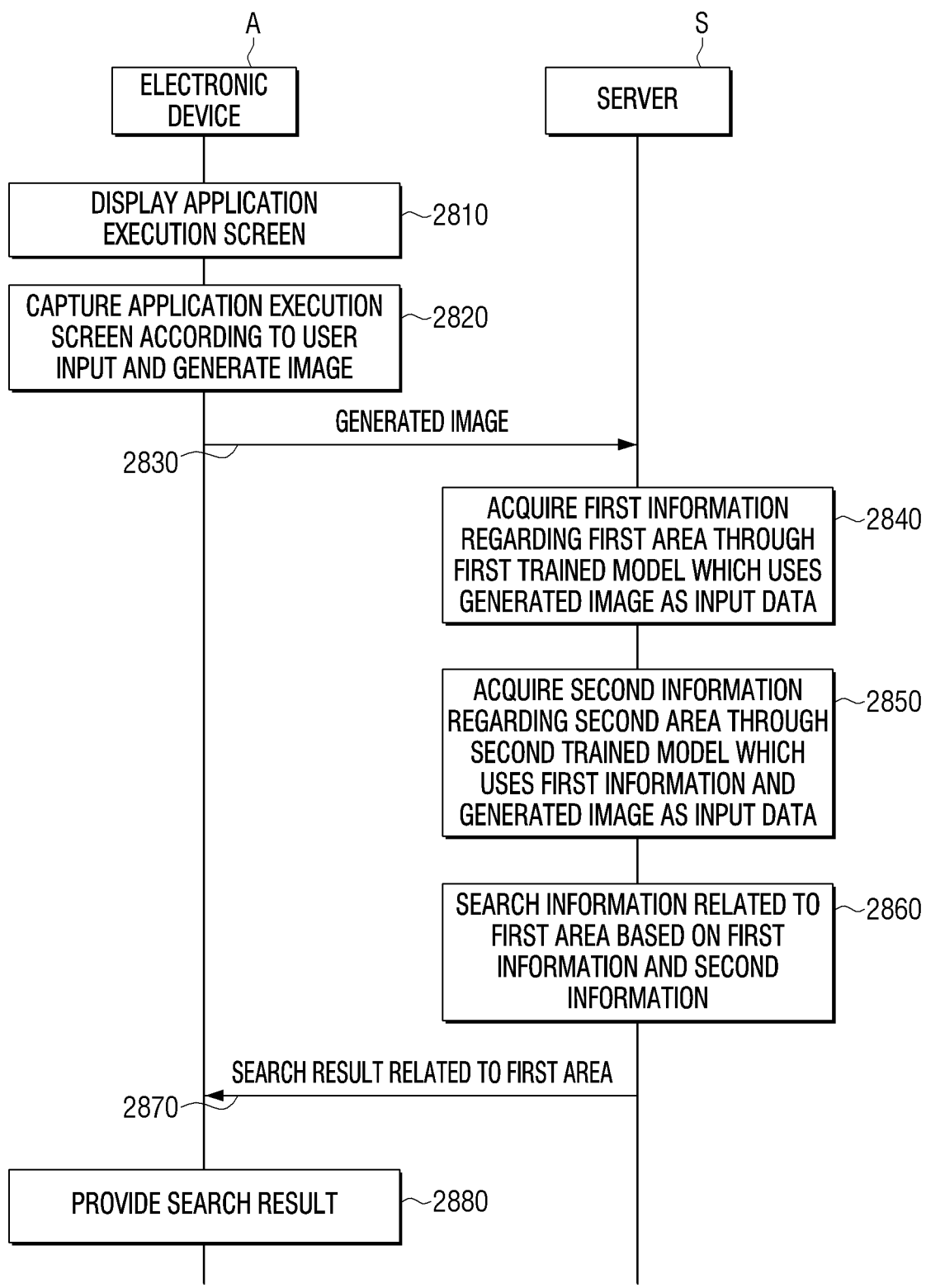

FIGS. 28 and 29 are flow diagrams illustrating using a recognition model by a system, according to various embodiments.

In FIG. 28, the electronic device A may display the application execution screen (in operation 2810). In this case, at least one object may be included in the application execution screen.

The electronic device A may capture the application execution screen and generate an image (in operation 2820). Specifically, if the user command for selecting an object is received while the application execution screen is displayed, the electronic device A may capture the application execution screen and generate an image.

The electronic device A may transmit the generated image to the server S (in operation 2830). Here, the server S may store the trained model and perform a search function based on the retrieved information.

The server S may acquire the first information regarding the first area through the first trained model which uses the generated image as input data (in operation 2840). In this case, the first area may be an area including the object which is detected based on the touch coordinate where the user input is received.

The server S may acquire the second information regarding the second area through the second trained model which uses the first information and the generated image as input data (in operation 2850). In this case, the second area may be an area excluding the first area in the generated image.

The server S may search information related to the first area based on the first information and the second information (in operation S2860). In other words, the server S may search information regarding the first area including the object based on the information regarding the object and the additional information of the peripheral area around the object.

The server S may transmit the search result related to the first area to the electronic device A (in operation 2870), and the electronic device A may provide the received search result (in operation 2880).

In other words, as illustrated in FIG. 28, the electronic device A may capture the application execution screen and provide the generated image to the server S, and the server S may acquire the first information and the second information by inputting the generated image to the trained recognition model and search information based on the first information and the second information.

Meanwhile, in the above embodiment, it is described that one server S acquire the first information and the second information through the trained model, but this is only an example. A plurality of servers can divide and perform the above operations. In other words, the first server may acquire the first information and the second information through the trained model, and the second server may search information related to the first area based on the first information and the second information acquired from the first server.

In FIG. 29, the electronic device A may display the application execution screen (in operation 2910). In this case, at least one object may be included in the application execution screen.

The electronic device A may capture the application execution screen and generate an image (in operation 2920). Specifically, if the user command for selecting an object is received while the application execution screen is displayed, the electronic device A may capture the application execution screen and generate an image.

The electronic device A may acquire the first information regarding the first area through the first trained model which uses the generated image as input data (in operation 2930).

The electronic device A may transmit the generated image and the first information to the server S (in operation 2940).

The server S may acquire the second information regarding the second area through the second trained model which uses the first information and the generated image as input data (in operation 2950).

The server S may search information related to the first area based on the first information and the second information (in operation 2960).

The server S may transmit the search result related to the first area to the electronic device A (in operation 2970), and the electronic device A may provide the received search result (in operation 2980).

In other words, in the above embodiment, the operation of acquiring the first information through the first model for recognizing an object may be performed by the electronic device A, and the operation of acquiring the second information through the second model for inferring context information may be performed by the server S. In other words, the object recognition operation which can be performed even with a small amount of processing may be performed by the electronic device A, and the operation of inferring context which requires a large amount of processing may be performed by the server S.

Meanwhile, in the above embodiments illustrated in FIGS. 28 and 29, one server S acquires the first information and the second information through a trained model and searches information related to the first area, but this is only an example. A plurality of servers may divide and perform the above operations. In other words, the first server may acquire the first information and the second information through a trained model, and the second server may search information related to the first area based on the first information and the second information acquired from the first server.

The term "module" used herein encompasses units comprised of hardware, software or firmware, and may be used interchangeably with terms, for example, logic, logic block, part or circuit. The module may be an integrally configured part or a minimum unit or part thereof which performs one or more functions. For instance, the module may be configured as an application-specific integrated circuit (ASIC).

Various embodiments may be implemented as software including instructions stored in machine-readable storage media which can be read by machine (e.g., a computer). The machine is a device capable of calling stored instructions from the storage media and operating according to the called instructions, and may include an electronic device (e.g., the electronic device A) according to the various embodiments. If the instructions are executed by a processor, the processor may perform functions corresponding to the instructions using other elements directly or under the control of the processor. The instructions may include codes made by a compiler or a code executable by an interpreter. The storage media readable by the device may be provided in the form of a non-transitory storage medium. Here, the term 'non-transitory' means that the storage media does not include a signal and is tangible, but does not distinguish whether data is permanently or temporarily stored in a storage medium.

The method according to various embodiments may be provided in a computer program product. The computer program product may be traded between a seller and a purchaser as a commodity. The computer program product is in the form of a storage medium (e.g., compack disc read only memory (CD-ROM)) which can be readable by a device, or may be distributed on-line through an application store (e.g., PlayStore™). In the case of on-line distribution, at least a part of the computer program products may be stored at least temporarily stored in a storage medium such as the server of a manufacturer, the server of an application store, or the memory of a relay server, or may be temporarily generated.

At least one of the components, elements, modules, or units according to various embodiments represented by a block, may be embodied as various numbers of hardware, software, and/or firmware structures that execute respective functions described above. For example, at least one of these components, elements, modules, or units may use a direct circuit structure, such as a memory, a processor, a logic circuit, a look-up table, etc. that may execute the respective functions through controls of one or more microprocessors or other control apparatuses. Also, at least one of these components, elements, modules, or units may be specifically embodied by a module, a program, or a part of code, which contains one or more executable instructions for performing specified logic functions, and executed by one or more microprocessors or other control apparatuses. Also, at least one of these components, elements, modules, or units may further include or may be implemented by a processor such as a central processing unit (CPU) that performs the respective functions, a microprocessor, or the like. Two or more of these components, elements, modules or units may be combined into one single component, element, module, or unit which performs all operations or functions of the combined two or more components, elements, modules, or units. Also, at least part of functions of at least one of these components, elements, modules, or units may be performed by another of these components, elements, modules, or units. Functional aspects of the above exemplary embodiments may be implemented in algorithms that execute on one or more processors. Furthermore, the components, elements, modules, or units represented by a block or processing operations may employ any number of related art techniques for electronics configuration, signal processing and/or control, data processing and the like. The operations performed by a module, a program, or other elements according to various embodiments may be performed sequentially, in parallel, iteratively or heuristically, or at least some operations may be performed in a different order, omitted, or other operations may be added.

The foregoing various embodiments and advantages are merely exemplary and are not to be construed as limiting the present disclosure. The present disclosure can be readily applied to other types of apparatuses. Also, the description of the various embodiments is intended to be illustrative, and not to limit the scope of the claims, and many alternatives, modifications, and variations will be apparent to those skilled in the art.

What is claimed is:

1. A method of providing search results in an electronic device, the method comprising:
displaying a first screen;
receiving a first user touch input for selecting an object displayed on the first screen;
in response to receiving the first user touch input, obtaining an image by capturing the first screen including the object and detecting an object area corresponding to the object included in the image based on touch coordinates corresponding to the first user touch input;
obtaining information for identifying the object included in the object area in the image by using an artificial intelligence (AI) object recognition model;
transmitting the information for identifying the object to a server;
receiving a search result including purchase information for each of a plurality of items related to the object based on transmitting the information for identifying the object;
displaying the search result on at least a portion of the first screen; and
in response to receiving a second user touch input for selecting an item of the plurality of items, displaying a second screen related to a web site selling the selected item.

2. The method of claim 1, wherein the object is selected by touching at least one location on the first screen where the object is displayed.

3. The method of claim 1, wherein the first user touch input includes one of a long-touch input, a multi-touch input, a long-press touch input, a double-tap touch input, a horizontal drag touch input, and a strong pressure touch input.

4. The method of claim 1, wherein the search result includes at least one of detailed information about the object, advertising information associated with the object, purchase information of the object, and information of other objects associated with the object.

5. The method of claim 1, wherein a search providing the search result is performed by an AI processor.

6. The method of claim 1, further comprising:
displaying a message indicating that the search result is being retrieved.

7. The method of claim 1, further comprising:
transmitting user feedback to an external device,
wherein the search result is obtained based on at the transmitted user feedback.

8. The method of claim 1, further comprising:
transmitting at least part of the image to an external search server; and
receiving the search result from the external search server.

9. The method of claim 1, further comprising:
displaying an indication indicating that the object area is detected on an area including at least a portion of the object area.

10. An electronic device, comprising:
a display;
a user input interface;
a communicator;
a processor configured to be electrically connected to the display, the user input interface, and the communicator; and
a memory configured to store at least one computer program, which is executed by the processor, wherein the at least one computer program comprises:
displaying a first screen on the display;
receiving a first user touch input for selecting an object via the user input interface, the object displayed on the first screen,
in response to receiving the first user touch input, obtaining an image by capturing the first screen including the object and detecting an object area corresponding to the object included in the image based on touch coordinates corresponding to the first user touch input;
obtaining information for identifying the object included in the object area in the image by using an artificial intelligence (AI) object recognition model;
transmitting the information for identifying the object to a server;
receiving a search result including purchase information for each of a plurality of items related to the object based on transmitting the information for identifying the object;
displaying the search result on at least a portion of the first screen; and
in response to receiving a second user touch input for selecting an item of the plurality of items, displaying a second screen related to a web site selling the selected item.

11. The electronic device of claim 10, wherein the object is selected by touching at least one location on the first screen where the object is displayed.

12. The electronic device of claim 10, wherein the first user touch input includes one of a long-touch input, a multi-touch input, a long-press touch input, a double-tap touch input, a horizontal drag touch input, and a strong pressure touch input.

13. The electronic device of claim 10, wherein the search result includes at least one of detailed information about the object, advertising information associated with the object, purchase information of the object, information of other objects associated with the object.

14. The electronic device of claim 10, wherein a search providing the search result is performed by an AI processor.

15. The electronic device of claim 10, wherein a message indicating that the search result is being retrieved is displayed on the display.

16. The electronic device of claim 10, wherein the at least one computer program further comprises:
transmitting, to an external device, user feedback based on the search result displayed on the display.

17. The electronic device of claim 10, wherein the at least one computer program further comprises:
displaying an indication indicating that the object area is detected on an area including at least a portion of the object area.

18. A method of providing search results by acquiring information using a trained model in an electronic device, the method comprising:
displaying a first screen on a display;
receiving a first user touch input for selecting an object via a user input interface, the object displayed on the first screen;
in response to receiving the first user touch input, obtaining an image by capturing the first screen including the object and detecting an object area corresponding to the object included in the image based on touch coordinates corresponding to the first user touch input;
obtaining information for identifying the object included in the object area in the image by using an artificial intelligence (AI) object recognition model;
transmitting the information for identifying the object to a server;
receiving a search result including purchase information for each of a plurality of items related to the object based on transmitting the information for identifying the object;
displaying the search result on at least a portion of the first screen; and
in response to receiving a second user touch input for selecting an item of the plurality of items, displaying a second screen related to a web site selling the selected item.

* * * * *